United States Patent
Park et al.

(10) Patent No.: US 12,003,295 B2
(45) Date of Patent: Jun. 4, 2024

(54) POWER CONTROL FOR IAB NODE FRONTHAUL

(71) Applicant: SHARP KABUSHIKI KAISHA, Sakai (JP)

(72) Inventors: Kenneth Park, Vancouver, WA (US); John Michael Kowalski, Vancouver, WA (US); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 83 days.

(21) Appl. No.: 17/795,164

(22) PCT Filed: Dec. 29, 2020

(86) PCT No.: PCT/JP2020/049273
§ 371 (c)(1),
(2) Date: Jul. 25, 2022

(87) PCT Pub. No.: WO2021/153157
PCT Pub. Date: Aug. 5, 2021

(65) Prior Publication Data
US 2023/0071471 A1    Mar. 9, 2023

Related U.S. Application Data

(60) Provisional application No. 62/966,741, filed on Jan. 28, 2020.

(51) Int. Cl.
*H04B 7/06* (2006.01)
*H04B 17/318* (2015.01)
(Continued)

(52) U.S. Cl.
CPC ......... *H04B 7/0617* (2013.01); *H04B 17/318* (2015.01); *H04B 17/345* (2015.01); *H04W 52/42* (2013.01)

(58) Field of Classification Search
CPC .. H04B 7/0617; H04B 17/318; H04B 17/345; H04W 52/42; H04W 92/12
See application file for complete search history.

(56) References Cited

U.S. PATENT DOCUMENTS 10,470,136 B1    11/2019    Ghosh et al.
10,477,420 B2    11/2019    Ghosh et al.
(Continued)

OTHER PUBLICATIONS

Ericsson, "IAB Node Integration Procedure", R2-1903971, 3GPP TSG-RAN WG2 Meeting #105bis, Xi'an, P. R. of China, Apr. 8-Apr. 12, 2019.
(Continued)

*Primary Examiner* — Vineeta S Panwalkar
(74) *Attorney, Agent, or Firm* — ScienBiziP, P.C.

(57) ABSTRACT

A node of an Integrated Access and Backhaul (IAB) network comprises processor circuitry and interface circuitry. The processor circuitry is configured to make a determination concerning crosslink interference (CLI) between (a) a beam transmitted from a parent node to the IAB node and (b) a beam transmitted from the IBA node to a child node of the IAB node; and in accordance with the determination, and to generate a command configured to modify a property of the beam transmitted from the parent node to the IAB node. The interface circuitry is configured to transmit the command to a beam controller of the parent node.

11 Claims, 48 Drawing Sheets

(51) Int. Cl.
*H04B 17/345* (2015.01)
*H04W 52/42* (2009.01)

(56) References Cited

U.S. PATENT DOCUMENTS

| | | | | |
|---|---|---|---|---|
| 2018/0205427 | A1 | 7/2018 | Ghosh et al. | |
| 2020/0053655 | A1* | 2/2020 | Ghosh | H04W 88/10 |
| 2020/0322037 | A1* | 10/2020 | Abedini | H04W 24/10 |
| 2021/0013930 | A1* | 1/2021 | Akoum | H04B 17/102 |
| 2021/0250884 | A1* | 8/2021 | Iyer | H04W 56/0045 |
| 2022/0232481 | A1* | 7/2022 | Kusashima | H04W 52/10 |

OTHER PUBLICATIONS

Ericsson, "Backhaul Channel Setup and Modification Procedure for IAB Networks", R2-1903970, 3GPP TSG RAN WG2 Meeting #105bis, Xi'an, P.R. of China, Apr. 8-12, 2019.

Ericsson, "IAB Node Release Procedure", R2-1903960, 3GPP TSG-RAN WG2 Meeting # 105bis, Xi'an, P.R. China, Apr. 8-12, 2019.

Intel Corporation, "Backhaul RLF handling", R2-1903940, 3GPP TSG RAN WG2 Meeting #105bis, Xian, China, Apr. 8-12, 2019.

Ericsson, "IP Address Assignment for IAB Nodes", R2-1903936, 3GPP TSG-RAN WG2#105bis, Xi'an, P.R. of China, Apr. 8-12, 2019.

Ericsson, "RLF related notifications in IAB networks", R2-1903935, 3GPP TSG-RAN WG2 #105bis, Xi'an, P. R. of China, Apr. 8-12, 2019.

Ericsson, "Support for LTE Deployment at IAB Node Sites", R2-1903934, 3GPP TSG-RAN WG2#105bis, Xi'an, P. R. of China, Apr. 8-12, 2019.

Ericsson, "Minimizing CN Functionalities for IAB Networks", R2-1903933, 3GPP TSG-RAN WG2#105bis, Xi'an, P. R. of China, Apr. 8-12, 2019.

Ericsson, "Control plane architecture aspects of IAB nodes", R2-1903930, 3GPP TSG-RAN WG2#105bis, Xi'an, P. R. of China, Apr. 8-12, 2019.

Ericsson, "Allowing only IAB nodes in a standalone NR deployment", R2-1903928, 3GPP TSG-RAN WG2# 105bis, Xian, P. R. of China, Apr. 8-12, 2019.

Kyocera, "Further consideration of topology adaptation upon BH RLF", R2-1903730, 3GPP TSG-RAN WG2 #105-bis, Xi'an, China, Apr. 8-12, 2019.

Asustek, "On topology adaptation upon backhaul-link-failure recovery", R2-1903698, 3GPP TSG-RAN WG2 Meeting #105bis, Xi'an, China, Apr. 8-12, 2019.

Samsung, "Overview on control signalling transmission in IAB", R2-1903685, 3GPP TSG-RAN WG2 Meeting #105bis, Xi'an, China, Apr. 8-Apr. 12, 2019.

Samsung, "Configuration of BH RLC CH", R2-1903684, 3GPP TSG-RAN WG2 Meeting #105bis, Xi'an, China, Apr. 8-Apr. 12, 2019.

Qualcomm Incorporated, "BH RLF handling for IAB", R2-1903583, 3GPP TSG-RAN WG2 Meeting #105bis, Xi'an, China, Apr. 8-12.

3GPP TS 37.324 V15.1.0 (Sep. 2018) Brd Generation Partnership Project; Technical Specification Group Radio Access Network; E-UTRA and NR; Service Data Adaptation Protocol (SDAP) specification(Release 15).

Huawei, HiSilicon, "Congestion reporting and handling for IAB networks", R2-1904989, 3GPP TSG-RAN WG2#105bis, Xi'an, China, Apr. 8-Apr. 12, 2019.

Huawei, HiSilicon, "RRC signaling structure for IAB", R2-1904987, 3GPP TSG-RAN WG2 Meeting #105bis, Xi'an, China, Apr. 8-12, 2019.

Huawei, HiSilicon, "IAB RLC channel management procedure", R2-1904985, 3GPP TSG-RAN WG2 meeting #105bis, Xi'an, China, Apr. 8-Apr. 12, 2019.

Huawei, HiSilicon, "Cell Selection and Reselection procedures of IAB node", R2-1904978, 3GPP TSG-RAN WG2 Meeting #105bis, Xi'an, China, Apr. 8-12, 2019.

Huawei, HiSilicon, "Access Control for IAB MT", R2-1904976, 3GPP TSG-RAN WG2 Meeting #105bis, Xi'an, China, Apr. 8-12, 2019.

Huawei, HiSilicon, "IAB RRC Connection Establishment", R2-1904975, 3GPP TSG-RAN WG3 Meeting #105bis, Xi'an, China, Apr. 8-12, 2019.

Samsung, "(De)Prioritizing the Access for IAB Setup", R2-1904905, 3GPP TSG-RAN WG2#105bis, Xi'an, China, Apr. 8-12, 2019.

ITRI, "Improvements on RLF procedure in IAB", R2-1904873, 3GPP TSG-RAN WG2 Meeting #105bis, Xi'an, China, Apr. 8-Apr. 12, 2019.

ZTE, Sanechips, "Discussion on BH RLC channel configuration in IAB network", R2-1904611, 3GPP TSG RAN WG2 Meeting #105bis, Xi'an, China, Apr. 8-12, 2019.

ZTE, Sanechips, "Discussion on IAB BH RLF handling", R2-1904606, 3GPP TSG-RAN WG2 Meeting #105bis, Xi'an, China, Apr. 8-12, 2019.

Sharp, "Access restrictions (barring) in IAB", R2-1904430, 3GPP TSG RAN WG2 Meeting #105bis, Xi'an, China, Apr. 8-12, 2019.

Sharp, "Downstream notification of BH RLF", R2-1904427, 3GPP TSG RAN WG2 Meeting #105bis, Xi'an, China, Apr. 8-12, 2019.

Nokia, Nokia Shanghai Bell, "Further discussion on BH link RLF handling", R2-1904411, 3GPP TSG-RAN WG2 Meeting #105bis, Xian, China, Apr. 8-12, 2019.

Nokia, Nokia Shanghai Bell, "BH link RLF notifications", R2-1904410, 3GPP TSG-RAN WG2 Meeting #105bis, Xian, China, Apr. 8-12, 2019.

Lenovo, Motorola Mobility, "Parent node selection for migration", R2-1904260, 3GPP TSG-RAN WG2 Meeting #105bis, Xi'an, China, Apr. 8-Apr. 12, 2019.

Sony, "IAB System information handling", R2-1904200, 3GPP TSG RAN WG2 Meeting #105bis, Xi'an, China, Apr. 8-Apr. 12, 2019.

Samsung, "IAB RRC state machine", R2-1904181, 3GPP TSG-RAN WG2 Meeting #105-Bis, Xi'an, China, Apr. 8-12, 2019.

Samsung, "Overview of flow control solutions", R2-1904180, 3GPP TSG-RAN WG2 Meeting #105-Bis, Xi'an, China, Apr. 8-Apr. 12, 2019.

Lenovo, Motorola Mobility, "RLF notification for backhaul link", R2-1904172, 3GPP TSG-RAN WG2 Meeting #105bis, Xi'an, China, Apr. 8-Apr. 12, 2019.

Michele Polese et al., "Integrated Access and Backhaul in 5G mmWave Networks: Potentials and Challenges", arXiv:1906.01099v1 [cs.NI], Jun. 3, 2019.

Ali A. Esswie et al., "Inter-Cell Radio Frame Coordination Scheme Based on Sliding Codebook for 5G TDD Systems", arXiv:1902.02980v1 [eess.SP], Feb. 8, 2019.

3GPP TS 38.473 V15.7.0 (Sep. 2019) 3rd Generation Partnership Project; Technical Specification Group Radio Access Network; NG-RAN; F1 application protocol (F1AP) (Release 15).

3GPP TS 38.323 V15.6.0 (Jun. 2019) 3rd Generation Partnership Project; Technical Specification Group Radio Access Network; NR; Packet Data Convergence Protocol (PDCP) specification (Release 15).

3GPP TS 38.322 V15.5.0 (Mar. 2019) 3rd Generation Partnership Project; Technical Specification Group Radio Access Network; NR; Radio Link Control (RLC) protocol specification (Release 15).

3GPP TS 38.321 V15.8.0 (Dec. 2019) Brd Generation Partnership Project; Technical Specification Group Radio Access Network; NR; Medium Access Control (MAC) protocol specification (Release 15).

3GPP TS 36.331 V15.8.0 (Dec. 2019) 3rd Generation Partnership Project; Technical Specification Group Radio Access Network; Evolved Universal Terrestrial Radio Access (E-UTRA); Radio Resource Control (RRC); Protocol specification (Release 15).

3GPP TS 38.300 V16.0.0 (Dec. 2019) 3rd Generation Partnership Project; Technical Specification Group Radio Access Network; NR; NR and NG-RAN Overall Description; Stage 2 (Release 16).

Qualcomm Incorporated (Mediator), "Rel-17 IAB email discussion—report", RP-193094, 3GPP TSG RAN meeting #86, Sitges, Spain, Dec. 9-12, 2019.

(56) References Cited

OTHER PUBLICATIONS

Huawei, HiSilicon, "Backhaul RLF Recovery", R2-1905171, 3GPP TSG-RAN WG2#105bis, Xi'an, China, Apr. 8-Apr. 12, 2019.
Huawei, HiSilicon, "IAB bearer mapping decision and configuration", R2-1905103, 3GPP TSG-RAN WG2#105bis, Xi'an, China, Apr. 8-12, 2019.
LG Electronics Inc., "BH RLF reporting to IAB donor node", R2-1905072, 3GPP TSG-RAN WG2 Meeting #105-Bis, Xi'an, China, Apr. 8-12, 2019.
LG Electronics Inc., "Access Control for IAB node", R2-1905043, 3GPP TSG-RAN WG2 #105bis, Xian, China, Apr. 8-12, 2019.
LG Electronics, "Inter-node RRC signaling (applicbale for BH RLF notification)", R2-1905029, 3GPP TSG-RAN WG2 Meeting #106, Xian, China, Apr. 8-12, 2019.
LG Electronics, "Framework of BH RLF notification and recovery", R2-1905028, 3GPP TSG-RAN WG2 Meeting #105bis, Xian, China, Apr. 8-12, 2019.
LG Electronics, "Criteria for southbound and northbound backhaul link failure", R2-1905027, 3GPP TSG-RAN WG2 Meeting #105, Xian, China, Apr. 8-12, 2019.

\* cited by examiner

POWER CONTROL FOR IAB NODE FRONTHAUL

TECHNICAL FIELD

The technology relates to wireless communications, and particularly to radio architecture and operation for resolving problematic conditions on wireless backhaul links.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 34, and is also described in 3GPP TS 38.300. The 5G NR network is comprised of NG RAN (Next Generation Radio Access Network) and 5GC (5G Core Network). As shown, NGRAN is comprised of gNBs (e.g., 5G Base stations) and ng-eNBs (i.e. LTE base stations). An Xn interface exists between gNB-gNB, between (gNB)-(ng-eNB) and between (ng-cNB)-(ng-cNB). The Xn is the network interface between NG-RAN nodes. Xn-U stands for Xn User Plane interface and Xn-C stands for Xn Control Plane interface. A NG interface exists between 5GC and the base stations (i.e. gNB & ng-eNB). A gNB node provides NR user plane and control plane protocol terminations towards the UE, and is connected via the NG interface to the 5GC. The 5G NR (New Radio) gNB is connected to AMF (Access and Mobility Management Function) and UPF (User Plane Function) in 5GC (5G Core Network).

In some cellular mobile communication systems and networks, such as Long-Term Evolution (LTE) and New Radio (NR), a service area is covered by one or more base stations, where each of such base stations may be connected to a core network by fixed-line backhaul links (e.g., optical fiber cables). In some instances, due to weak signals from the base station at the edge of the service area, users tend to experience performance issues, such as: reduced data rates, high probability of link failures, etc. A relay node concept has been introduced to expand the coverage area and increase the signal quality. The relay node is connected to the base station using a wireless backhaul link, and the base station is connected to the relay node using a wireless fronthaul link.

In 3rd Generation Partnership Project (3GPP), the relay node ("IAB node") as a concept for the fifth generation (5G, or NR) cellular system has been discussed and standardized based on the RAN slicing technologies introduced for New Radio, e.g., the functional split and function placement of different levels of isolation and sharing across control plane (CP), user plane (UP), and control logic (CL), wherein the IAB node utilizes the same 5G radio access technologies (i.e. New Radio (NR)) for the operation of services to User Equipment (UE) (access link) and connections to the core network (backhaul link) simultaneously. These radio links can be multiplexed in time, frequency and/or space. This system is referred as Integrated Access and Backhaul (IAB).

FIG. 33 is a diagram illustrating an example of a radio protocol architecture for the control and user planes in a mobile communications network. The radio protocol architecture for the UE and/or the gNodeB may be shown with three layers: Layer 1, Layer 2, and Layer 3. Layer 1 (L1 layer) is the lowest layer and implements various physical layer signal processing functions. Layer 2 (L2 layer) is above the physical layer and responsible for the link between the UE and/or gNodeB over the physical layer. In the user plane, the L2 layer may include a media access control (MAC) sublayer, a radio link control (RLC) sublayer, and a packet data convergence protocol (PDCP) sublayer, which are terminated at the gNodeB on the network side. Although not shown, the UE may have several upper layers above the L2 layer including a network layer (e.g., IP layer) that is terminated at the PDN gateway on the network side, and an application layer that is terminated at the other end of the connection (e.g., far end UE, server, etc.). The control plane also includes a radio resource control (RRC) sublayer in Layer 3 (L3 layer). The RRC sublayer is responsible for obtaining radio resources (i.e., radio bearers) and for configuring the lower layers using RRC signaling between the IAB-nodes and/or the UE and an IAB-donor.

Various nomenclature may be employed for describing an IAB system and relationships of nodes in the network topology of the IAB system. As used herein:

A node that is connected to an IAB node and is topologically between the IAB node and the Core Network is a Parent node to the LAB node.

A Parent node may be an IAB node or it may be a Donor node.

A Donor node is the node topologically closest to the Core Network.

A node that is connected to an IAB node and is not a Parent or Donor node, is a Child node.

A Child node may be a UE or another LAB node.

An integrated access and backhaul (IAB) system is expected to be reliable and robust against various kinds of possible failures. However, as explained in more detail below, in some situations a problem known as crosslink interference (CLI) may arise, such as, for example in a topology wherein a "Frequency Reuse Factor=1" is used by Parent and IAB nodes.

For 3GPP Rel-16, IAB nodes' Tx and Rx configurations are limited to the use of TDM half-duplex service, e.g. an IAB node can only do one of the following at a time: receive from a Parent node, transmit to Parent node, receive from Child node, transmit to Child node. For Rel-17 there are proposals to enhance the configuration to enable full-duplex in the context of IAB, e.g., the IAB node can receive on its MT side from a Parent node and transmit on its DU side to a Child simultaneously. However, if the IAB node is using the same time and frequency resources to communicate with the Child node that a Parent node is using to communicate with the IAB node, e.g., frequency reuse is 1, the Parent node's Downlink transmissions to the IAB node may interfere with a Child node's reception of the IAB's Downlink transmissions.

The coexistence of different link directions over same frequency resources in adjacent cells results in potential crosslink interference (CLI), i.e., user-to-user (UE-UE), and base-station to base-station (BS-BS) interference, and nodes of an IAB topology.

Since 3GPP Rel-9, LTE support has supported the feature of "3D Beam Forming". This technology provides that the energy radiated by an antenna is not omni-directional, e.g., not spherical, and is instead focused into a beam. This beam of energy is referred to herein as a "Tx Beam". This technology has been implemented for the MIMO feature and has been improving with each subsequent release to the point where individual "Beams" can be created and directed, e.g., pointed, at a specific direction and location to service specific UEs. In NR the concept of Beam Forming is used to provide not only connections from the gNB to the UE, but also between gNB's.

What is needed are methods, apparatus, and/or techniques to mitigate crosslink interference (CLI) in an Integrated Access and Backhaul (IAB) system.

SUMMARY OF INVENTION

In one example, a node of an Integrated Access and Backhaul (IAB) network, the node comprising: processor circuitry configured: to make a determination concerning crosslink interference (CLI) between (a) a beam transmitted from a parent node to the IAB node and (b) a beam transmitted from the IAB node to a child node of the IAB node; and in accordance with the determination, to generate a command configured to modify a property of the beam transmitted from the parent node to the IAB node; interface circuitry configured to transmit the command to a beam controller of the parent node.

In one example, a method in a node of an Integrated Access and Backhaul (IAB) network, the node comprising: using processor circuitry: to make a determination concerning crosslink interference (CLI) between (a) a beam transmitted from a parent node to the IAB node and (b) a beam transmitted from the IBA node to a child node of the IAB node; and in accordance with the determination, to generate a command configured to modify a property of the beam transmitted from the parent node to the IAB node; transmitting the command to a beam controller of the parent node.

In one example, a node of an integrated access and backhaul (IAB) network comprising: an interface configured to obtain a command configured in accordance with a determination concerning crosslink interference (CLI) between (a) a beam transmitted from the node to a wireless relay node and (b) a beam transmitted from the wireless relay node to a child node of the wireless relay node; beam transmission circuitry configured to use the command to modify a property of the beam transmitted from the node to the wireless relay node.

In one example, a method in a node of an integrated access and backhaul (IAB) network comprising: obtaining a command configured in accordance with a determination concerning crosslink interference (CLI) between (a) a beam transmitted from the node to a wireless relay node and (b) a beam transmitted from the wireless relay node to a child node of the wireless relay node; modifying a property of the beam transmitted from the node to the wireless relay node in accordance with the command.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DESCRIPTION OF EMBODIMENTS

Figure 1A:
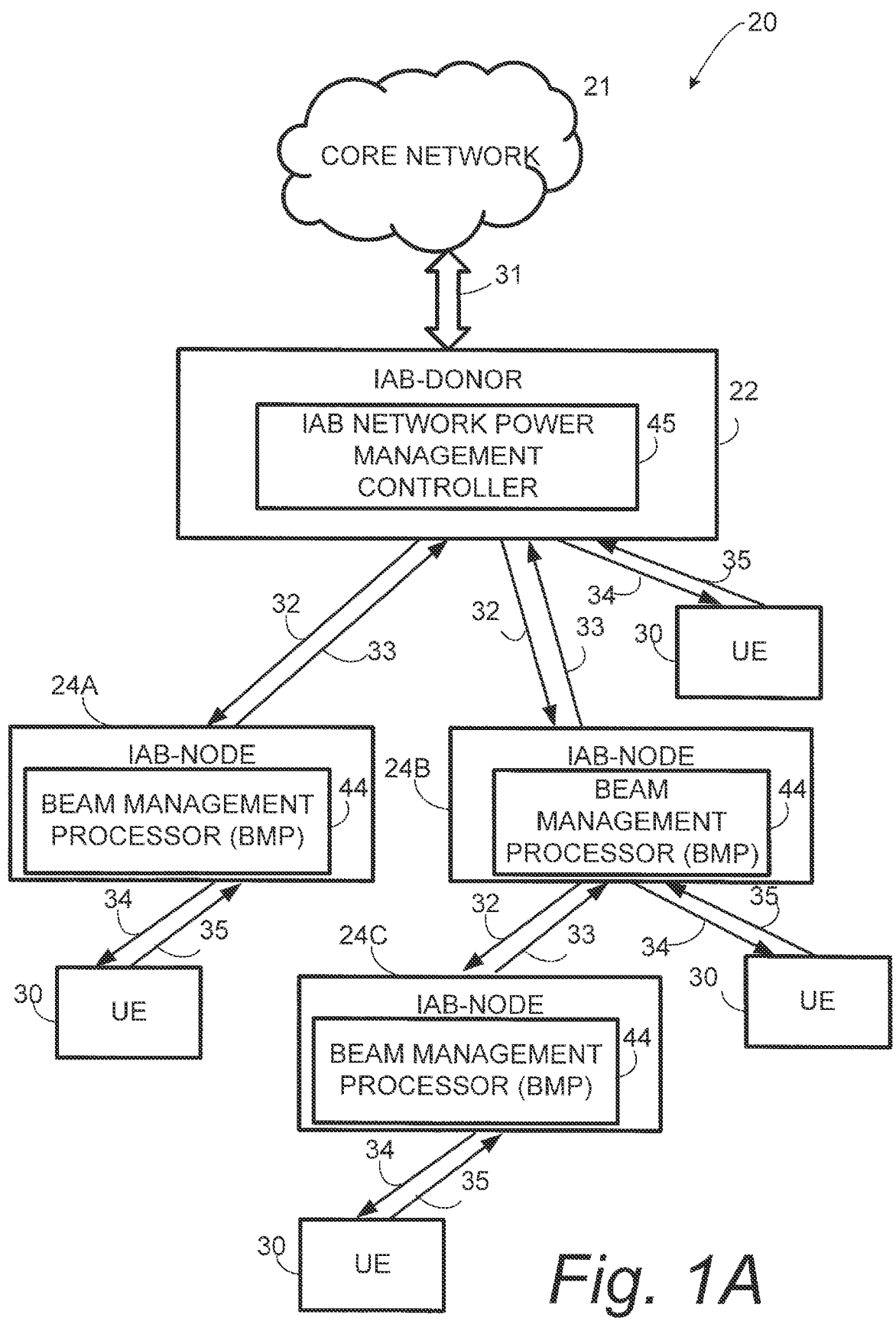
FIG. 1A is a diagrammatic view a mobile network infrastructure using 5G signals and 5G base stations, with FIG. 1A showing a beam management processor (BMP) located at a non-donor IAB node, with FIG. 1B showing a beam management processor (BMP) located at a donor JAB node, and with FIG. 1C showing a IAB network power management controller in an JAB node that is not a donor node.

In one of its example aspects the technology disclosed herein concerns method and apparatus for detecting/mitigating/managing conditions where a Parent node's downlink transmission to an IAB node causes crosslink interference (CLI) on the downlink of an IAB node to a Child node, as received by a Child node. Specifically, the case where the Parent node is using the same frequency band, e.g., Time and frequency resources, as well at least some overlapping spatial resources to communicate with the IAB node that the IAB node is using to communicate with the Child node.

In one of its example aspects the apparatus and method detects that a Child node, e.g., a UE, connected to an IAB node is at a location that is covered by or nearly covered by a Tx Beam that the IAB node's Parent node is using to communicate with the TAB node, and if that Child node is impacted by CLI from the Parent node's Tx Beam.

In one of its example aspects the apparatus and method determines if a decrease in the transmission power for the backhaul link between the Parent node and one or more of its IAB Child nodes can be realized that may reduce the interference to the access link used by the IAB node and Child node, and yet maintain acceptable throughput and QoS on the backhaul link used by the Parent node and TAB node. And, if such a determination is made, the processor requests that the Parent node reduce its transmission power on the backhaul link between the Parent node and TAB node.

In one of its example aspects the apparatus and method determines if an increase in the transmission power for the backhaul link between the Parent node and the JAB node can be realized that may provide a benefit to the IAB node via an increase in throughput with the Parent node, and that an increase in the transmission power for the backhaul link between the Parent node and the IAB node will not cause the Child node of the IAB node to be impacted by unacceptable levels of CLI from the Parent node's transmission. And, if such a determination is made, the process requests that the Parent node increase its transmission power on the backhaul link between the Parent node and IAB node.

In one of its example aspects the apparatus and method determines finds a power transmission threshold for the backhaul link that balances the two aspects above, e.g., minimizing Parent node transmission power for the benefit of reducing interference upon Child node and maximizing Parent node transmission power for the benefit of DL throughput from Parent node to IAB node.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HcNB"), a gNB (for a New Radio ["NR"] technology system), or some other similar terminology.

As used herein, the term "telecommunication system" or "communications system" can refer to any network of devices used to transmit information. A non-limiting example of a telecommunication system is a cellular network or other wireless communication system.

As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof (e.g., NUTRAN).

Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and 1 are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having 1 ms duration similar to LTE. Each subframe consists of 2p slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

A mobile network used in wireless networks may be where the source and destination are interconnected by way of a plurality of nodes. In such a network, the source and destination may not be able to communicate with each other directly due to the distance between the source and destination being greater than the transmission range of the nodes. That is, a need exists for intermediate node(s) to relay communications and provide transmission of information. Accordingly, intermediate node(s) may be used to relay information signals in a relay network, having a network topology where the source and destination are interconnected by means of such intermediate nodes. In a hierarchical telecommunications network, the backhaul portion of the network may comprise the intermediate links between the core network and the small subnetworks of the entire hierarchical network. Integrated Access and Backhaul (IAB) Next generation NodeB use 5G New Radio communications such as transmitting and receiving NR User Plane (U-Plane) data traffic and NR Control Plane (C-Plane) data. Both, the UE and gNB may include addressable memory in electronic communication with a processor. In one embodiment, instructions may be stored in the memory and are executable to process received packets and/or transmit packets according to different protocols, for example, Medium Access Control (MAC) Protocol and/or Radio Link Control (RLC) Protocol.

In a mobile network, an IAB child node may use the same initial access procedure (discovery) as an access UE to establish a connection with an IAB node/donor or parent-thereby attaching to the network or camping on a cell. In one embodiment, Radio Resource Control (RRC) protocol may be used for signaling between 5G radio network and UE, where RRC may have at least two states (e.g., RRC_IDLE and RRC_CONNECTED) and state transitions. The RRC sublayer may enable establishing of connections based on the broadcasted system information and may also include a security procedure. The U-Plane may comprise of PHY, MAC, RLC and PDCP layers.

Embodiments of the present system disclose methods and devices for an IAB-node to inform child nodes and/or UEs of upstream radio conditions and accordingly, the term IAB-node may be used to represent either a parent IAB-node or a child IAB-node, depending on where the IAB-node is in the network communication with the 1AB-donor which is responsible for the physical connection with the core network. Embodiments are disclosed where an IAB-node (child IAB-node) may follow the same initial access procedure as a UE, including cell search, system information acquisition, and random access, in order to initially set up a connection to a parent IAB-node or an IAB-donor. That is, when an IAB base station (eNB/gNB) needs to establish a backhaul connection to, or camp on, a parent IAB-node or an LAB-donor, the IAB-node may perform the same procedures and steps as a UE, where the IAB-node may be treated as a UE but distinguished from a UE by the parent IAB-node or the IAB-donor.

A. Overview of Generic Architecture Description

FIG. 1A shows an example telecommunications system 20 comprising core network 21 and plural wireless access nodes including donor or parent IAB node 22 and other IAB nodes 24, e.g., IAB nodes 24A, 24B, and 24C which are not donor IAB nodes; and plural user equipments (UE) 30 that are served by one or more of the access nodes. The IAB nodes 24 are not donor IAB nodes, but are considered as access nodes since they provide a connection to the UEs and thus provide access to the core network for the UEs. FIG. 1A further shows that the donor IAB node 22 may be connected to core network 21, e.g., by a wireline 31 or other suitable connection; and that wireless backhaul links may connect the donor IAB node 22, the IAB nodes 24, and the user equipments (UEs) 30. FIG. 1A particularly shows, for example, that donor IAB node 22 is connected by downlink donor backhaul link 32 and uplink donor backhaul link 33 to one or more JAB nodes 24. FIG. 1A further shows that an JAB node 24 may be connected by downlink backhaul link 34 and uplink backhaul link 35 to one or more child nodes, e.g., to a user equipment (UE) 30 or to another IAB node 24. It should be understood that some parts of operations and behaviors that are performed by the donor IAB node may be able to be performed by a parent IAB node.

FIG. 1A indicates that example ones of the present embodiments may include a mobile network infrastructure using 5G signals and 5G base stations (or cell stations). Depicted is a system diagram of a radio access network utilizing IAB nodes, where the radio access network may comprise, for example, one IAB-donor 22 and multiple IAB-nodes 24. Different embodiments may comprise different number of IAB-donor and IAB-node ratios. Herein, the IAB nodes 24 may be referred to as IAB relay nodes. An IAB-node 24 may be a Radio Access Network (RAN) node that supports wireless access to UEs and wirelessly backhauls the access traffic. The IAB-donor 22 may be a RAN node which may provide an interface to the core network 21 to UEs 30 and wireless backhauling functionality to IAB nodes. An IAB-node/donor 22 may serve one or more TAB nodes 24 using wireless backhaul links as well as UEs using wireless access links simultaneously. Accordingly, network backhaul traffic conditions may be implemented based on the wireless communication system to a plurality of TAB nodes and UEs.

With further reference to FIG. 1A, plural UEs 30 are depicted as in communication with IAB nodes, for example, IAB nodes 24 and IAB donor node 22, via wireless access link(s). Additionally, the IAB-nodes which are considered as child nodes may be in communication with other IAB-nodes and/or an IAB-donor, all of which may be considered IAB parent nodes, via wireless backhaul link. For example, a UE may be connected to an IAB-node which itself may be connected to a parent IAB-node in communication with an IAB-donor, thereby extending the backhaul resources to allow for the transmission of backhaul traffic within the network and between parent and child for integrated access.

Figure 2A:
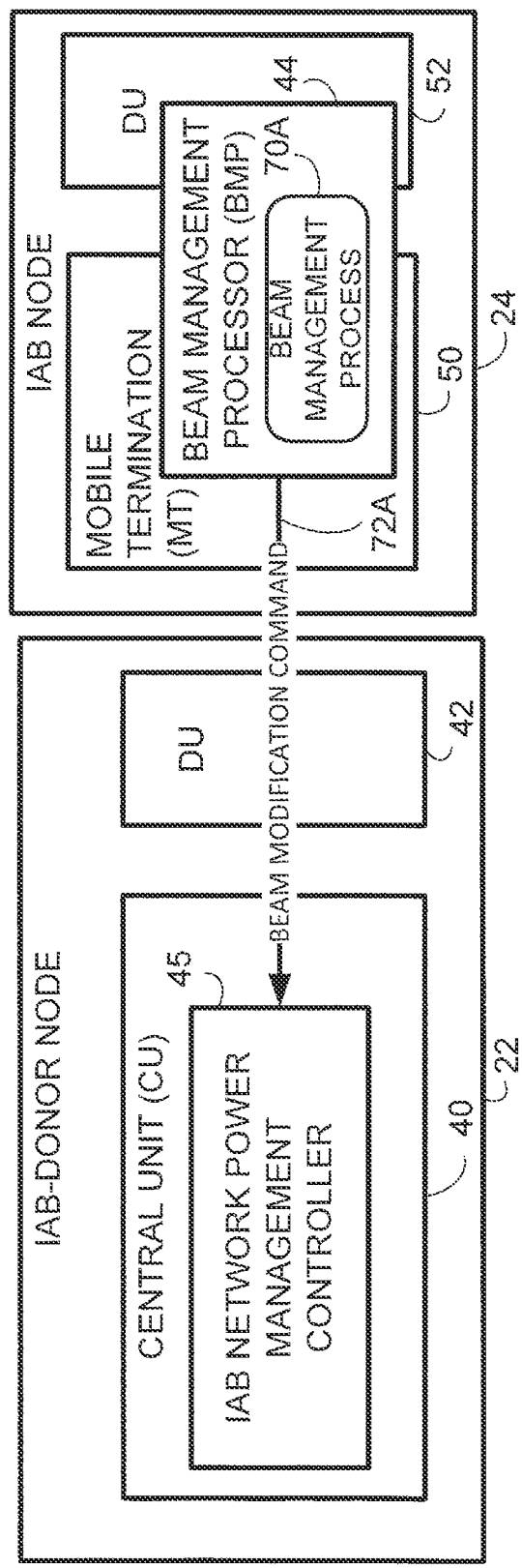
FIG. 2A is a diagrammatic view depicting examples of functional block diagrams for example embodiments and modes of FIG. 1A, FIG. 1B, and FIG. 1C, respectively.

FIG. 2A depicts an example of functional block diagrams for the donor JAB node 22 and the JAB node 24 (see FIG. 1A). The donor JAB node 22 may comprise at least one donor JAB node Central Unit (CU) 40 and at least one donor JAB node Distributed Unit (DU) 42. The Central Unit (CU) 40 is a logical entity managing the donor JAB node Distributed Unit (DU) 42 collocated in the donor JAB node 22 as well as the remote DUs resident in one or more the IAB-nodes. The Central Unit (CU) 40 may also be an interface to the core network 21, behaving as a RAN base station (e.g., eNB or gNB).

In some embodiments, the donor JAB node Distributed Unit (DU) 42 is a logical entity hosting a radio interface (backhaul/access) for other child IAB-nodes and/or UEs. In one configuration, under the control of Central Unit (CU) 40, the Distributed Unit (DU) 42 may offer a physical layer and Layer-2 (L2) protocols (e.g., Medium Access Control (MAC), Radio Link Control (RLC), etc.) while the Central Unit (CU) 40 may manage upper layer protocols (such as Packet Data Convergence Protocol (PDCP), Radio Resource Control (RRC), etc.). As shown in FIG. 2A, the donor JAB node Central Unit (CU) 40 may host or comprise LAB network power management controller 45. The IAB network power management controller 45 may also herein be referred to as "beam controller" 45.

As also shown in FIG. 2A, an IAB node 24 may comprise Mobile-Termination (MT) 50 and Distributed Unit (DU) 52. In some example embodiments the Distributed Unit (DU) 52 may have the same functionality as the Distributed Unit (DU) 42 in the IAB-donor, whereas the Mobile-Termination (MT) 50 may be a UE-like function that terminates the radio interface layers. As an example, the Mobile-Termination (MT) 50 may function to perform at least one of: radio transmission and reception, encoding and decoding, error detection and correction, signaling, and access to a SIM.

The DU may have all or parts of functions of an access node or gNB in FIG. 1A and an MT may have all or parts of functions of a UE. In other words, an access node or gNodeB may be rephrased by a CU and a DU, and the UE may be rephrased as a MT.

B. IAB Network Power Management/Beam Control

In one of its example aspects, the technology disclosed herein concerns control of crosslink interference (CLI) that may occur between beams from different IAB nodes of an IAB network. Examples of crosslink interference (CLI) are understood with reference to FIG. 7A-FIG. 7G described herein. In example embodiments and modes control or management of the crosslink interference (CLI) is accomplished using a crosslink interference controller 44, which may also be referred to as beam management processor (BMP) 44. The beam management processor (BMP) 44 serves to make a determination concerning crosslink interference (CLI) and, in accordance with the determination, to generate a command configured to modify a property of a beam transmitted from the parent node to the IAB node. For example, the beam management processor (BMP) 44 may make a determination concerning crosslink interference (CLI) between (a) a beam transmitted from a parent node to an IAB node and (b) a beam transmitted from the IBA node to a child node of the IAB node. The command is then transmitted via interface circuitry to the IAB network power management controller 45, e.g., beam controller, of the parent node, e.g., of donor or parent IAB node 22. In an example embodiment and mode, the command is generated to modify signal strength of the beam transmitted from the parent node to the IAB node.

In the example embodiment and mode of FIG. 1A and FIG. 2A, the IAB network power management controller 45 comprises the donor TAB node Central Unit (CU) 40 and thus is located at donor or parent IAB node 22. On the other hand, the beam management processor (BMP) 44 may be situated at or comprise an IAB node which is a child node relative to the donor IAB node 22 or any other parent node which hosts the JAB network power management controller 45. For example, FIG. 1A shows beam management processors (BMP) 44 being situated at or comprising IAB nodes 24A, 24B, and 24C. Thus, an IAB node 24 may have a beam management processor (BMP) 44, even thought its parent IAB node also has a beam management processor (BMP) 44. In the FIG. 1A and FIG. 2A example embodiment and mode, the Mobile-Termination (MT) 50 of IAB node 24 serves as the interface circuitry which transmits the command to the parent node, and in particular transmits the command over a wireless interface, e.g., uplink donor backhaul link 33, to donor IAB node 22 for use by JAB network power management controller 45. The command, which is configured to modify the beam of the donor IAB node 22, e.g., the beam modification command, is shown as command 72A in FIG. 2A.

Figure 1B:
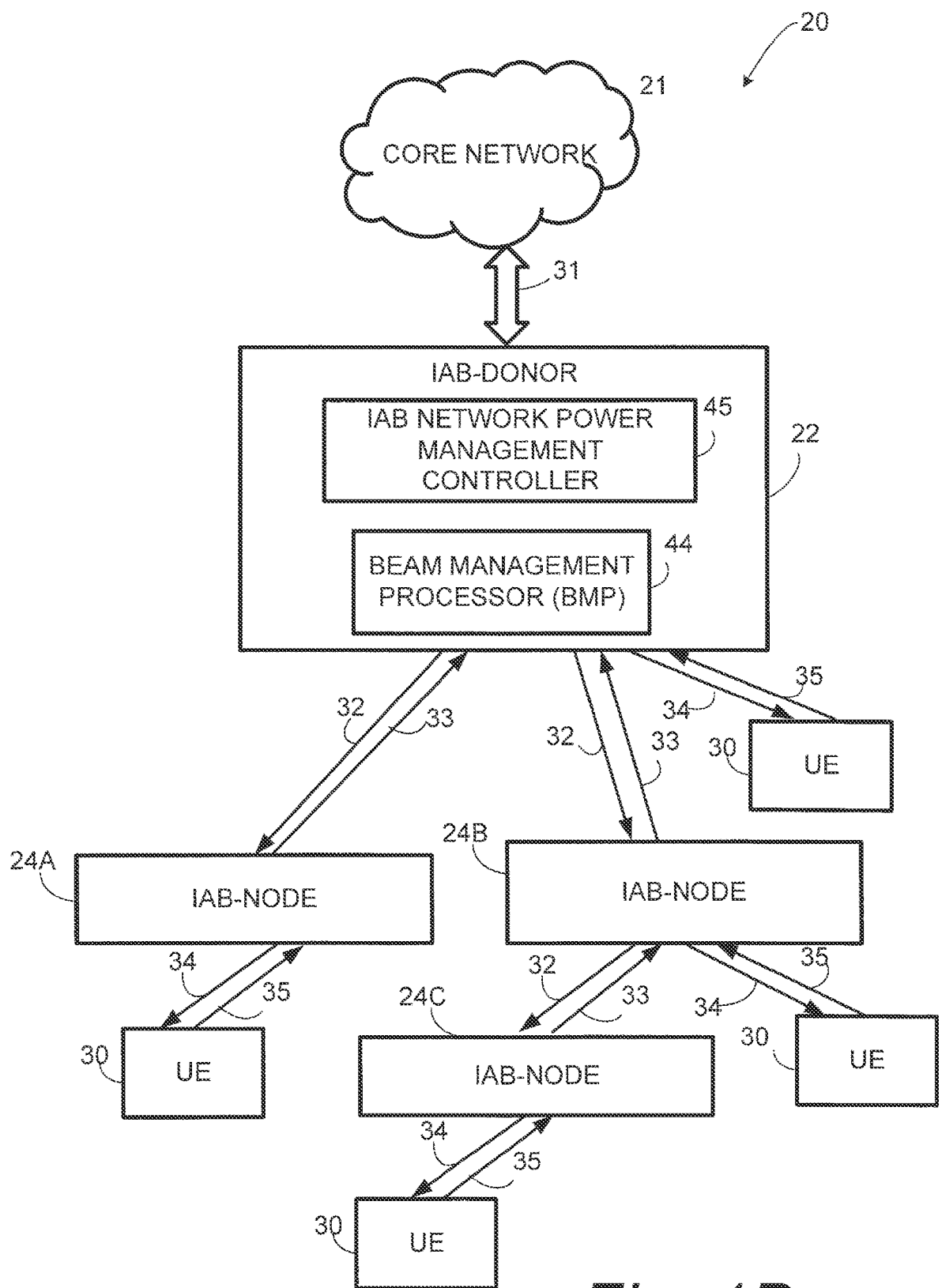
FIG. 1B is a diagrammatic view a mobile network infrastructure using 5G signals and 5G base stations, with FIG. 1A showing a beam management processor (BMP) located at a non-donor JAB node, with FIG. 1B showing a beam management processor (BMP) located at a donor TAB node, and with FIG. 1C showing a TAB network power management controller in an LAB node that is not a donor node.
Figure 2B:
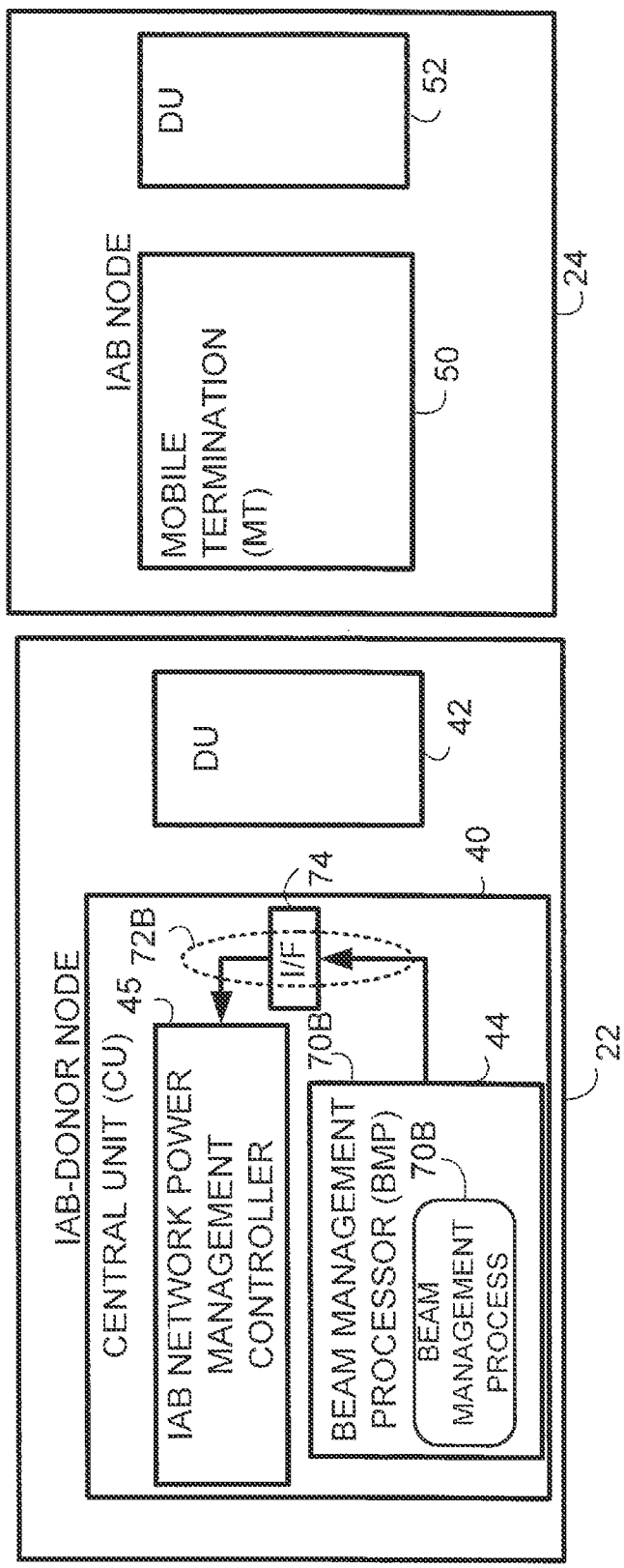
FIG. 2B is a diagrammatic view depicting examples of functional block diagrams for example embodiments and modes of FIG. 1A, FIG. 1B, and FIG. 1C, respectively.

The example embodiment and mode of FIG. 2A and FIG. 2B is identical to the example embodiment and mode of FIG. 1A and FIG. 1B except for the fact that the beam management processor (BMP) 44 is situated at or comprise the donor IAB node 22, i.e., the very JAB node which hosts the JAB network power management controller 45. In the FIG. 2A and FIG. 2B internal circuitry or busses or even the processor circuitry which comprises one or both of the IAB network power management controller 45 and beam management processor (BMP) 44 serves as the interface circuitry, represented as interface circuitry 74 in FIG. 2B, which transmits beam modification command 72B from beam management processor (BMP) 44 to the JAB network power management controller 45 within the donor IAB node 22

Figure 1C:
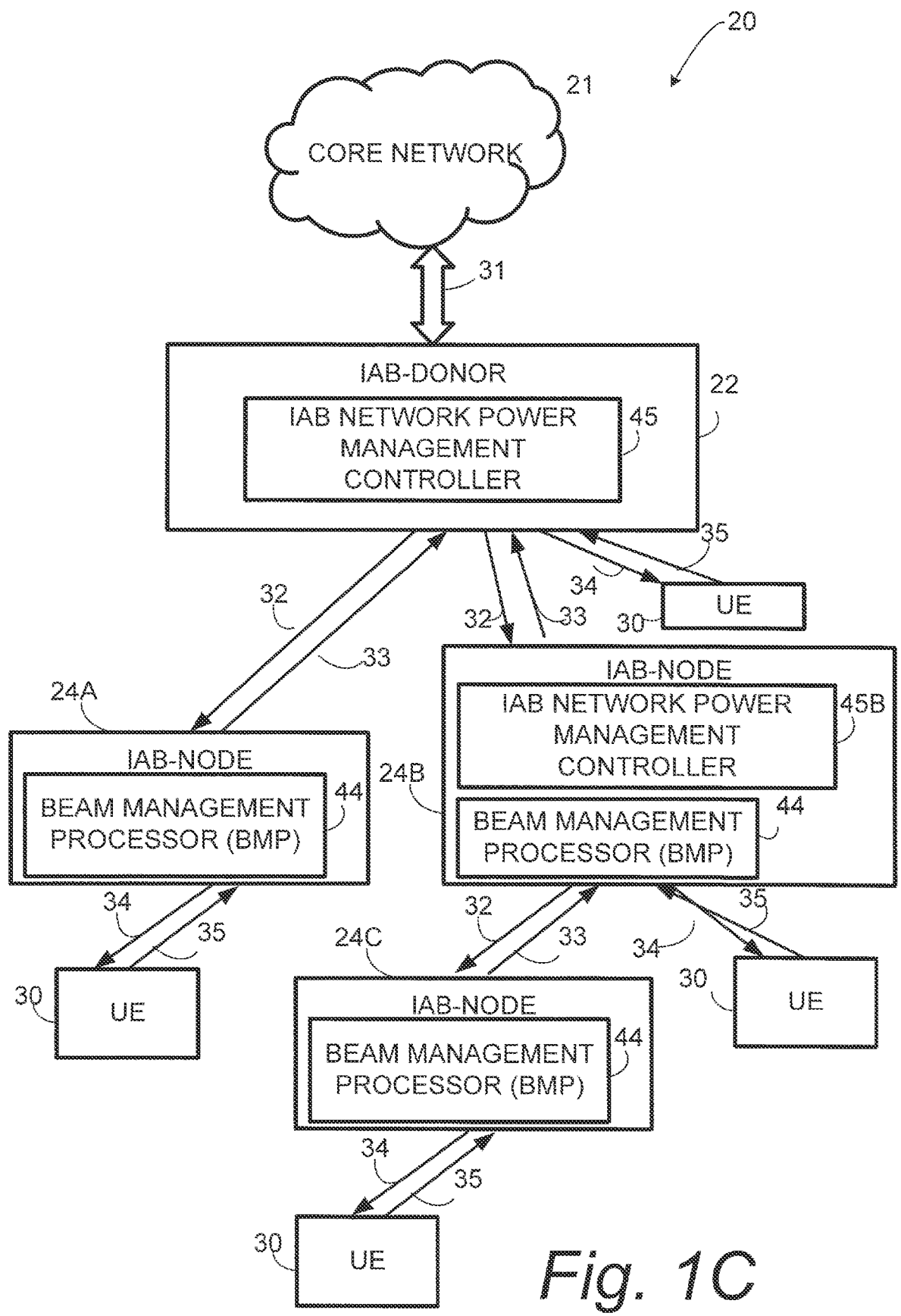
FIG. 1C is a diagrammatic view a mobile network infrastructure using 5G signals and 5G base stations, with FIG. 1A showing a beam management processor (BMP) located at a non-donor TAB node, with FIG. 1B showing a beam management processor (BMP) located at a donor IAB node, and with FIG. 1C showing a IAB network power management controller in an LAB node that is not a donor node.
Figure 2C:
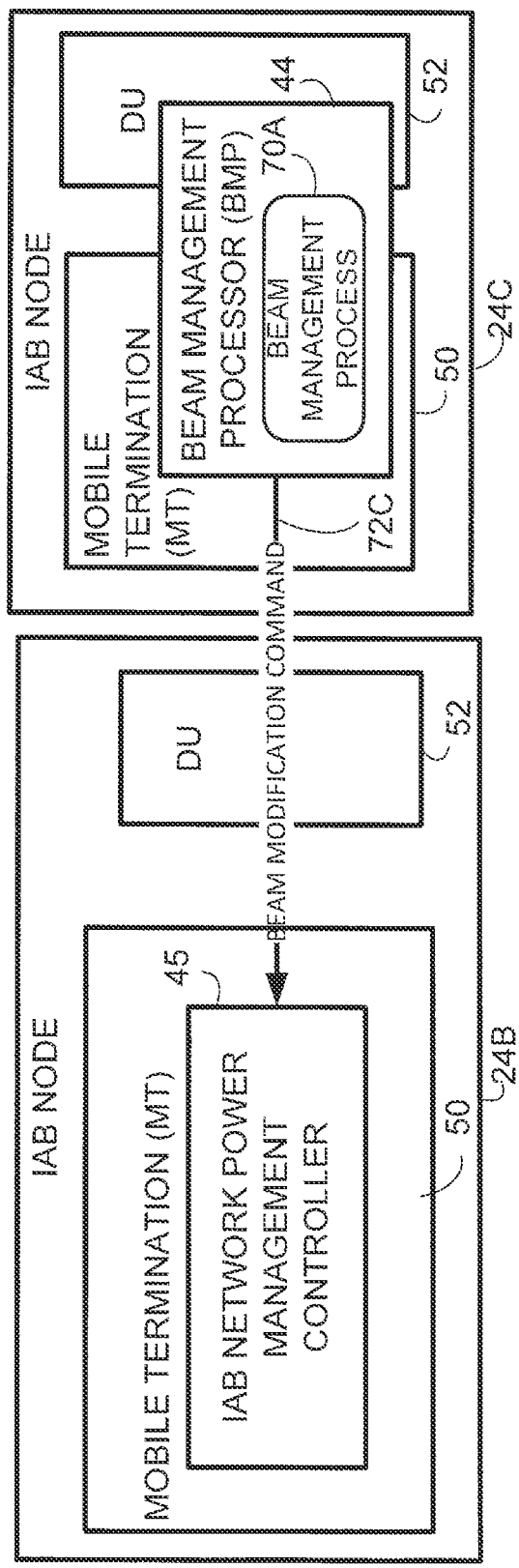
FIG. 2C is a diagrammatic view depicting examples of functional block diagrams for example embodiments and modes of FIG. 1A, FIG. 1B, and FIG. 1C, respectively.

The example embodiment and mode of FIG. 1C and FIG. 2C is identical to the example embodiment and mode of FIG. 1A, with the exception of showing that an JAB node 24, usually in addition to the donor or parent JAB node 22, may host the JAB network power management controller 45. For example, FIG. 1C and FIG. 2C show that JAB node 24B may host JAB network power management controller 45B, which may receive a beam modification command from JAB node 24C. Thus, the JAB network power management controller 45B is in an JAB node 24B which is a parent node to JAB node 24C. A shown only in FIG. 1C, the JAB node 24A may also optionally comprise its own beam management processor (BMP) 44 which communicates with the JAB network power management controller 45 in donor or parent JAB node 22.

Unless otherwise specified or understood from the context, references hereinafter to beam management processor (BMP) 44 and/or to beam modification command 72, are intended to cover all (1) the example embodiment and mode of FIG. 1A, FIG. 2A; (2) the example embodiment and mode of FIG. 1B/FIG. 2B; and (3) the example embodiment and mode of FIG. 1C. Moreover, the beam management processor (BMP) 44 of FIG. 1A and FIG. 2A executes a beam management process 70A; the beam management processor (BMP) 44 of FIG. 1B and FIG. 2B executes a beam management process 70B. The beam management processor (BMP) 44 in IAB node 24C of FIG. 1C and FIG. 2C also executes a beam management process 70 similar to that of FIG. 1A and FIG. 1B. Unless otherwise specified or understood from the context, as used herein "beam management process 70" refers generically to the beam management processes 70A, 70B, and 70C. Moreover, the beam management process 70 executes or cycles through various states such as those shown in FIG. 11 described herein.

Various example implementations of the beam modification command 72 are described herein. In one example implementation, the beam modification command 72 may take the form of or comprise a binary indication, e.g., 1 bit of a power head room (PHR) medium access control (MAC) control element CE) sent by the IAB node to the Parent node to either decrease or increase the Parent node's Tx power by a predetermined amount. Alternately the IAB node could calculate and send to the Parent node a specific value, e.g., requiring multiple bits, by which it requests the Parent node to either increase or decrease its Tx power by the value sent. In this alternate approach, the PHR MAC CE can again be used as the transport mechanism, but instead of using un-used reserved bits, it could send the value in the PH (Type 1, Pcell) field, and allocate one of the Reserved bits (bit 1 or 2) of that octet to indicate to the Parent node that the value in the PH (Type 1, Pcell) field is the target value of the Parent node's Tx power that is servicing the IAB node, and that it is not a PHR report from a UE.

C. Protocol Stack Configurations and Signaling

Embodiments include a mobile network infrastructure where a number of UEs are connected to a set of IAB-nodes and the IAB-nodes are in communication with each other for relay and/or an IAB-donor using the different aspects of the present embodiments. In some embodiments, the UE may communicate with the CU of the IAB-donor on the C-Plane using RRC protocol and in other embodiments, using Service Data Adaptation Protocol (SDAP) and/or Packet Data Convergence Protocol (PDCP) radio protocol architecture for data transport (U-Plane) through NR gNB. In some embodiments, the DU of the IAB-node may communicate with the CU of the IAB-donor using 5G radio network layer signaling protocol: F1 Application Protocol (F1-AP*) which is a wireless backhaul protocol that provides signaling services between the DU of an IAB-node and the CU of an IAB-donor. That is, as further described below, the protocol stack configuration may be interchangeable, and different mechanism may be used.

Figure 3:
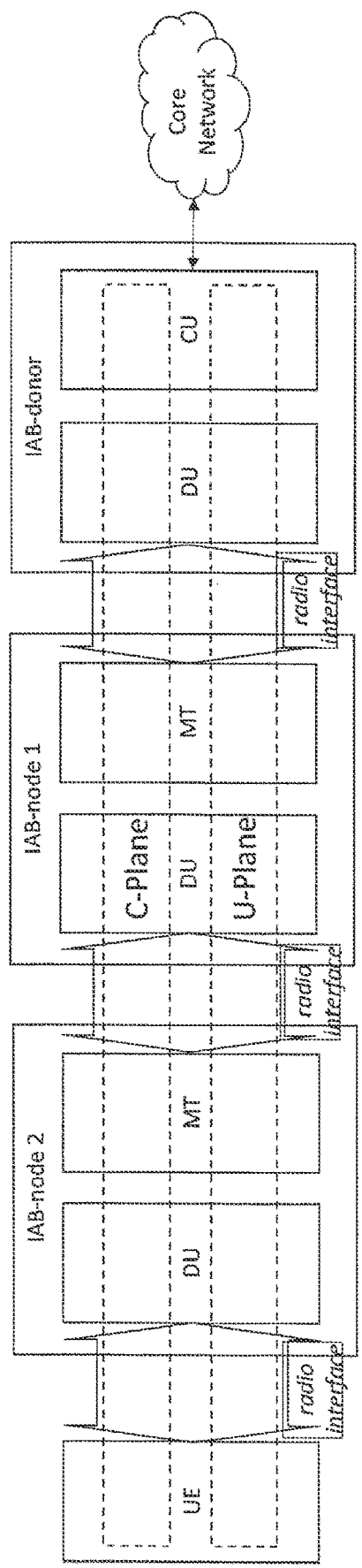
FIG. 3 is a diagrammatic view illustrating Control Plane (C-Plane) and User Plane (U-Plane) protocols among the UE, IAB-nodes, and IAB-donor.

As illustrated by the diagram shown in FIG. 3, the protocols among the UE, IAB-nodes, and IAB donor are grouped into Control Plane (C-Plane) and User Plane (U-Plane). C-Plane carries control signals (signaling data), whereas the U-Plane carries user data. FIG. 3 shows an example of the embodiment where there are two IAB-nodes, IAB-node 1 and IAB-node 2, between the UE and the IAB-donor (two hops). Other embodiments may comprise a network with a single hop or multiple hops where there may be more than two IAB-nodes present.

Figure 4:
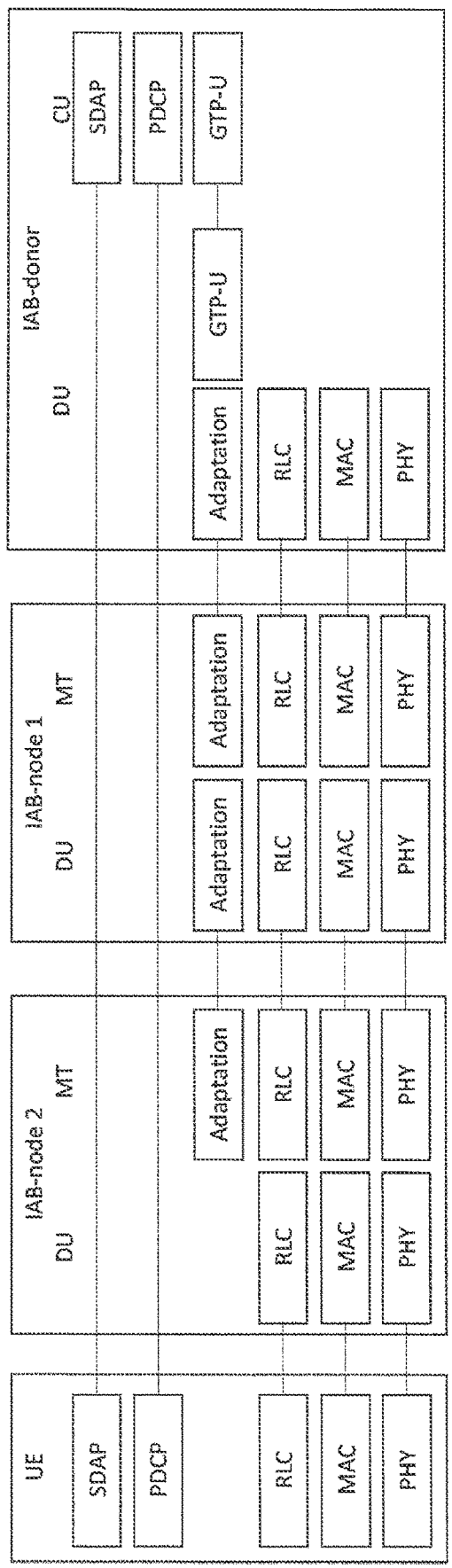
FIG. 4 is a functional block diagram of an example protocol stack configuration for the U-Plane.

FIG. 4 depicts a functional block diagram of an example protocol stack configuration for the U-Plane, the stack comprising Service Data Protocol (e.g., SDAP, 3GPP TS 38.324) which may carry user data (e.g., via IP packets). In one embodiment, the SDAP runs on top of PDCP (3GPP TS 38.323) and the L2/Physical layers. In one embodiment, an Adaptation Layer is introduced between the IAB-node and the IAB-node/donor, where the Adaptation Layer carries relay-specific information, such as IAB-node/donor addresses, QoS information, UE identifiers, and potentially other information. In this embodiment, RLC (3GPP TS 38.322) may provide reliable transmission in a hop-by-hop manner while PDCP may perform end-to-end (UE-CU) error recovery. GTP-U (GPRS Tunneling Protocol User Plane) may be used for routing user data between CU and DU inside the IAB-donor.

Figure 5A:
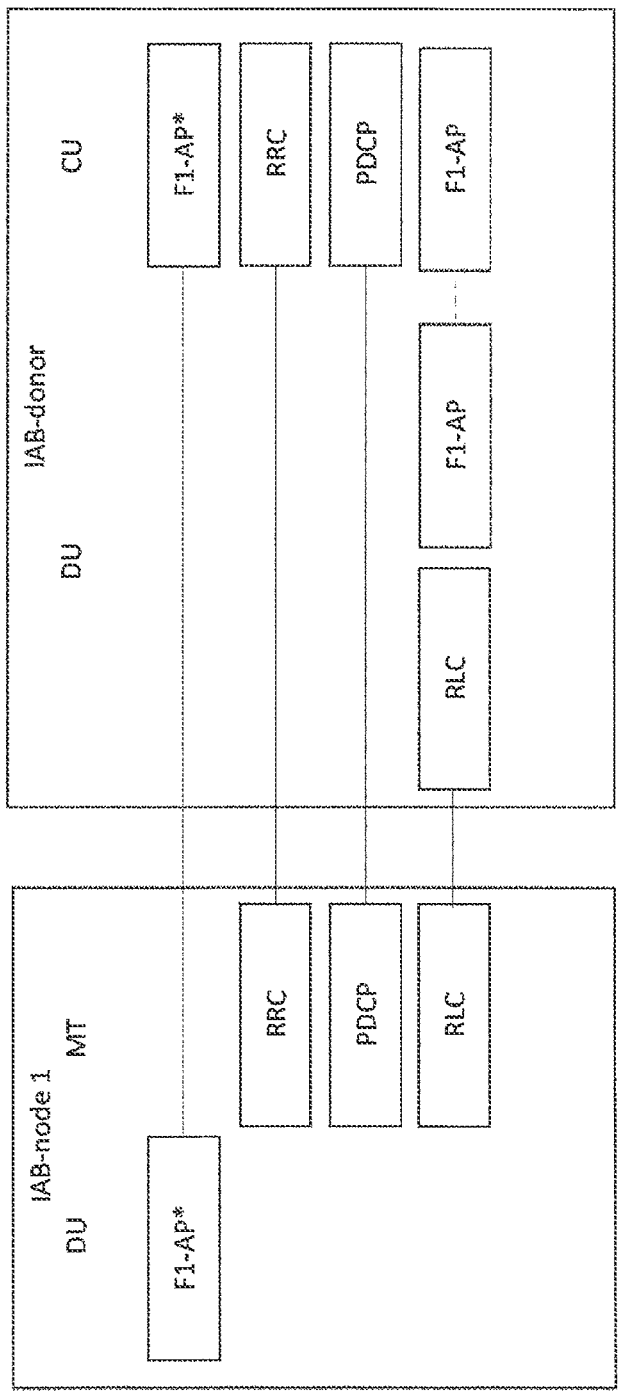
FIG. 5A depicts a functional block diagram of an example protocol stack configuration for the C-Plane between an IAB-node connected to an IAB-donor.

FIG. 5A is a functional block diagram of an example protocol stack configuration for the C-Plane between an IAB-node (IAB-node 1) directly connected to the IAB-donor (via a single hop). In this embodiment, the MT component of IAB-node 1 may establish an RRC connection with the CU component of the IAB-donor. In parallel, RRC may be used for carrying another signaling protocol in order for CU/IAB-donor to control the DU component resident in the IAB-node 1. In one embodiment, such a signaling protocol may be referred to as F1 Application Protocol* (F1-AP*), either the protocol referred as F1-AP specified in 3GPP TS 38.473 or a protocol based on the F1-AP with potential extended features to accommodate wireless backhauls (the original F1-AP is designed for wirelines). In other embodiments, F1-AP may be used for CU-DU connection inside the IAB-donor. It is assumed that below RLC, MAC/PHY layers are shared with the U-Plane.

Figure 5B:
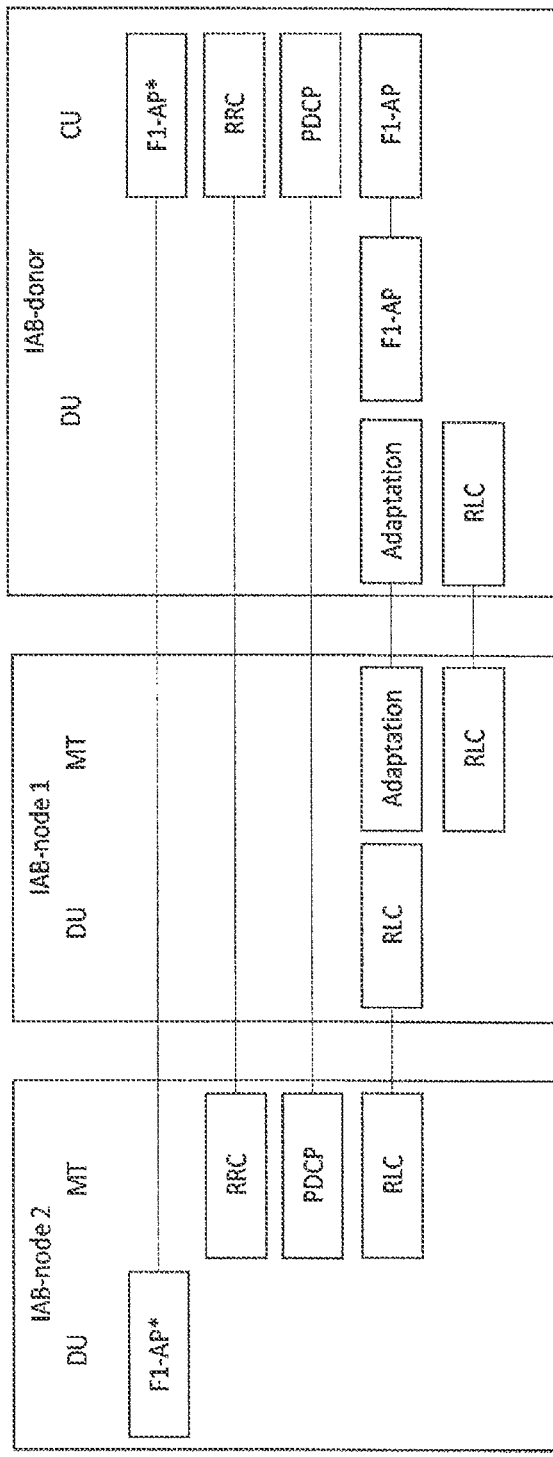
FIG. 5B depicts a functional block diagram of an example configuration of the C-Plane protocol stack for an IAB-node connected to another IAB-node which is connected to an IAB-donor.

FIG. 5B depicts a functional block diagram of an example configuration of the C-Plane protocol stack for IAB-node 2, an IAB-node connected to the aforementioned IAB-node 1 (2 hops). In one embodiment, it may be assumed that the IAB-node 1 has already established RRC/F1-AP* connections with the IAB-donor as shown in FIG. 5A. In IAB-node 1 the signaling bearer for IAB-node 2 RRC/PDCP may be carried by the Adaptation Layer to the IAB-donor. Similar to FIG. 5A, the F1-AP* signaling is carried by the RRC of IAB-node 2.

Figure 5C:
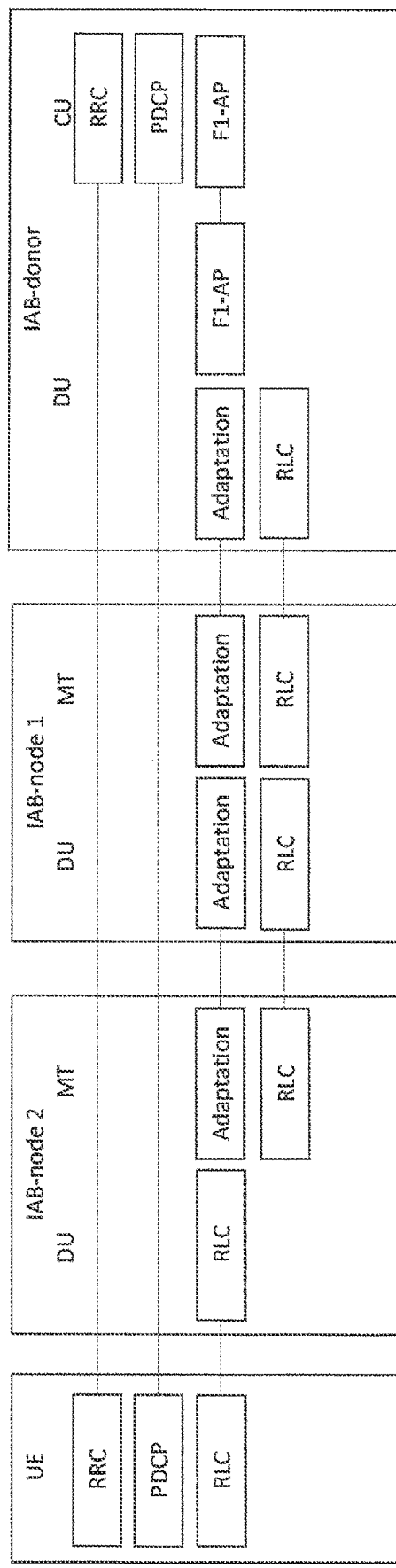
FIG. 5C depicts a functional block diagram of an example configuration of the C-Plane protocol stack for a UE's RRC signaling.

FIG. 5C depicts yet another functional block diagram of an example configuration of the C-Plane protocol stack for UE's RRC signaling under the 2-hop relay configuration shown in FIG. 5B. Accordingly, the UE having an MT component and functionality, via the C-Plane, may be connected to the CU of the IAB-donor. Though traffic is routed through IAB-node 2 and IAB-node 1, as depicted, the two nodes are passive nodes in that the data is passed to the next node(s) without manipulation. That is, data is transmitted by the UE to the node it is connected to, e.g., IAB-node 2, and then IAB-node 2 transmits the data to the node that is connected to, e.g., IAB-node 1, and then IAB-node 1 transmits the data (without manipulation) to the IAB-donor.

FIGS. 5A, 5B, and 5C illustrate that the MT of each IAB-node or UE has its own end-to-end RRC connection with the CU of the IAB-donor. Likewise, the DU of each IAB-node has an end-to-end F1-AP* connection with the CU of the IAB-donor. Any IAB nodes present between such end points transparently convey RRC or F1-AP signaling traffic.

Figure 6A:
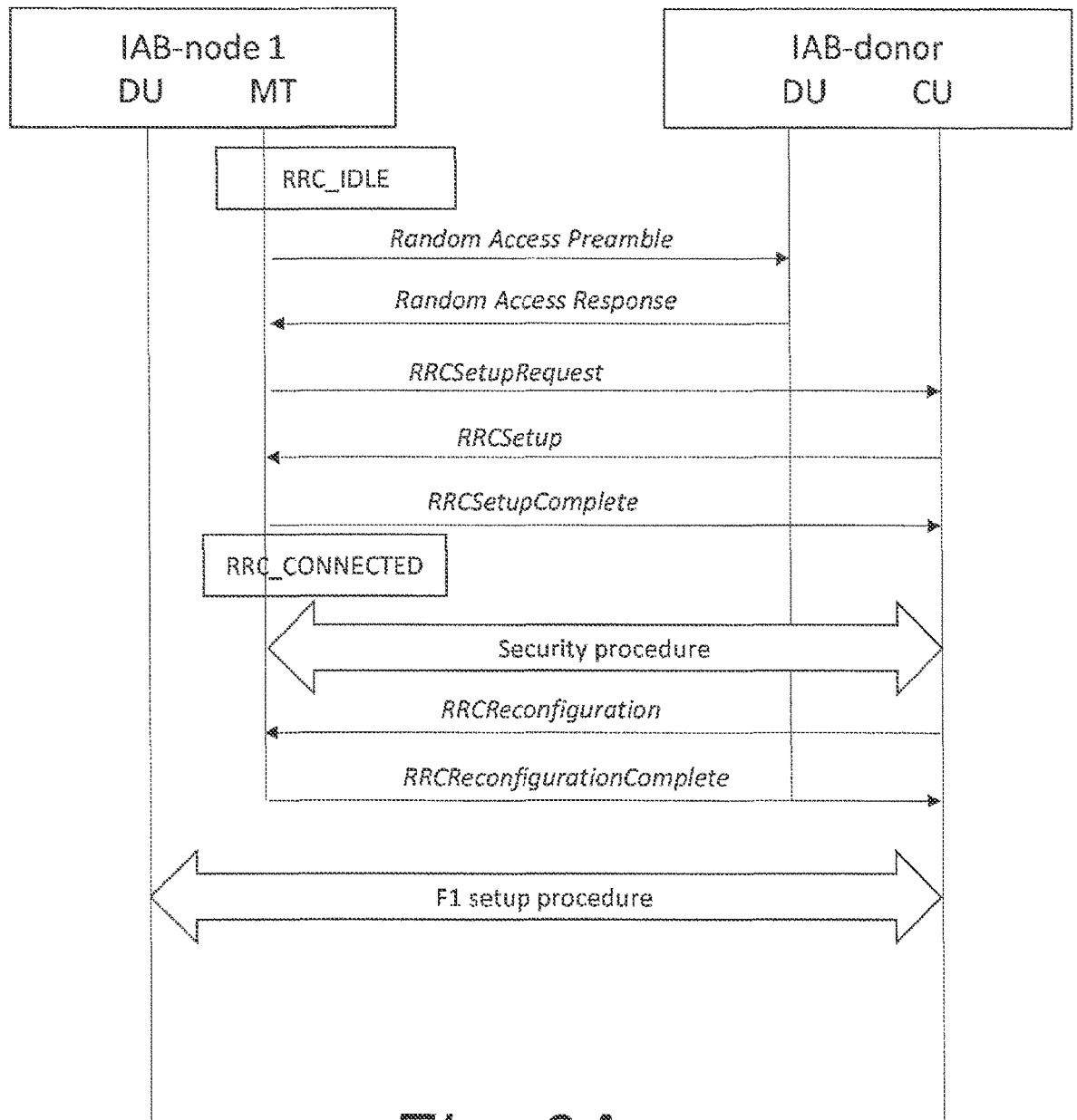
FIG. 6A depicts an example message sequence for an IAB-node to establish an RRC connection, followed by F1-AP* connection.
Figure 6B:
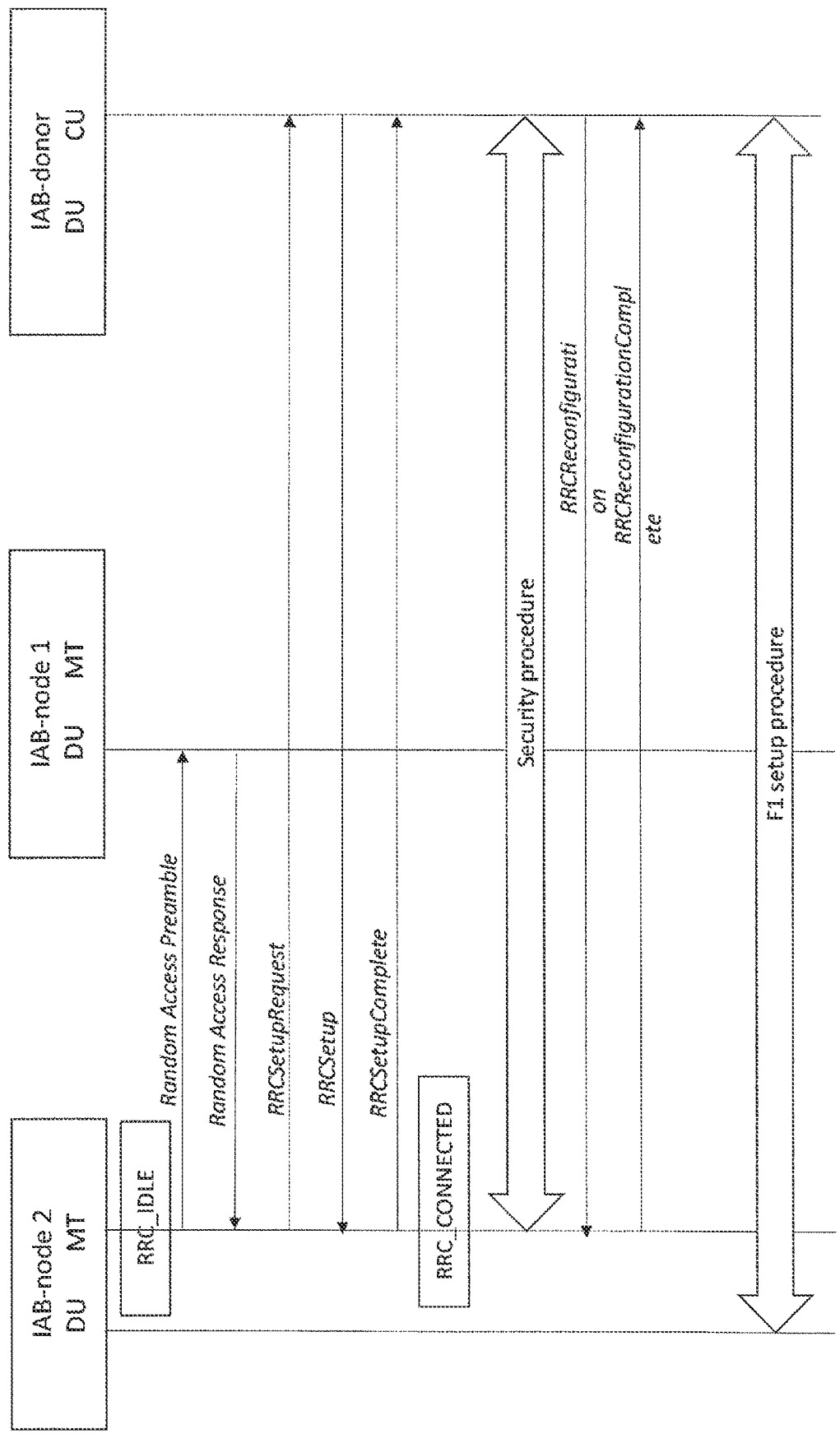
FIG. 6B depicts an example message sequence for IAB-node to establish an RRC connection with an IAB-donor, followed by the F1 setup procedure.

FIGS. 6A and 6B are diagrams of an example flow of information transmit/receive and/or processing by IAB-node(s) and an IAB-donor according to aspects of the present embodiments.

FIG. 6A depicts an example message sequence for IAB-node 1 to establish an RRC connection, followed by F1-AP* connection. It is assumed that IAB-node 1 has been pre-configured (or configured by the network) with information that instructs how to select a cell served by the IAB-donor. As shown in the figure, IAB-node 1-in an idle state (RRC_IDLE)-may initiate an RRC connection establishment procedure by sending Random Access Preamble to the IAB-donor, which may be received and processed by the DU of the IAB-donor. Upon successful reception of Random Access Response from the IAB-donor, IAB-node 1 may send a RRCSetupRequest, followed by reception of an RRCSetup and transmission of RRCSetupComplete. At this point of the message sequence, the IAB-node 1 may enter a connected state (RRC_CONNECTED) with the IAB-donor, and may proceed with a security procedure to configure encryption/integrity protection features. The CU of the IAB-donor may further send an RRCReconfiguration to IAB-node 1, which may comprise configuration parameters to configure radio bearers (e.g., data radio bearers (DRBs) and signaling radio bearers (SRBs)). In some embodiments, the RRCReconfiguration is sent to modify an RRC connection and establish Radio Connection between a UE and the network, however, in the present embodiment, the RRCReconfiguration may also be sent to configure a connection between an IAB-node and the network. RRC Connection Reconfiguration messages may be used to, for example, establish/modify/release Radio Bearers, and/or perform handover, etc. In one embodiment, any of the RRC messages transmitted from IAB-node 1 may include information identifying the IAB-node 1 as an IAB-node (not as a UE). For example, the Donor CU may be configured with a list of node identities (e.g., IMSI or S-TMSI) that may be allowed to use the service from the donor. The information may be used by the CU in the subsequence operations, for example, to distinguish a UE from an IAB-node.

As described above, following the RRC connection establishment procedure, the DU of IAB-node 1 and IAB-donor may proceed with F1 setup procedure using the F1-AP* protocol, which may activate one or more cells served by the DU of IAB-node 1-thereby allowing other IAB nodes and/or UEs to camp on the cell. In this procedure, the Adaptation Layer for IAB-node 1 and IAB-donor may be configured and activated as well.

FIG. 6B depicts an example message sequence or flow of information for IAB-node 2 to establish an RRC connection with IAB-donor, followed by the F1 setup procedure. It is assumed in this embodiment that LAB-node 1 has already performed the process disclosed in FIG. 6A to establish an RRC and F1-AP* connection. Referring back to FIG. 3, the IAB-node 2 shown in communication via the radio interface with IAB-node 1, may be also depicted in FIG. 6B as a child node of LAB-node 1 according to aspects of the present embodiments.

As noted above, e.g., with reference to FIG. 2A, FIG. 2B, and FIG. 2C, each IAB-node hosts two New Radio (NR) functions: (i) a Mobile Termination (MT), used to maintain the wireless backhaul connection towards an up-stream IAB-node or LAB-donor, and (ii) a Distributed Unit (DU), to provide access connection to the UEs or the downstream UEs of other IAB-nodes. The DU connects to a CU hosted by the IAB-donor by means of the NR F1-AP* protocol running over the wireless backhaul link.

The donor IAB node Central Unit (CU) 40 at the IAB-donor 22 holds all the control and upper layer functionalities, while the lower layer operations are delegated to the DUs located at the IAB-nodes 24. The split happens at the Radio Link Control (RLC) layer, therefore Radio Resource Control (RRC), Service Data Adaptation Protocol (SDAP) and Packet Data Convergence Protocol (PDCP) layers reside in the CU, while RLC, MAC and PHY are hosted by the DUs. The Adaptation Layer is added on top of RLC, which routes the data across the IAB network topology, hence enabling the end-to-end connection between DUs and the CU.

For 3GPP Rel-16 in-band IAB operations, the need to multiplex both the access and the backhaul traffic within the same frequency band, i.e. the access and the backhaul traffic carried over the same frequency band, with minimal impact to existing specifications resulted in a specification that uses half-duplex operations. Half duplex means that the IAB node cannot support simultaneous Tx/Rx. Therefore, the radio resources are orthogonally partitioned between the access and the backhaul in time (Time Division Multiplexing (TDM)).

However, for Rel-17 multiplexing of the access and the backhaul links in frequency (Frequency Division Multiplexing (FDM)), or space (Space Division Multiplexing (SDM)) are considered, as they would allow an JAB node, in the case of SDM/FDM Tx, to simultaneously transmit in the DL to access UE and/or child node and transmit in the UL to parent node, and in the case of SDM/FDM Rx, an IAB node can simultaneously receive in the DL from parent node and receive in the UL from access UE and/or child node.

In addition, Rel-17 will consider full duplex of FDM or SDM, which means that an IAB node can simultaneously transmit in the DL to access UE and/or child node and receive in the DL from parent node for backhaul or an IAB node can simultaneously transmit in the UL to the parent node for backhaul and receive in the UL for access to UE and/or child node, thus providing enhanced throughput.

In either case of half or full duplex, using a centralized or de-centralized scheduling coordination mechanism across the IAB-nodes and the IAB-donor is expected.

D. Signal Beam and Signal Beam Angle

The millimeter wave (mmWave) frequencies, also known as frequency range 2 or "FR2" in 3GPP terms, offer the availability of huge bandwidths. However, mmWave links are highly susceptible to rapid channel variations and suffer from severe freespace pathloss and atmospheric absorption. To address these challenges, NR networks provide a set of mechanisms by which UEs and gNs establish highly directional transmission links, also known as Transmit Beams or Tx Beams, typically using high-dimensional phased arrays, to benefit from the resulting beamforming gain and sustain an acceptable communication quality. Directional links, however, require fine alignment of the transmitter beams, achieved through a set of operations known as beam management. Beam management is fundamental to Initial Access, e.g., establishing a UE connection with a gNB, and Beam Tracking, e.g., beam adaptation schemes.

Details on how the gNB and UE select and maintain a specific Tx Beam we not covered here in detail, but in general beam management during the connected states encompasses the following:

A gNB transmits a specific reference signal for each of multiple beams.

Each of the multiple beams have a different spatial and time aspects.

For the beams that the UE can detect a signal, it performs some measurement on the beam's signal, and sends feedback to the gNB including information about the reference signal specific to each beam.

The gNB evaluate the quality of the reference signal from each of the multiple beams received by the UE and chose the best one.

Figure 7A:
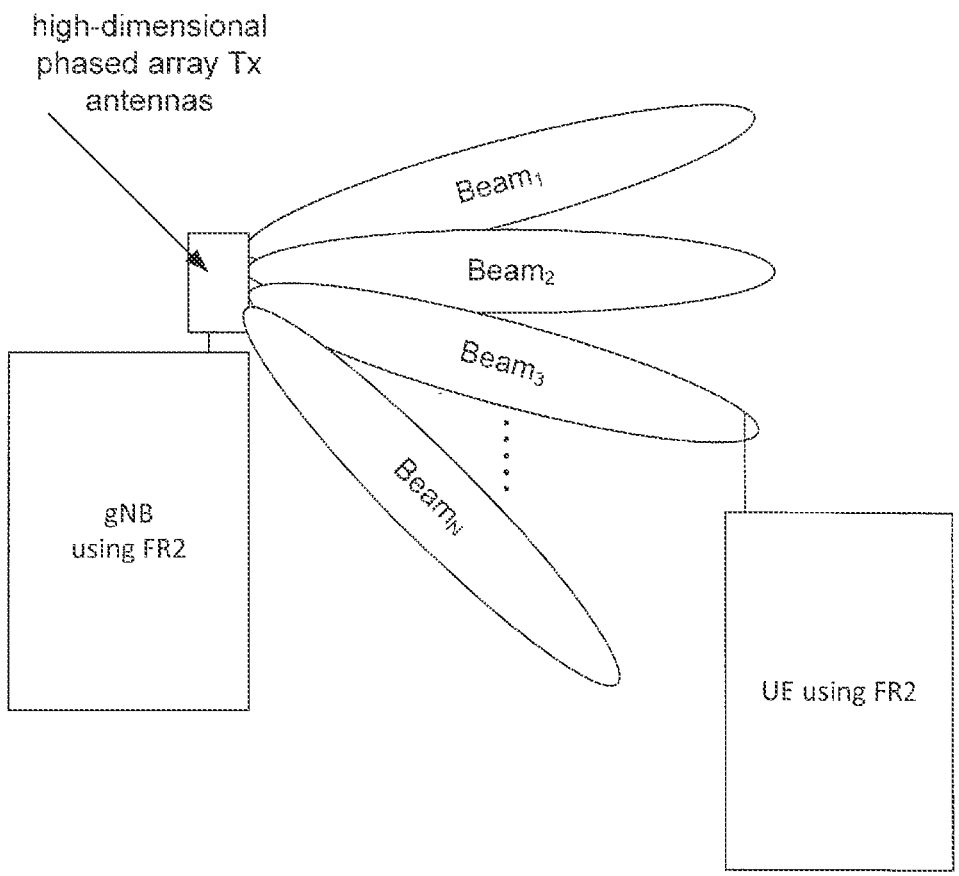
FIG. 7A is a diagrammatic view depicting various examples of beam transmission in a communications network with wireless backhaul.

FIG. 7A shows a gNB using a specific Tx Beam out of N potential Tx Beams, to use as an access link at a UE, i.e. Beams.

As noted above, Rel-17 will consider full duplex Tx and Rx schemes, which means that an IAB node can simultaneously transmit in the DL to access UE and/or child node and receive in the DL from parent node for backhaul, or an IAB node can simultaneously transmit in the UL to the Parent node for backhaul and receive in the UL for access to UE and/or child node. Such simultaneous transmissions may result in Cross Link Interference (CLI) between Parent nodes and Child nodes.

Due to the nature of wireless communications, the wireless links are subject to deterioration or failure at any time. As such, there is a need for a process to monitor state, and manage the resources, of the Tx Beams. According to one of its example aspects, the technology disclosed herein provides beam management processor (BMP) 44 which is configured and employed to detect and mitigate and manage the condition when the Tx Beams of a Parent node and IAB node (frequency reuse=1) align each that a condition of CLI may exist. Specifically, the beam management processor (BMP) 44 may execute a beam management process 70 which:

1. Detects that a Child node connected to an IAB node is at a location that is covered by or nearly covered by a Tx Beam that the TAB node's Parent node is using to communicate with the TAB node.
2. Determines if that Child node is impacted by CLI from the Parent node's Tx Beam, while taking into account RF parameters specific to the type of Child node, e.g. a Child node in the IAB network or a UE in an access network, when making a determination of the CLI impact.
3. Determines if a decrease in the transmission power for the downlink backhaul link between the Parent node and the TAB node can be realized that may reduce the interference to the access link used by the IAB node and Child node and yet maintain acceptable throughput and QoS on the backhaul link used by the Parent node and IAB node. And, if such a determination is made, the processor requests that the Parent node reduce its transmission power on the backhaul link between the Parent node and IAB node.
4. Determines if an increase in the transmission power for the downlink backhaul link between the Parent node and the IAB node can be realized that may provide a benefit to the IAB node or its cells via an increase in throughput with the Parent node, and that an increase in the transmission power for the backhaul link between the Parent node and the IAB node will not cause the Child nodes or its cells to be significantly impacted by CLI from the Parent node's transmission. And, if such a determination is made, the processor requests that the Parent node increase its transmission power on the backhaul link between the Parent node and IAB node.
5. Finds a power transmission threshold for the backhaul link that balances the two aspects above (minimizing Parent node transmission power for the benefit of reducing interference upon Child node and maximizing Parent node transmission power for the benefit of DL throughput from Parent node to IAB node).

Figure 7B:
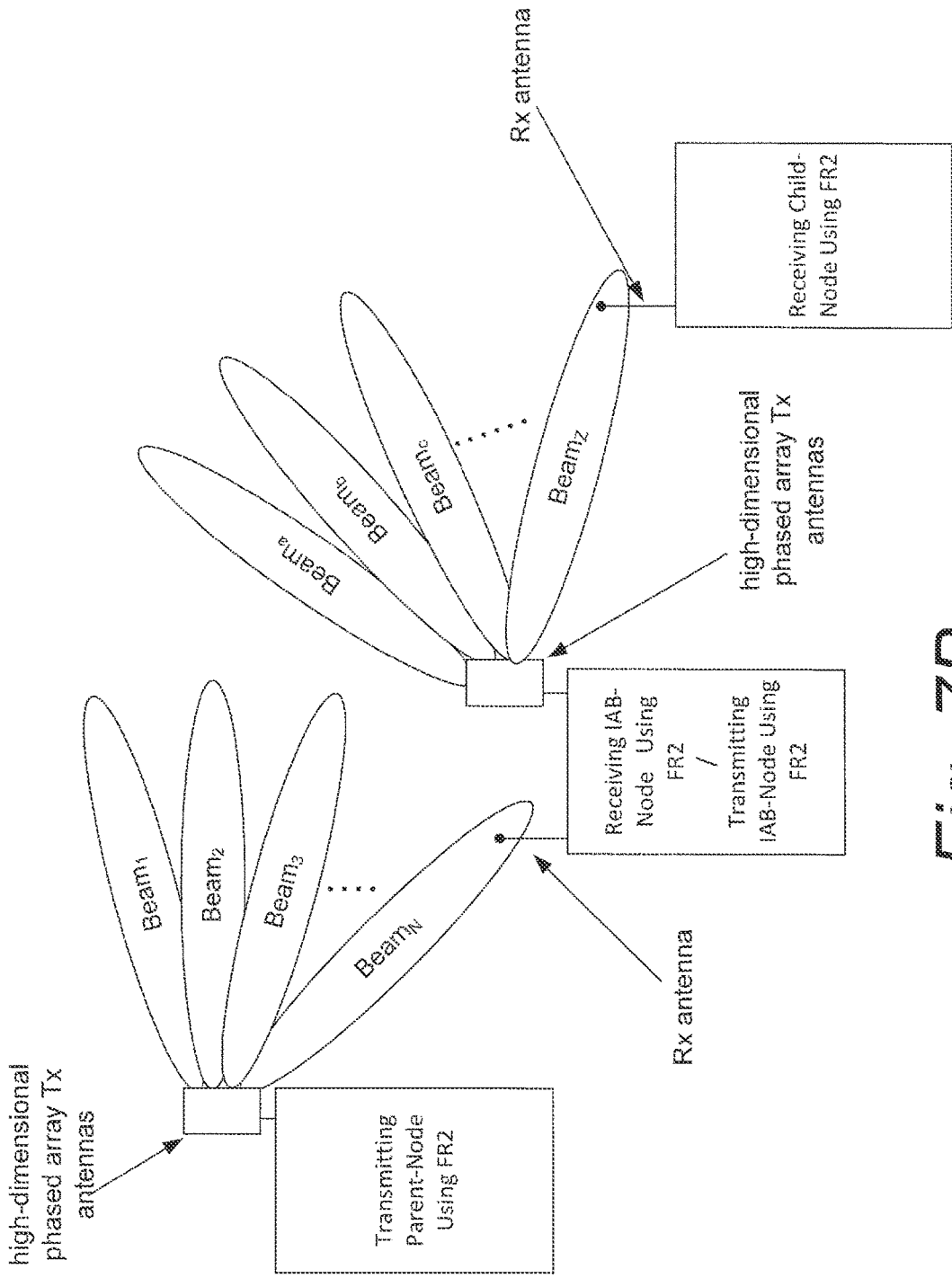
FIG. 7B is a diagrammatic view depicting various examples of beam transmission in a communications network with wireless backhaul.

FIG. 7B shows an IAB node using a Tx Beam as the access link to a UE (i.e. $Beam_Z$), and a Parent node using a Tx Beam as a backhaul link to an IAB node (i.e. $Beam_N$). Not shown is the access network belonging to the IAB nodes, but from the foregoing, the behavior should be well understood by those skilled in the art.

Figure 7C:
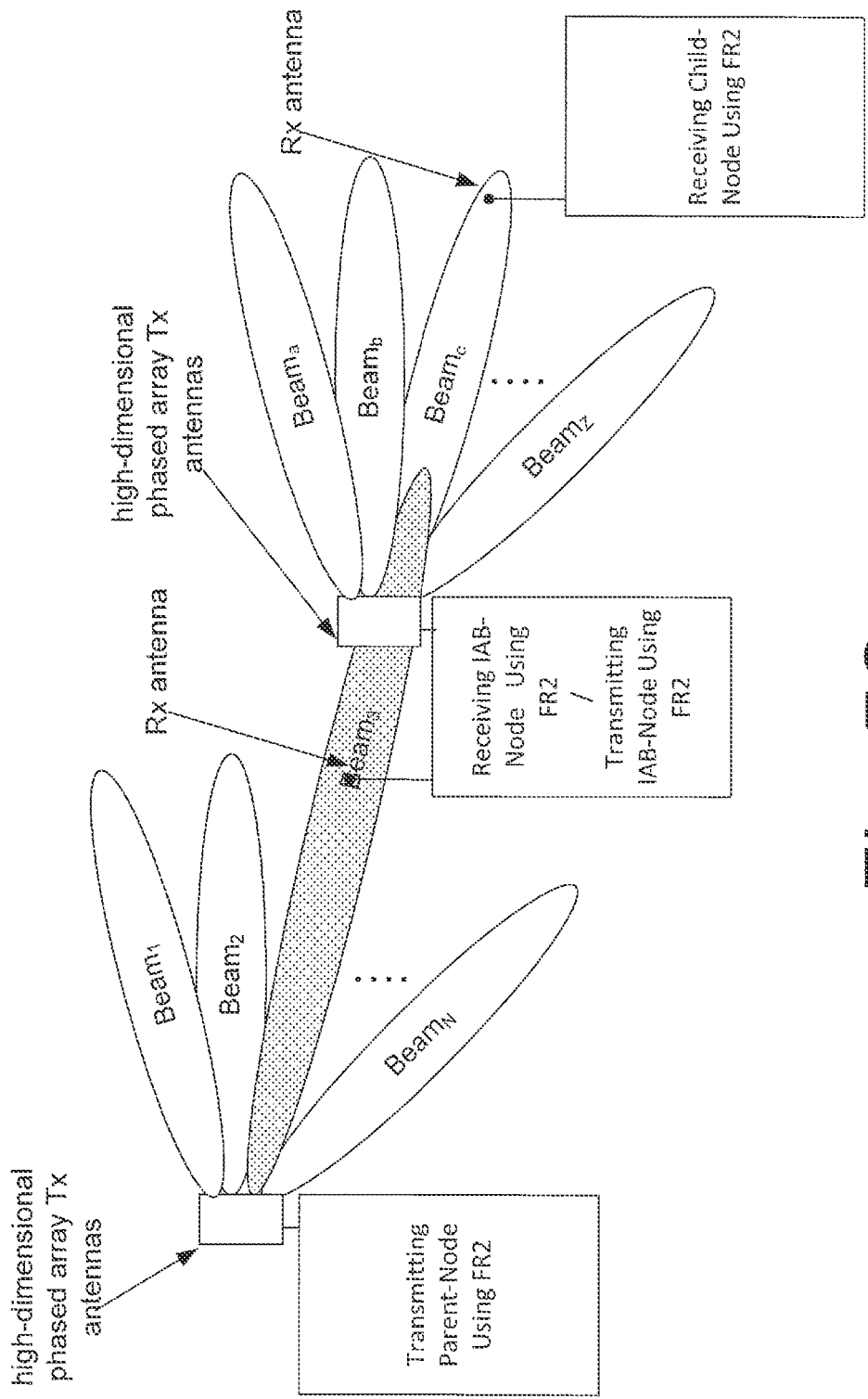
FIG. 7C is a diagrammatic view depicting various examples of beam transmission in a communications network with wireless backhaul.

FIG. 7C shows an IAB node using a Tx Beam as the access link to a Child node's MT (i.e. $Beam_c$), and a Parent node using a Tx Beam as a backhaul link to an IAB node (i.e. $Beam_3$), and that the Tx Beam of the Parent node aligns with a Tx Beam of the IAB node, and that the Tx Beam of the Parent node is sufficiently strong to cover some of the same area as the Tx Beam of the IAB node, i.e. $Beam_c$ and $Beam_3$ Align in their coverage area.

Figure 7D:
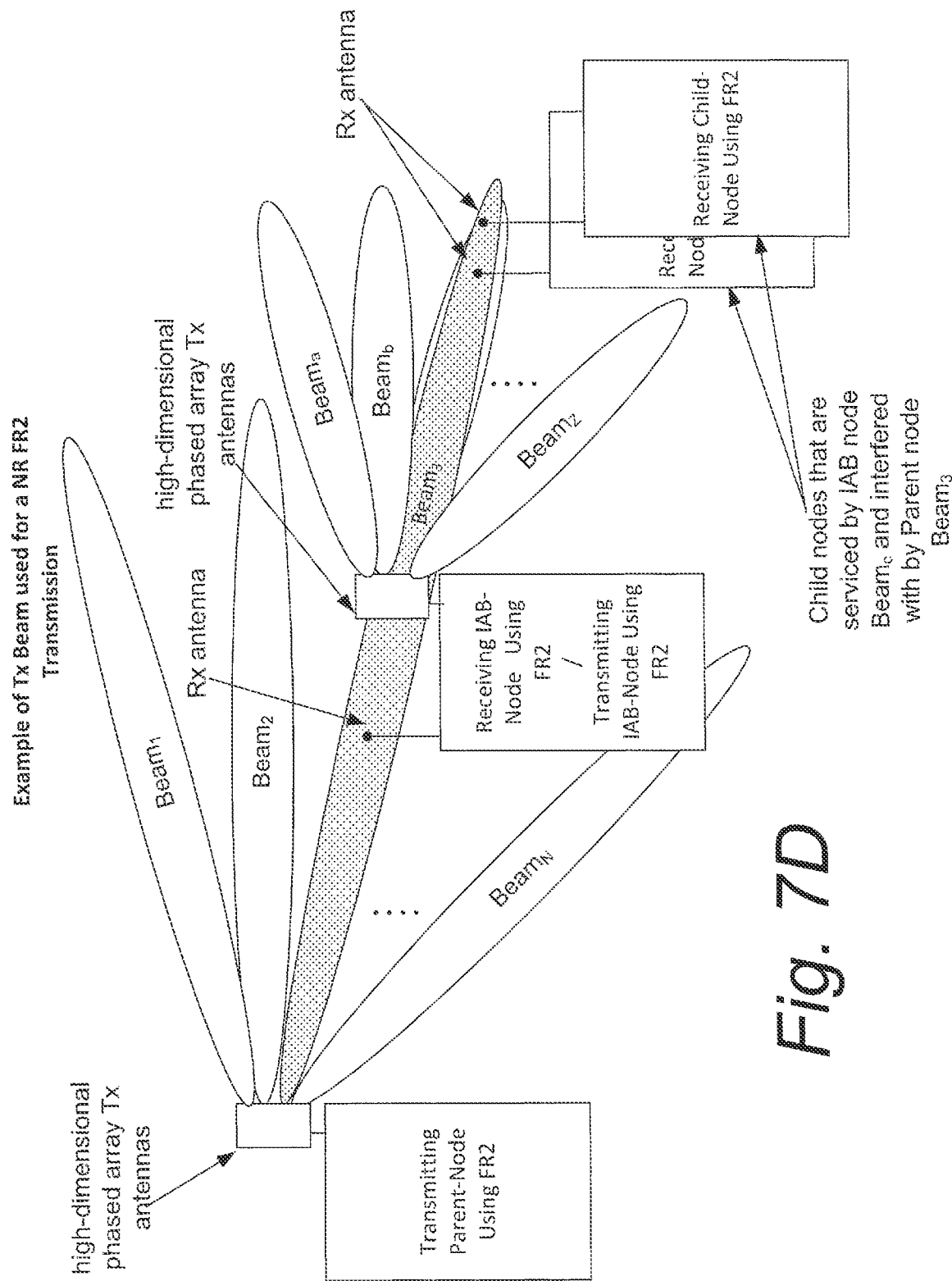
FIG. 7D is a diagrammatic view depicting various examples of beam transmission in a communications network with wireless backhaul.

FIG. 7D shows an IAB node using a Tx Beam as the access link to for Child node MTs, i.e. $Beam_c$, and a Parent node using a Tx Beam as a backhaul link to an IAB node (i.e. $Beam_3$), and that the Tx Beam of the Parent node aligns with a Tx Beam the IAB node, and that the Tx Beam of the Parent node is sufficiently strong to provide coverage to some of the same area as the Tx Beam of the IAB node, and both links cover the UEs, and as such the UEs may experience CLI by $Beam_3$ on its reception of $Beam_c$. In fact, the labeling for $Beam_c$ cannot be seen in FIG. 7D in view of the substantial overlap thereof by $Beam_3$.

Figure 7E:
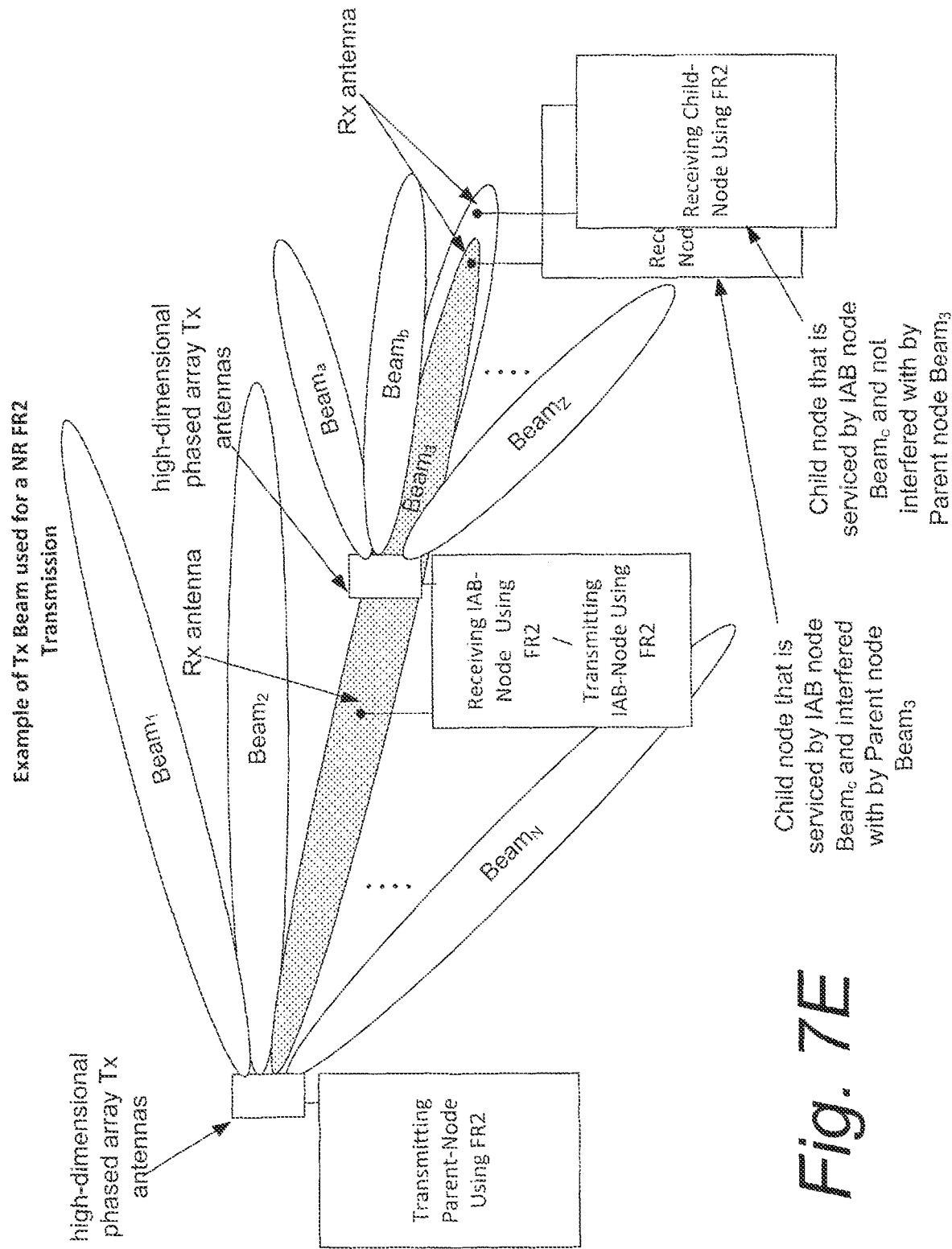
FIG. 7E is a diagrammatic view depicting various examples of beam transmission in a communications network with wireless backhaul.

FIG. 7E shows the result of one step of the Beam Management Process that reduces the coverage area of the Parent node's Tx $Beam_3$, e.g., reducing Beam, Tx power, such that Tx $Beam_3$ Aligns with the IAB node's $Beam_c$ is reduced to the extent that $Beam_3$ no longer causes CLI on a $1^{st}$ Child node's reception of $Beam_c$. However, the signal strength of $Beam_3$ may remain sufficiently strong such that the $2^{nd}$ Child node may still experience CLI by $Beam_3$ on its reception of $Beam_c$. Like in FIG. 7D, in FIG. 7E the labeling for $Beam_4$, cannot be in view of the substantial overlap thereof by $Beam_3$.

Figure 7F:
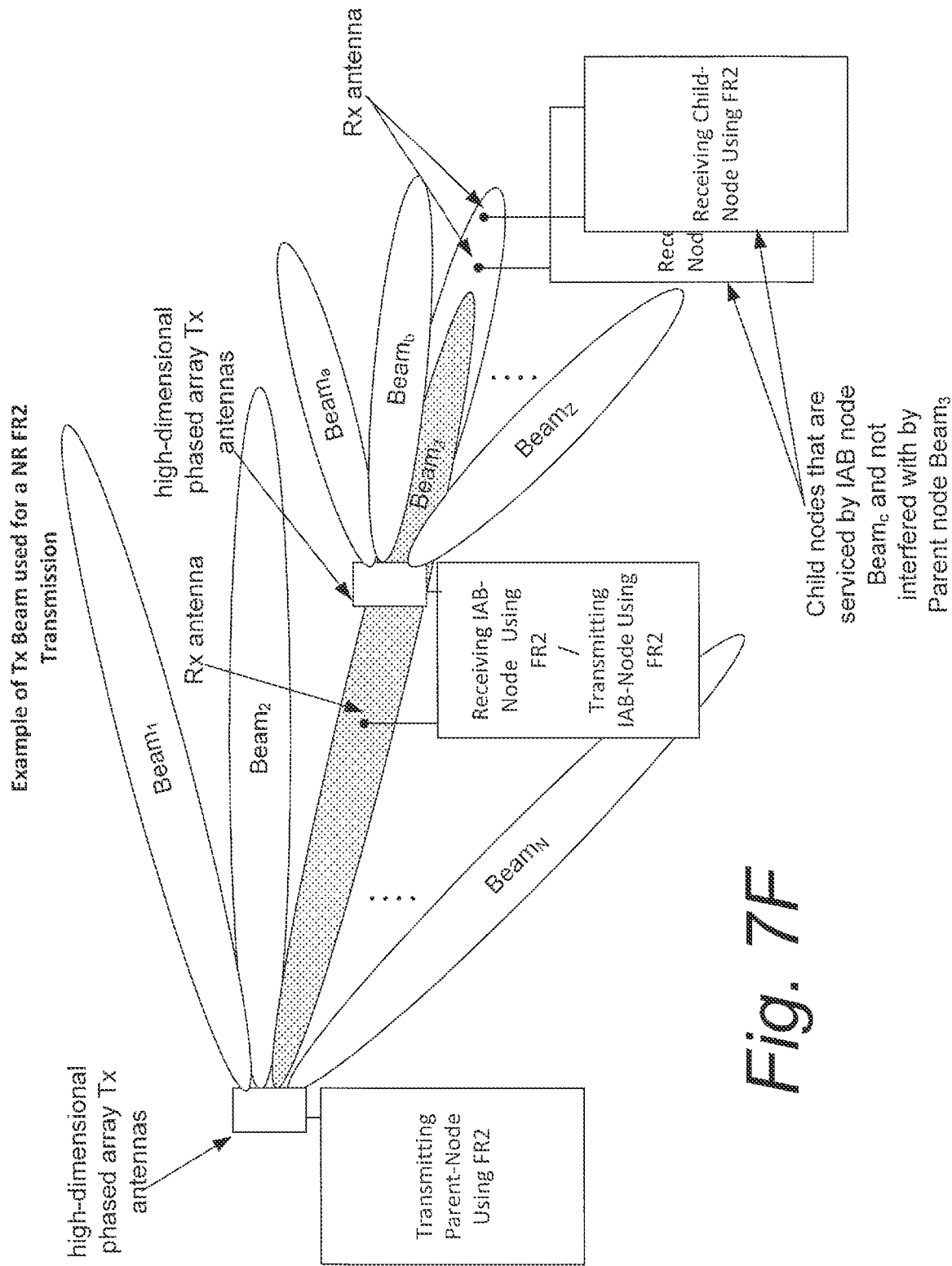
FIG. 7F is a diagrammatic view depicting various examples of beam transmission in a communications network with wireless backhaul.

FIG. 7F shows the result of a subsequent step of the Beam Management Process that further reduces the coverage area of the Parent node's Tx $Beam_3$, e.g., reducing Beam, Tx power, such that Tx $Beam_3$ Align with the IAB node's $Beam_c$ is reduced to the extent that Beam, no longer causes CLI on a $2^{nd}$ Child node's reception of Beamc. However, the signal strength of $Beam_3$ may remain sufficiently strong such that the IAB node can still maintain the necessary DL bandwidth with the Parent node. As in FIG. 7D and FIG. 7E, in FIG. 7F the labeling for Beam, cannot be in view of the substantial overlap thereof by $Beam_3$.

Figure 7G:
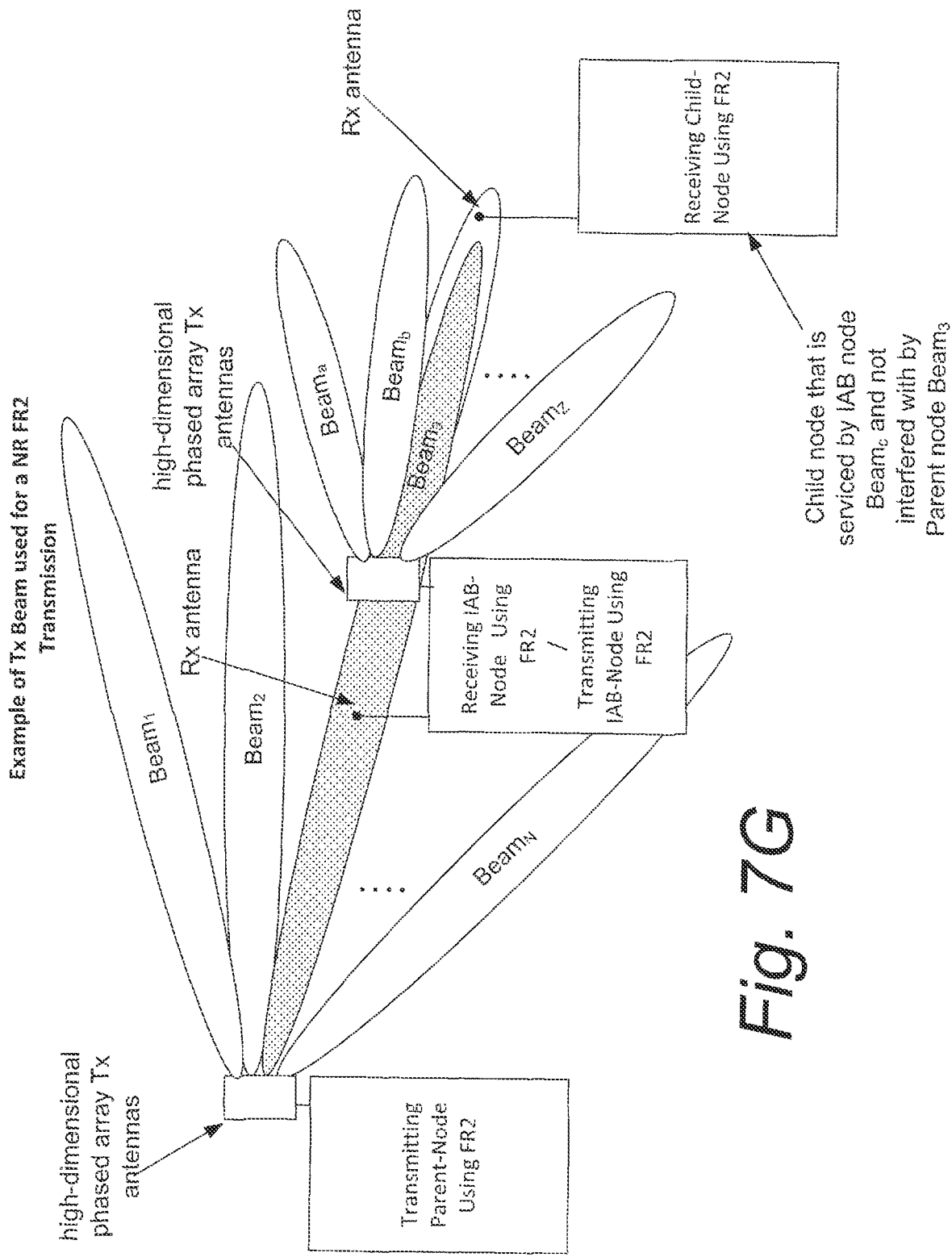
FIG. 7G is a diagrammatic view depicting various examples of beam transmission in a communications network with wireless backhaul.

FIG. 7G shows showing the result of a subsequent step of the Beam Management Process that increases the coverage area of the Parent node's Tx Beam, (i.e. increasing $Beam_3$ Tx power) as compared to the previous graphic, such that Tx $Beam_3$ provides a stronger signal (i.e. increased throughput) to the IAB node, and yet does not causes CLI on Child node's reception of $Beam_e$.

E. Node Architecture for Beam Management

Figure 8A:
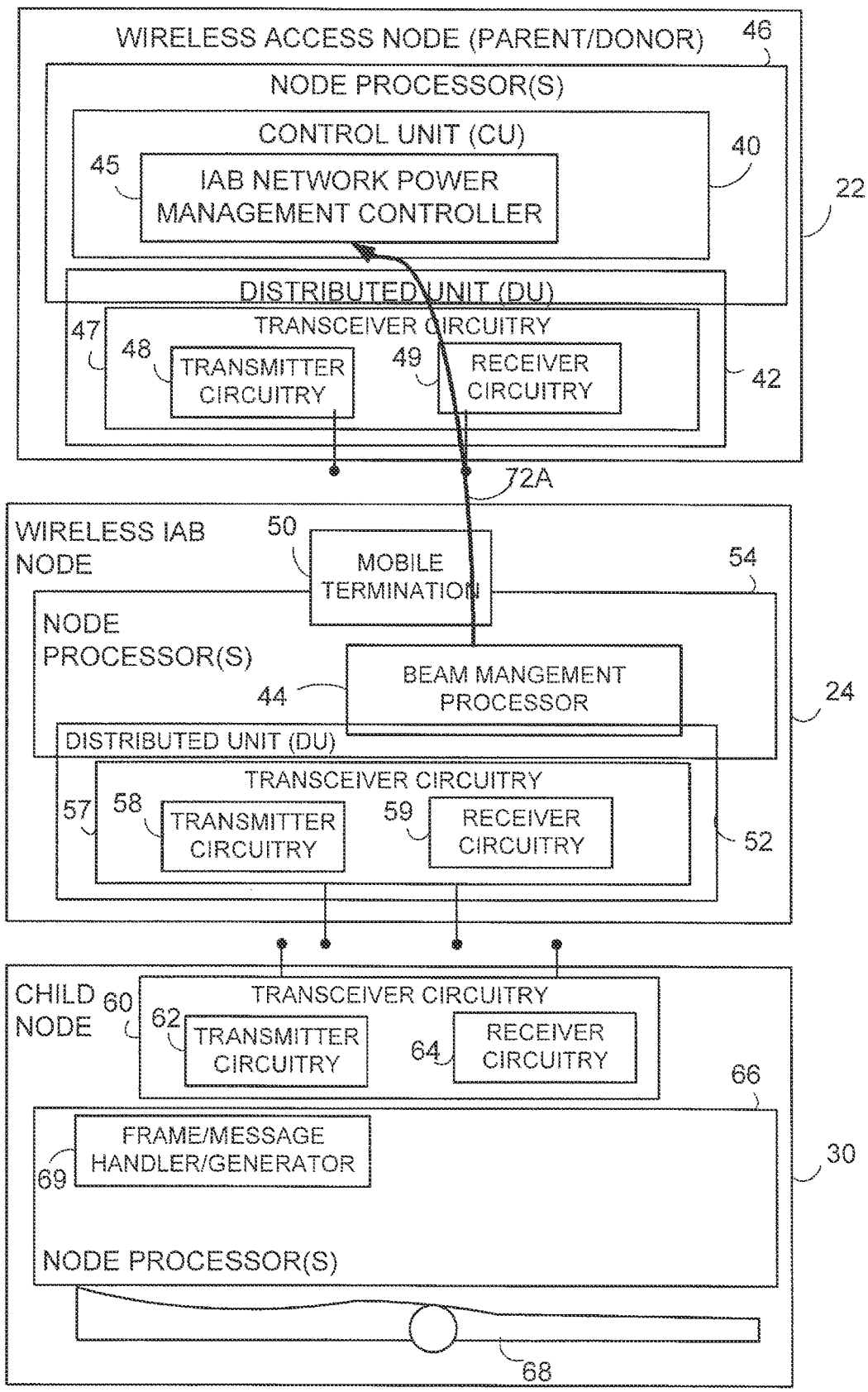
FIG. 8A is a schematic view of nodes of example generic communication systems comprising the nodes of FIG. 2A, FIG. 2B, and FIG. 2C respectively, showing more detail.
Figure 8B:
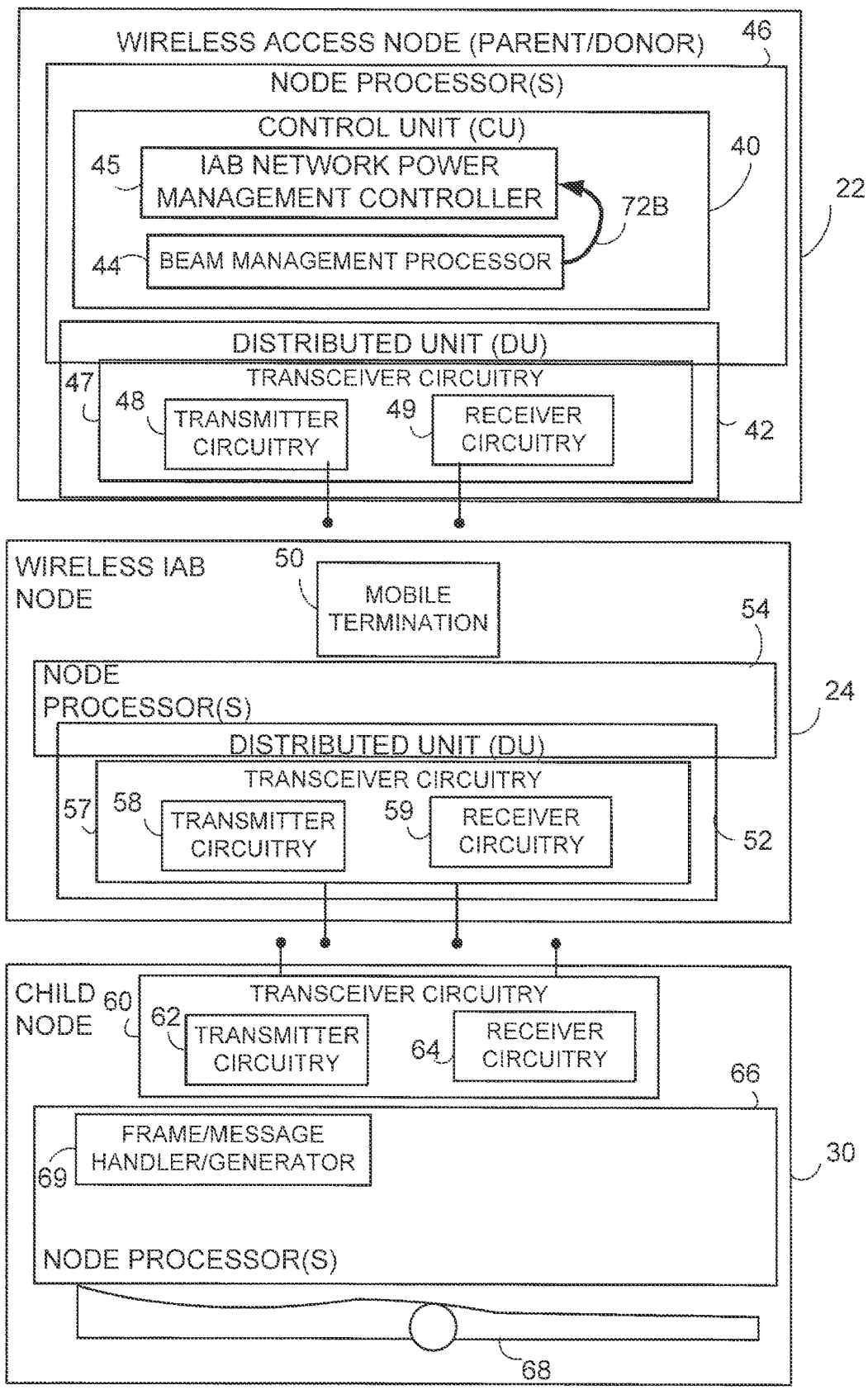
FIG. 8B is a schematic view of nodes of example generic communication systems comprising the nodes of FIG. 2A, FIG. 2B, and FIG. 2C respectively, showing more detail.
Figure 8C:
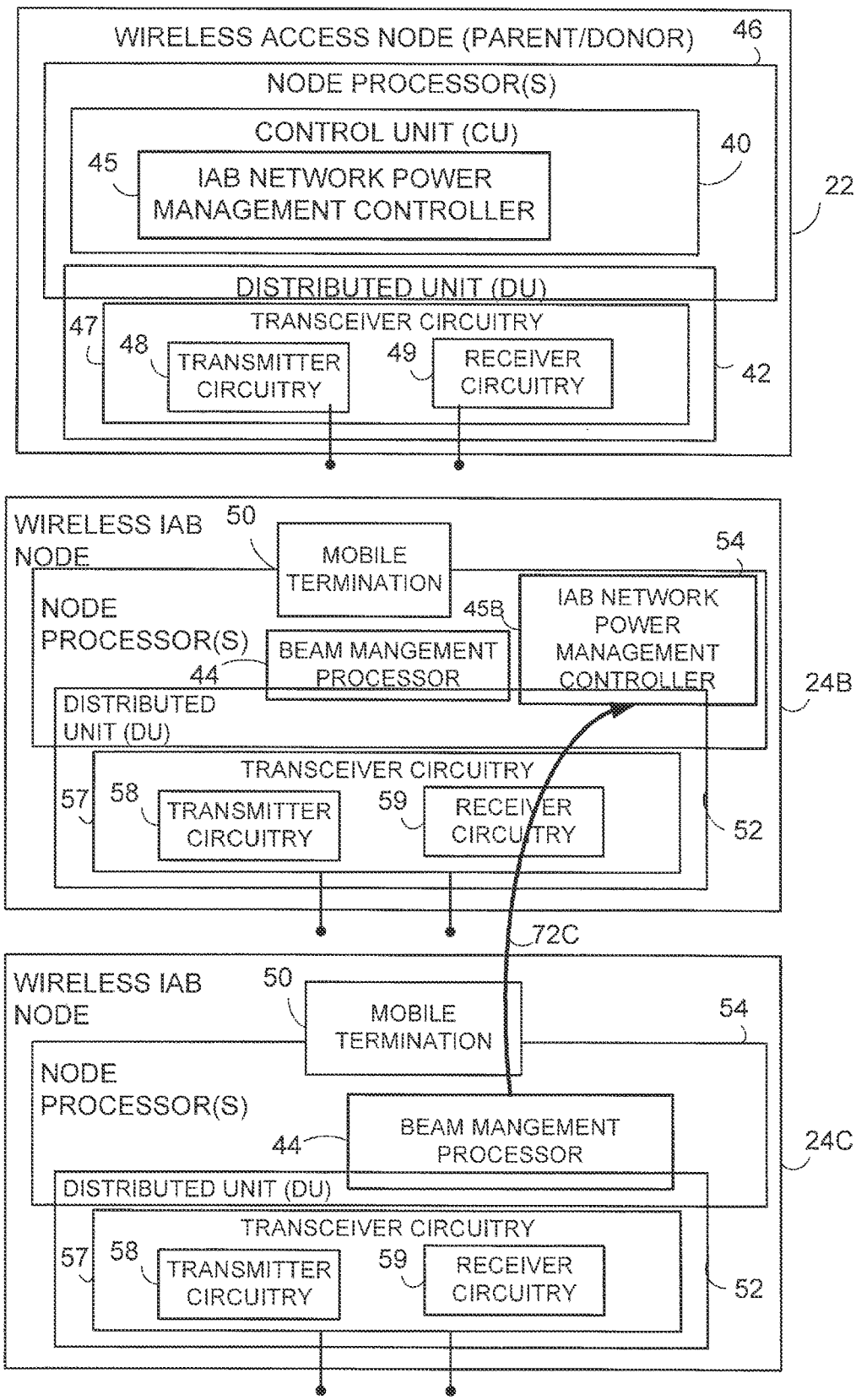
FIG. 8C is a schematic view of nodes of example generic communication systems comprising the nodes of FIG. 2A, FIG. 2B, and FIG. 2C respectively, showing more detail.

FIG. 8A, FIG. 8B, and FIG. 8C show in more detail a generic example embodiments and modes of arrangement and composition of certain functionalities and components of donor IAB node 22; an example, representative IAB node 24; and an example, representative user equipment (UE) 30. The embodiment and mode of FIG. 8A corresponds to the arrangement of FIG. 1A and FIG. 2A wherein the IAB node 24 comprises the beam management processor (BMP) 44. The embodiment and mode of FIG. 8B corresponds to the arrangement of FIG. 1B and FIG. 2B wherein the donor IAB 24 comprises the beam management processor (BMP) 44. The embodiment and mode of FIG. 8C corresponds to the arrangement of FIG. 1C and FIG. 2C wherein the donor IAB 24B comprises the TAB network power management controller 45B. It should be understood that each of the nodes of FIG. 8A, FIG. 8B, and FIG. 8C comprise additional components and functionalities known to the person skilled in the art, and that primarily those pertinent to the technology disclosed herein are illustrated for sake of simplicity.

As understood from the foregoing, FIG. 8A, FIG. 8B, and FIG. 8C show that donor IAB node 22 comprises central unit (CU) 40 and distributed unit (DU) 42. The central unit (CU) 40 and distributed unit (DU) 42 may be realized by, e.g., be comprised of or include, one or more processor circuits, e.g., donor node processor(s) 46. The one or more node processor(s) 46 may be shared by central unit (CU) 40 and distributed unit (DU) 42, or each of central unit (CU) 40 and distributed unit (DU) 42 may comprise one or more node processor(s) 46. The IAB network power management controller 45 may be comprised or realized by donor node processor(s) 46. Central unit (CU) 40 and distributed unit (DU) 42 may be co-located at a same node site, or alternatively one or more distributed units may be located at sites remote from central unit (CU) 40 and connected thereto by a packet network. The distributed unit (DU) 42 of donor IAB node 22 may comprise transceiver circuitry 47, which in turn may comprise transmitter circuitry 48 and receiver circuitry 49. The transceiver circuitry 47 includes antenna(c) for the wireless transmission. Transmitter circuitry 48 includes, e.g., amplifier(s), modulation circuitry and other conventional transmission equipment. Receiver circuitry 49 comprises, e.g., amplifiers, demodulation circuitry, and other conventional receiver equipment.

As shown in FIG. 8A, FIG. 8B, and FIG. 8C, the IAB-node 24, also known as wireless relay node 24, in an example embodiment and mode comprises the IAB node mobile termination (MT) unit 50 and TAB node distributed unit (DU) 52. The IAB node mobile termination (MT) unit 50 and IAB node distributed unit (DU) 52 may be realized by, e.g., by comprised of or include, one or more processor circuits, e.g., IAB node processor(s) 54. The one or more IAB node processor(s) 54 may be shared by IAB node mobile termination (MT) unit 50 and IAB node distributed unit (DU) 52, or each of IAB node mobile termination (MT) unit 50 and IAB node distributed unit (DU) 52 may comprise one or more IAB node processor(s) 54. The IAB node distributed unit (DU) 52 may comprise IAB node transceiver circuitry 57, which in turn may comprise IAB node transmitter circuitry 58 and IAB node receiver circuitry 59. The IAB node transceiver circuitry 57 includes antenna(e) for the wireless transmission. IAB node transmitter circuitry 58 may include, e.g., amplifier(s), modulation circuitry and other conventional transmission equipment. IAB node receiver circuitry 59 may comprise, e.g., amplifiers, demodulation circuitry, and other conventional receiver equipment.

FIG. 8A, FIG. 8B, and FIG. 8C show child node 30, shown by way of example as user equipment (UE) 30, as comprising, in an example, non-limiting embodiment and mode, transceiver circuitry 60. The transceiver circuitry 60 in turn may comprise transmitter circuitry 62 and receiver circuitry 64. The transceiver circuitry 60 includes antenna(e) for the wireless transmission. Transmitter circuitry 62 may include, e.g., amplifier(s), modulation circuitry and other conventional transmission equipment. Receiver circuitry 64 may comprise, e.g., amplifiers, demodulation circuitry, and other conventional receiver equipment. FIG. 8A and FIG. 8B further show child node 30, which (as indicated before) may be a user equipment or Integrated Access and Backhaul (IAB) node, as also comprising node processor circuitry, e.g., one or more node processor(s) 66, and interfaces 68, including one or more user interfaces. Such user interfaces may serve for both user input and output operations, and may comprise (for example) a screen such as a touch screen that can both display information to the user and receive information entered by the user. The user interface 68 may also include other types of devices, such as a speaker, a microphone, or a haptic feedback device, for example.

In an example, non-limiting embodiment and mode shown in FIG. 8A, FIG. 8B, and FIG. 8C, the child node 30 may include frame/massage generator/handler 69. As is understood by those skilled in the art, in some telecommunications system messages, signals, and/or data are communicated over a radio or air interface using one or more "resources", e.g., "radio resource(s)". The frame/message generator/handler 69 serves to handle messages, signals, and data received from other nodes.

As understood with respect to FIG. 1A and FIG. 2A, in the FIG. 8A example embodiment and mode the beam management processor (BMP) 44 is located at the TAB node 24, e.g., the JAB node 24 comprises the beam management processor (BMP) 44. For example, the beam management processor (BMP) 44 may be realized by the TAB node processor(s) 54. On the other hand, in the example embodiment and mode of FIG. 8A the IAB network power management controller 45 is located at the donor or parent IAB node 22, e.g., the donor or parent IAB node 22 comprises the IAB network power management controller 45. For example, the donor node processor(s) 46 that provide the donor IAB node Central Unit (CU) 40 may comprise for form the IAB network power management controller 45.

As understood with respect to FIG. 1B and FIG. 2B, in the FIG. 8B example embodiment and mode the beam management processor (BMP) 44 and the JAB network power management controller 45 are located at the donor or parent JAB node 22, e.g., donor or parent IAB node 22 comprises both beam management processor (BMP) 44 and IAB network power management controller 45. The beam management processor (BMP) 44 may and the IAB network power management controller 45 may comprise or be included in the donor node processor(s) 46. Preferably the beam management processor (BMP) 44 and the JAB network power management controller 45 comprise or are included in the donor JAB node Central Unit (CU) 40.

As understood with respect to FIG. 1C and FIG. 2C, in the FIG. 8C example embodiment and mode, the IAB node 24B may host JAB network power management controller 45B and optionally also host its own beam management processor (BMP) 44.

Thus beam management processor (BMP) 44 may be included in the JAB node 24 as in the case of FIG. 1A, FIG. 2A, and FIG. 8A and the case of FIG. 1C, FIG. 2C. Alternatively the beam management processor (BMP) 44 may be included in the donor or parent JAB node 22 in the manner of FIG. 1B, FIG. 2B, and FIG. 8B. Wherever included, e.g., whether in the donor JAB node 22 or an JAB node 24, in an example embodiment and mode the beam management processor (BMP) 44 may comprise processor circuitry configured to make a determination concerning crosslink interference (CLI) between (a) a beam transmitted from a parent node to an IAB node and (b) a beam transmitted from the IBA node to a child node of the IAB node; and in accordance with the determination. In the case of FIG. 1A/FIG. 2A/FIG. 8A and the case of FIG. 1C/FIG. 2C/FIG. 8C, such processor circuitry may comprise IAB node processor(s) 54; in the case of FIG. 1B/FIG. 2B/FIG. 8B such processor circuitry may comprise donor node processor(s) 46.

The node comprising the beam management processor (BMP) 44 also includes interface circuitry configured to transmit the command to a beam controller, e.g., the IAB network power management controller 45, of the parent node. In the example embodiment and mode of FIG. 1A, FIG. 2A, and FIG. 8B, the interface circuitry comprises mobile termination circuitry of the IAB node, the mobile termination circuitry of the IAB node being configured to transmit the command over a wireless backhaul interface to the beam controller. In the example embodiment and mode of FIG. 1B, FIG. 2B, and FIG. 8B, the interface circuitry comprises circuitry or busses which connect the beam management processor (BMP) 44 to the IAB network power management controller 45, or circuitry by which the beam modification command 72 is communicated by function or data channel, etc.

Figure 9:
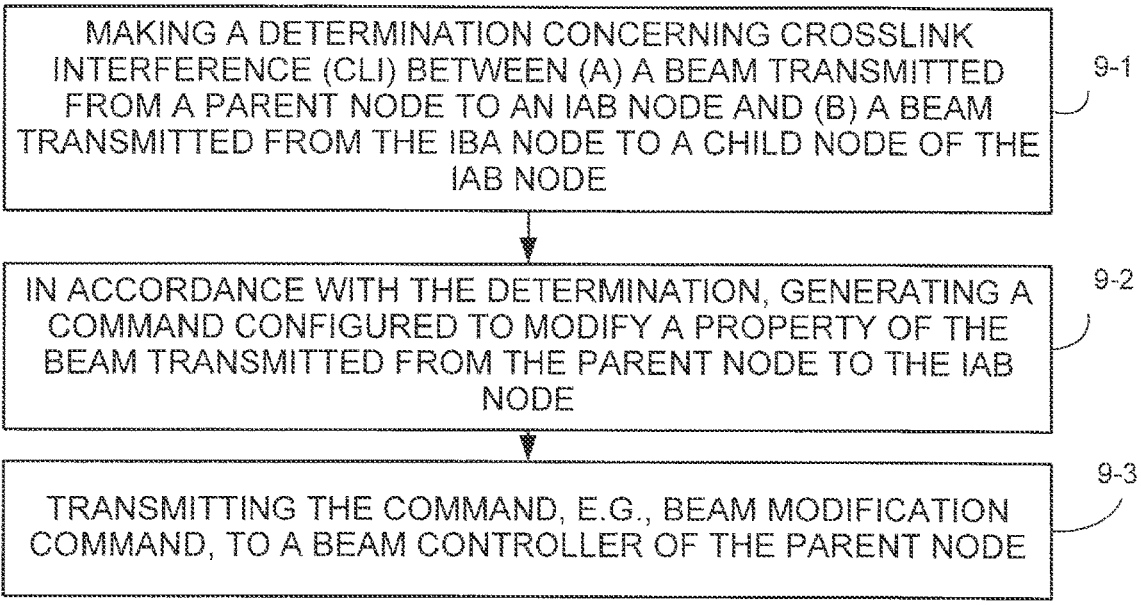
FIG. 9 is a flowchart showing example, non-limiting, basic acts or steps that may be performed by a node which performs beam management process according to an example embodiment and mode.

FIG. 9 shows example, non-limiting, basic acts or steps that may be performed by a node which performs beam management process according to an example embodiment and mode. Act 9-1 comprises making a determination concerning crosslink interference (CLI) between (a) a beam transmitted from a parent node to an IAB node and (b) a beam transmitted from the IBA node to a child node of the IAB node. Act 9-2 comprises, in accordance with the determination, generating a command configured to modify a property of the beam transmitted from the parent node to the IAB node. Act 9-1 and act 9-2 may be performed using processor circuitry, such as TAB node processor(s) 54 of IAB node 24 in the embodiment and mode of FIG. 8A, IAB node processor(s) 54 of IAB node 24C in the embodiment and mode of FIG. 8A, or donor node processor(s) 46 of the donor or parent IAB node 22 of the embodiment and mode of FIG. 8B. Act 9-3 comprises transmitting the command, e.g., beam modification command 72, to a beam controller of the parent node, e.g., to IAB network power management controller 45 of donor or parent IAB node 22 in the case of FIG. 1A/FIG. 2A/FIG. 8A and in the case of FIG. 1B/FIG. 2B/FIG. 8B, or to the IAB network power management controller 45B of the IAB node 24B in the case of FIG. 1C/FIG. 2C/FIG. 8C.

Figure 10:
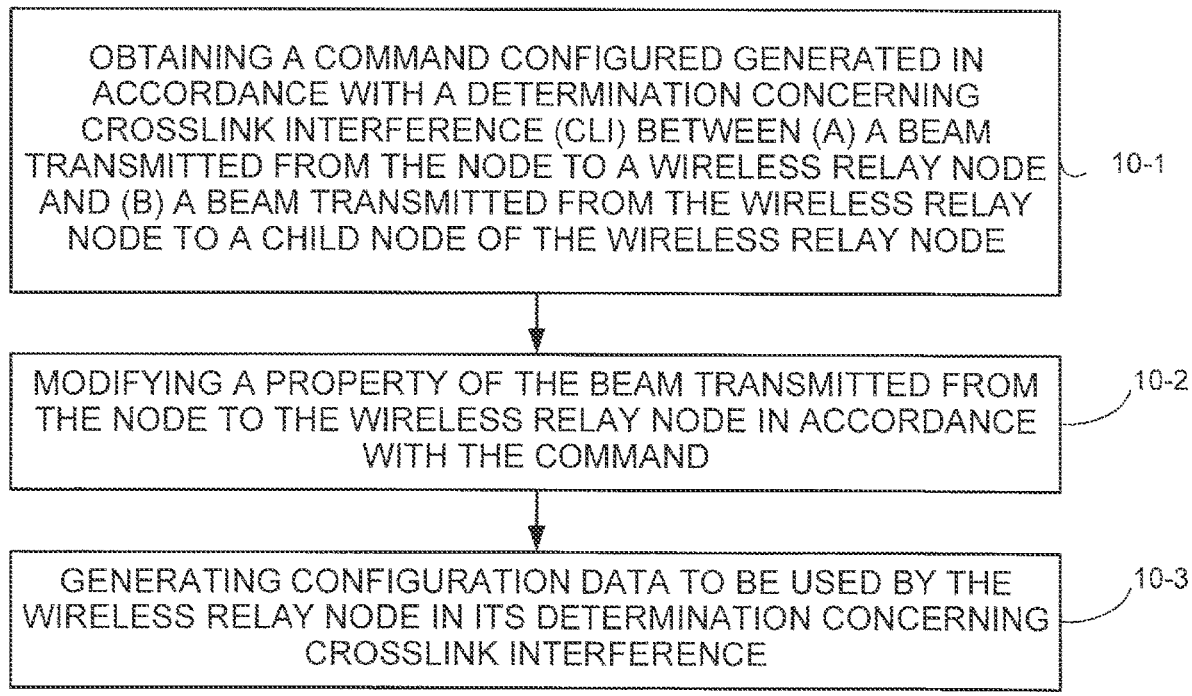
FIG. 10 is a flowchart showing example, non-limiting, basic acts or steps that may be performed by a node which modifies a property of a beam transmitted therefrom in accordance with a beam management process according to an example embodiment and mode.

FIG. 10 shows example, non-limiting, basic acts or steps that may be performed by a node which modifies a property of a beam transmitted therefrom in accordance with a beam management process. The node which performs the acts of FIG. 10 may, in the case of both FIG. 1A/FIG. 2A and FIG. 1B/FIG. 2B, be the donor or parent node 22 or, in the case of FIG. 1C/FIG. 2C, be the IAB node 24B, e.g., the node which hosts LAB network power management controller 45B, which may receive a beam modification command from IAB node 24C.

Act 10-1 comprises obtaining a command configured in accordance with a determination concerning crosslink interference (CLI) between (a) a beam transmitted from the node to a wireless relay node and (b) a beam transmitted from the wireless relay node to a child node of the wireless relay node. Act 10-1 may be performed by receiver circuitry of the node which receives the beam control command 72. As such, the receiver circuitry may be considered an interface configured to obtain a command configured in accordance with a determination concerning crosslink interference. In the case of FIG. 1A/FIG. 2A and the case of FIG. 1B/FIG. 2B, the receiver circuitry may be receiver circuitry 49 of distributed unit (DU) 42 of donor IAB node 22. In the case of FIG. 1C/FIG. 2C, the receiver circuitry may be the IAB node receiver circuitry 59 of IAB node distributed unit (DU) 52 of LAB node 24B.

Act 10-2 comprises modifying a property of the beam transmitted from the node to the wireless relay node in accordance with the command. Preferably the property is transmit power of the donor or parent IAB node 22. Optionally, as act 10-3, the donor or parent IAB node 22 may generate configuration data to be used by the wireless relay node in its determination concerning crosslink interference (CLI). Act 10-2 and optional act 10-3 may be performed by the IAB network power management controller 45 of the donor IAB node 22 in the case of FIG. 1A/FIG. 2A and the case of FIG. 1B/FIG. 2B, or by the IAB network power management controller 45B of the IAB node 24B in the case of FIG. 1C/FIG. 2C. The IAB network power management controller 45 may thus be considered as beam transmission circuitry which is configured to use the command to modify a property of the beam transmitted from the node to the wireless relay node. The beam itself is transmitted by an appropriate transmitter of the node, e.g., transmitting circuitry 48 of distributed unit (DU) 42 of donor IAB node 22 in the case of FIG. 1A/FIG. 2A and the case of FIG. 1B/FIG. 2B, and IAB node transmitter circuitry 58 of the distributed unit (DU) 52 of the IAB node 24 in the case of FIG. 1C/FIG. 2C.

As mentioned above, in an example embodiment and mode the property of the beam transmitted from the node to the wireless relay node is transmit power of the beam. However, in other example embodiments and modes a different property of the beam may be modified. For example, in an example embodiment and mode the modified property of the beam may be beam frequency, which may be particularly pertinent in a situation in which frequency reuse is other than 1.

F. Beam Management Process: Overview

Figure 11:
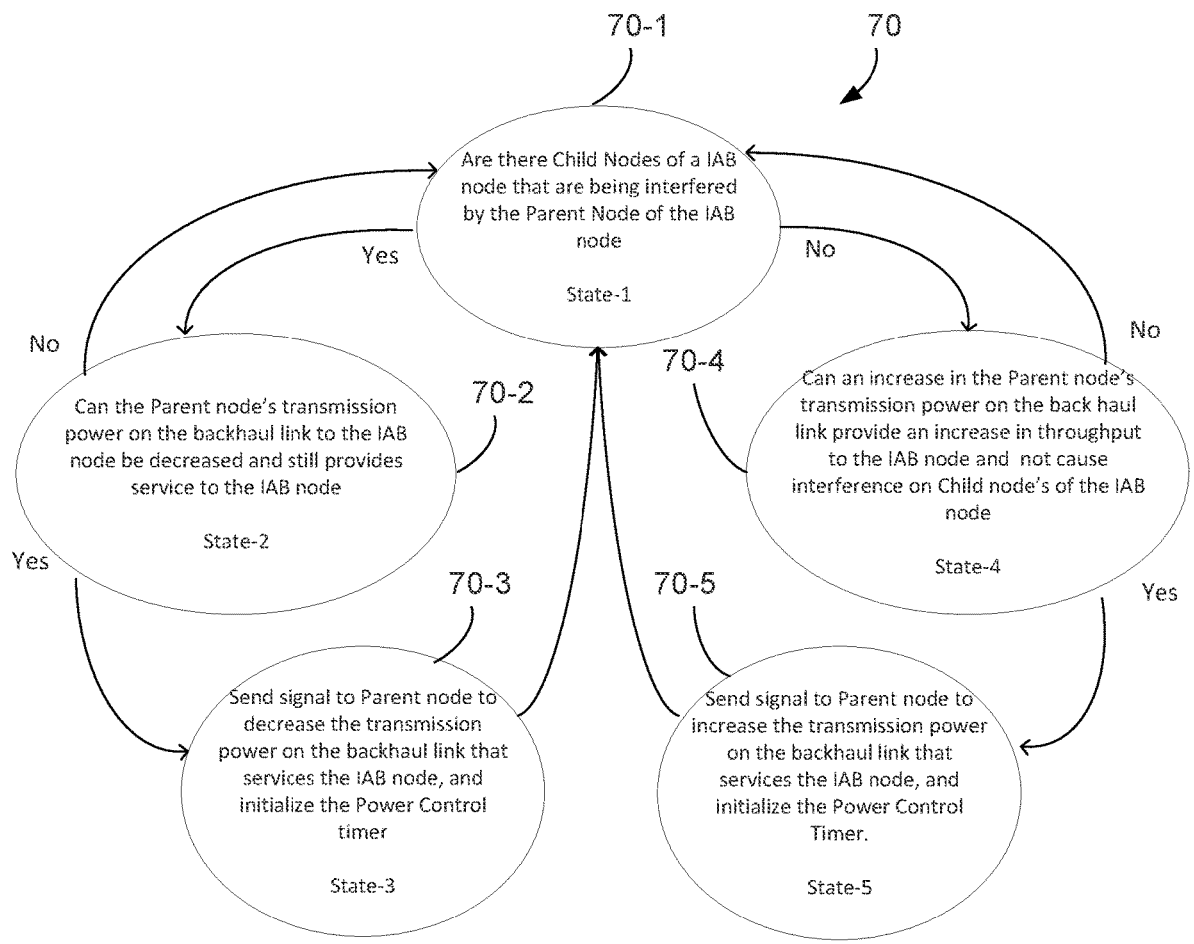
FIG. 11 is a state diagram shows states included in execution of a Beam Management Process.
Figure 12:
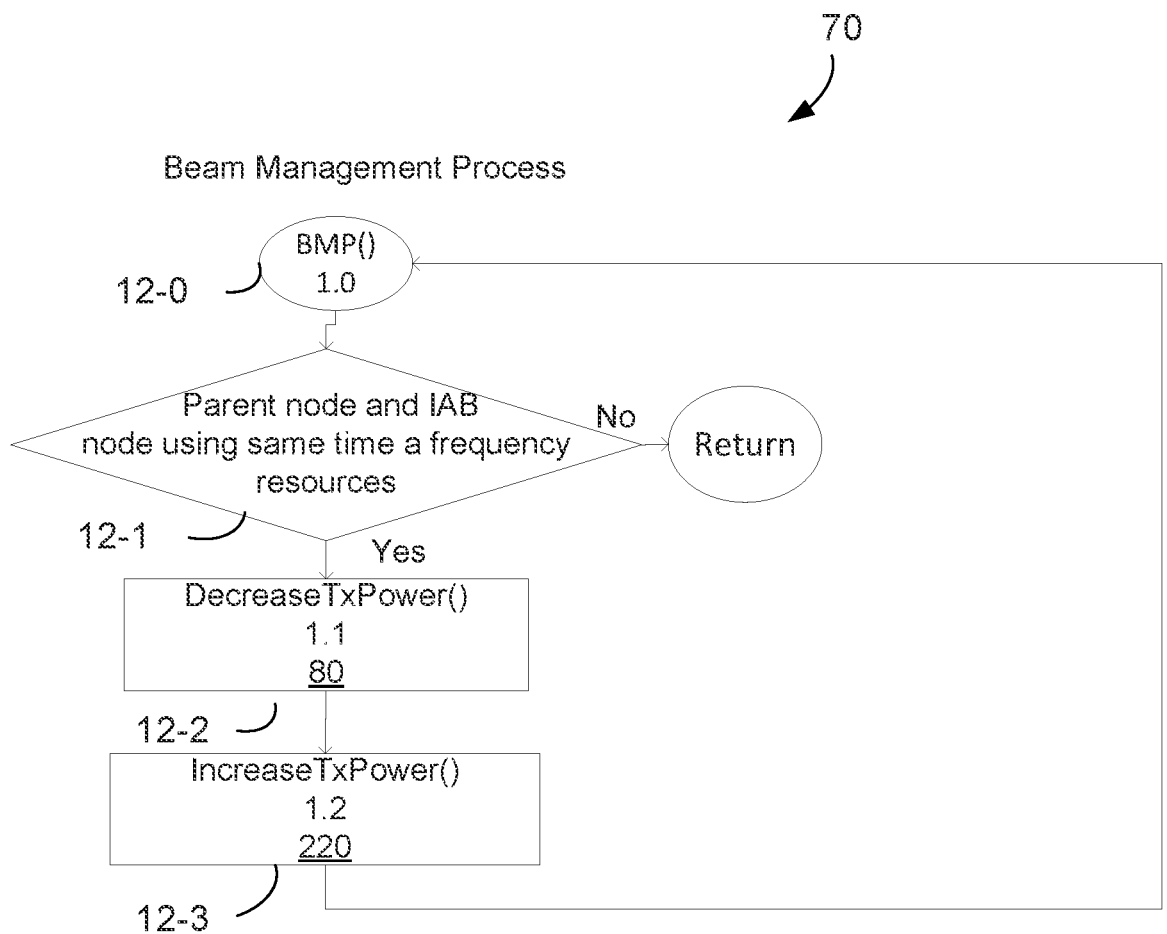
FIG. 12 is a flowchart showing example logic acts or steps comprising a beam management process as may be executed by a beam management processor (BMP).

FIG. 11 shows example states included in execution of beam management process 70. As mentioned above with reference to FIG. 1A and FIG. 2A in one configuration the RLC layer of the DU part of an IAB node may host the beam management processor (BMP) 44 that executes Beam Management Process. In another configuration, described with reference to FIG. 1B and FIG. 2B, the donor IAB node Central Unit (CU) 40 of the donor IAB node 22 may host the beam management processor (BMP) 44 that executes the beam management process 70.

The beam management process 70 may determine that an IAB node is using "in-Band" resources and "Full Duplex" signaling on the access and backhaul links, and as such there is a possibility of crosslink interference (CLI) by a parent node Tx Beam on a child node's reception of IAB node's Tx Beam.

The beam management process 70 may monitor the position of Child nodes relative to their JAB node and to the JAB node's Parent node, and determine that such a position would result in the Tx Beam of the IAB node's access link that is serving the Child nodes to align with the Tx Beam of the Parent node's backhaul link that is serving the IAB node. The beam management process 70 may then further determine that the signal strength of the Parent Node's backhaul link is sufficient to induce crosslink interference (CLI) upon the access link signal sent by the IAB node to the Child nodes.

The beam management process 70 may then further determine that the signal strength of the parent node backhaul link can be reduced and still provide sufficient throughput to the IAB node, and as such the beam management process 70 may send an indication to the parent node requesting that the parent node reduce the transmission power on it backhaul link to the IAB node.

The beam management process 70 may then further determine that an increase in the signal strength of the parent node backhaul link can improve the throughput to the IAB node, and that such an increase in signal strength of the parent node's backhaul link will not induce CLI upon the access link signal sent by the IAB node to the child nodes, and as such the beam management process 70 may send an indication to the parent node requesting that the parent node increase the transmission power on it backhaul link to the IAB node.

Thus, as one of the example aspects of the technology disclosed herein, the beam management process 70 is provided to detect, mitigate and manage crosslink interference (CLI) that a Parent node may cause to a Child node of an IAB node. In an example embodiment and mode beam management process 70 may comprise five separate states as visualized above in FIG. 11.

In State 70-1, the beam management process 70 as executed by beam management processor (BMP) 44 evaluates if there are Child nodes of an TAB node that are being interfered with (i.e. CLI) by a Parent node that services the LAB node. If the result of 70-1 is True, then the beam management process 70 transitions to State 70-2. If the result of State 70-1 is False, then the beam management process 70 transitions to State 70-4.

In State 70-2 the beam management process 70 evaluates if Parent node's transmission power on the backhaul link to the IAB node can be decreased and still provides service to the IAB node. If the result of State 70-2 is True, then the beam management process 70 transitions to State 70-3. If the result of State 70-2 is False, then the beam management process 70 transitions to State 70-1.

In State 70-3 the beam management process 70 sends a signal, e.g., beam modification command 72, to Parent node to request a decrease in the transmission power on the backhaul link that services the IAB node, and initialize a local timer PCTimer to a value associated with the Parent node that provides for some amount of time to pass before the BMP can make another request to change the Parent node's transmission power on the backhaul link that services the IAB node, and BMP transitions back to State 70-1.

In State 70-4 the beam management process 70 evaluates if an increase in the Parent node's transmission power on the backhaul link will provide an increase in throughput to the TAB node and not cause interference on Child nodes of the TAB node. If the result of State 70-4 is True, then the BMP transitions to State 70-5. If the result of State 70-4 is False, then the beam management process 70 transitions to State 70-1

In State 70-5 the beam management process 70 sends a signal, e.g., beam modification command 72, to Parent node to request an increase in the transmission power on the backhaul link that services the IAB node, and initialize a local timer PCTimer to a value associated with the Parent node that provides for some amount of time to pass before the beam management process 70 can make another request to change the Parent node's transmission power on the backhaul link that services the IAB node, and beam management process 70 transitions back to State 70-1.

While FIG. 11 shows various states of the beam management process 70, FIG. 12-FIG. 30 show example logic acts or steps comprising the beam management process 70 as may be executed by beam management processor (BMP) 44. Each of FIG. 12-FIG. 30 is associated with a page of a Logical flow for beam management process 70. The first text block of Fig. BMP is associated to the top most level of the flow diagram and is considered the start of beam management process 70, and is identified by "BMP( ) 1.0". Each page of the logical flow diagram of Fig. BMP-FIG. 30 may be considered as a sub-routine or procedure call or similar structured coding methodology. The beam management process 70 operates from the perspective of an IAB node and considers the IAB nodes attached to it, e.g., Child nodes, and the Parent node that services it.

The beam management process 70, the BMP( ) of Fig. BMP, determines, mitigates and manages the crosslink interference (CLI) caused by a Parent node upon a Child node, where the parent node services an IAB node that services the Child node. Referring to the acts of Fig. BMP, in brief:

As act 12-0 The beam management process 70 determines if the time and frequency resources used by the Parent node to service the TAB node are the same as the time and frequency resources used by the TAB node to service its Child nodes and if not, the BMP terminates.

Otherwise, as shown by act 12-1, beam management process 70 uses a DecreaseTxPower( ) function 80 to decrease the Parent node's Tx beam power if possible, then as act 12-2 the beam management process 70 may use a IncreaseTxPower( ) function 220 to increase the Parent node's Tx beam power if possible, then, beam management process 70 resumes execution at act 12-0.

F.1 BMP: DecreaseTxPower( ) Function

Figure 13:
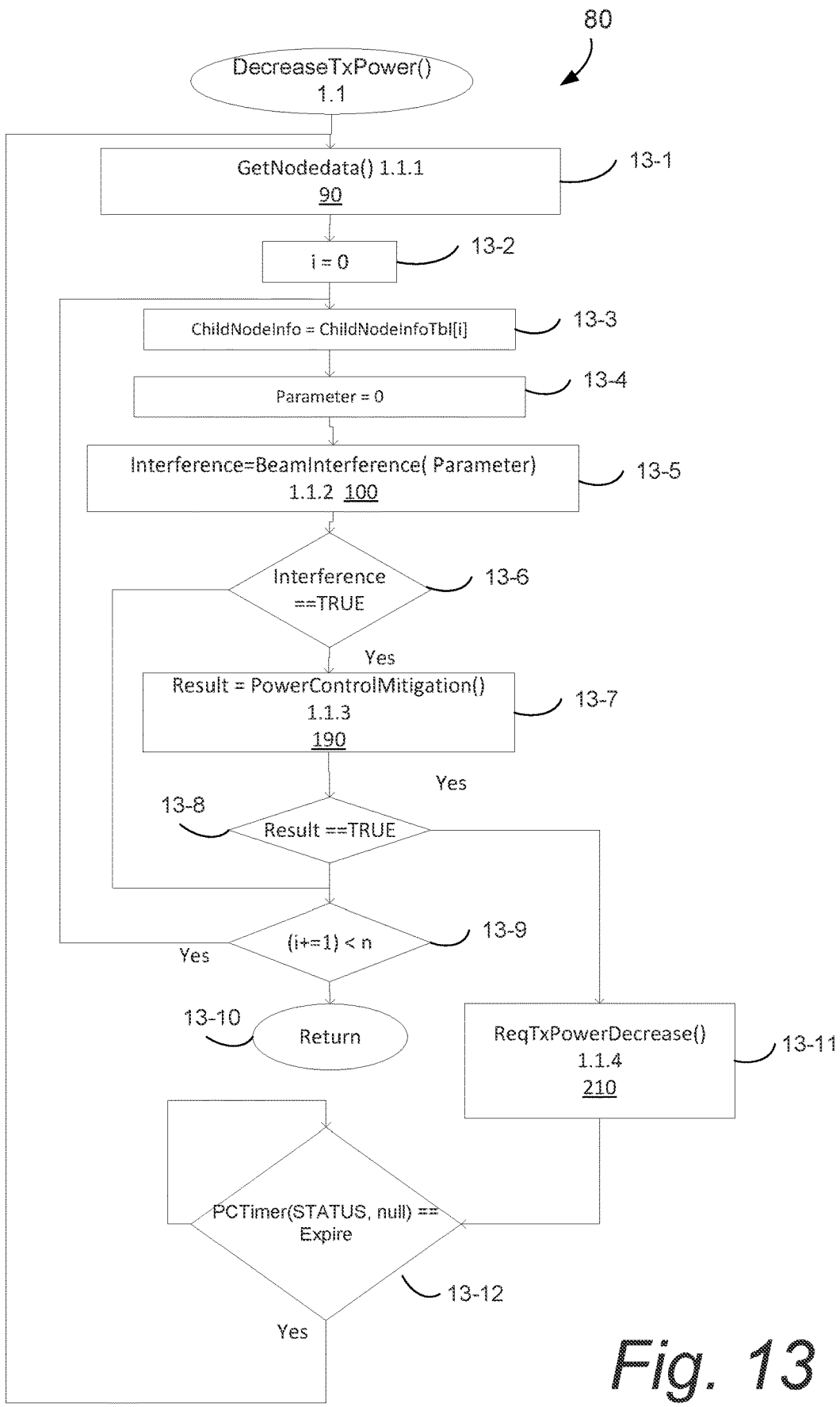
FIG. 13 is a flowchart showing example logic acts or steps comprising a beam management process as may be executed by a beam management processor (BMP).

The DecreaseTxPower( ) function 80 determines if any of the Child nodes of the IAB node serviced by the Parent node may be experiencing CLI from the Parent node's Tx beam, and if so it further determines if a decrease in the Parent Node's Tx beam signal strength would result in an acceptable service level provided by the Parent node to the IAB node. Example acts of steps of the DecreaseTxPower( ) function 80 are shown in FIG. 13. The DecreaseTxPower( ) function 80 is the top level function for determining if a decrease in the power of the parent node's Tx beam is possible, and making the request to the parent node for such a decrease.

Basic, representative acts or steps of an example implementation of the DecreaseTxPower( ) function 80 shown in FIG. 13 include but are not necessarily limited to the following:

As act 13-1, using the GetNodeData( ) function 90 to obtain all the necessary data for the BMP to execute its functionality, e.g. ChildNodeInfoTable, ParentNodeInfo, IABNodeInfo.

as act 13-2, initializing a loop index "i".

as acts 13-3 through 13-5, then for each Child node in the ChildNodeInfoTable, e.g., each Child node's info is each in turn is copied into ChildNodeInfo (act 13-3) for processing, using a BeamInterference( ) function 100 (act 13-5) with its input parameter set to zero to estimate if the signal of the Tx Beam used by the Parent node to service the LAB node may cause interference upon the Child node, then, if it is determined as act 13-6 that the BeamInterference( ) function returns true, as act 13-7 using a PowerControlMitigation( ) function 190 to determine if a reduction in the Parent nodes's Tx Beam can be tolerated by the IAB node, then if it is determined as acct 13-8 that the PowerControlMitigation( ) function of act 13-7 returns a true value, as act 13-11 calling a ReqTxPowerDecrease( ) function 210 to request that the Parent node reduce the Tx power of the beam serving the IAB node, then as act 13-12 waiting until the Power Control timer is expired, then continuing at the first step 13-1 of the DecreaseTx-Power( ) function 80.

As shown by act 13-9 through 13-10, if the DecreaseTx-Power( ) function 80 sequentially steps through all the Child nodes in the ChildNodeInfoTable without executing the ReqTxPowerDecrease( ) function 210, then it returns (act 13-10).

F.2 BMP: GetNodeData( ) Function

Figure 14:
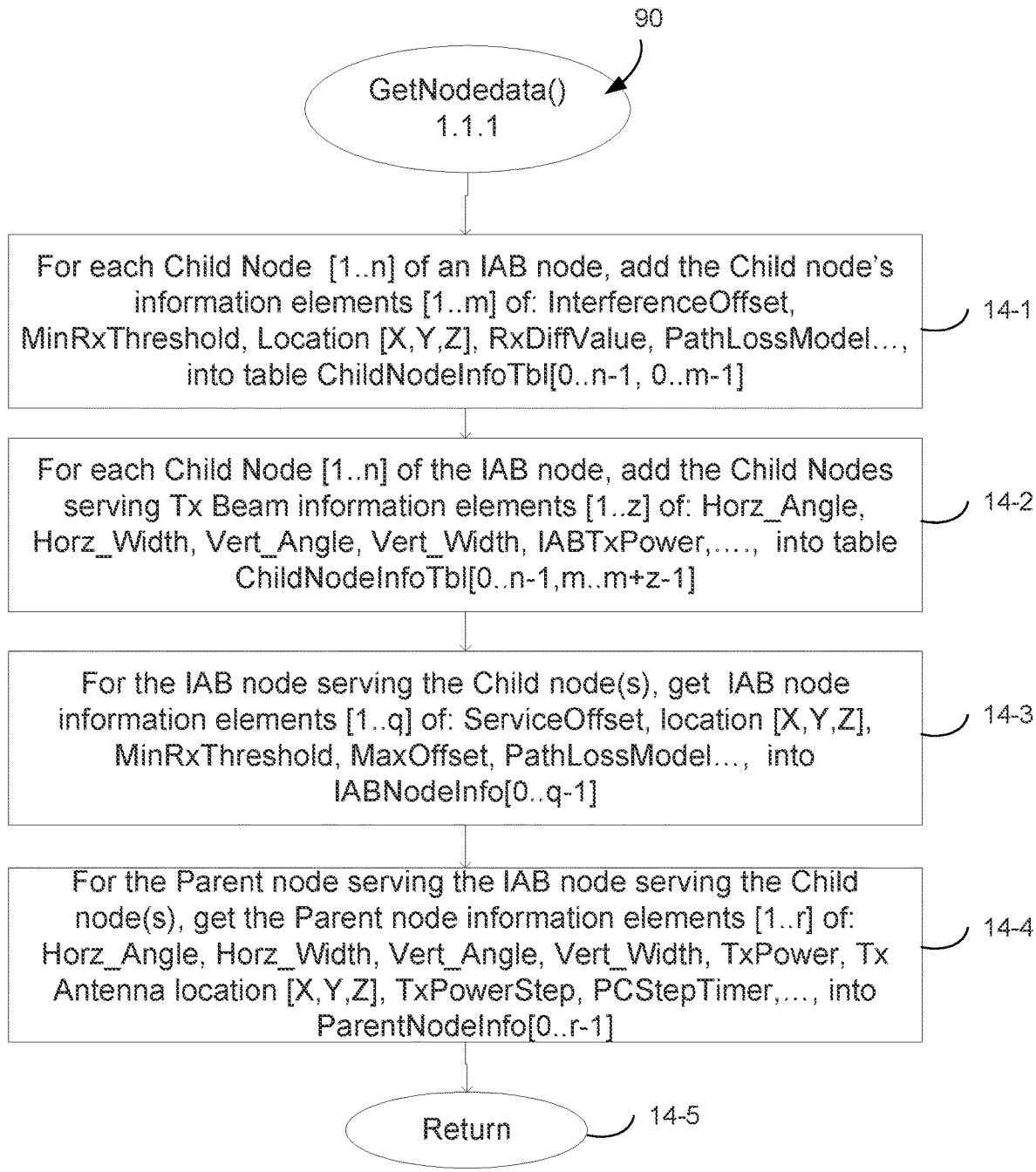
FIG. 14 is a flowchart showing example logic acts or steps comprising a beam management process as may be executed by a beam management processor (BMP).

The GetNodeData( ) function 90 obtains all the necessary data related to the Parent node, IAB node and Child nodes that the BMP needs to execute. Basic acts or steps of an example embodiment and mode of the GetNodeData( ) function 90 are shown in FIG. 14, and in brief includes structuring data objects related to the Parent node, IAB node and Child nodes into 3 tables of information that are accessible by all functions of the BMP, e.g., the tables are global data.

The first table ChildNodeInfoTbl is a 2-dimensional table of all the Child nodes that are serviced by an IAB node, and the necessary information associated with each Child node. A non-limiting example of the Child node table may include information about a Child node's location, Minimum Receiver Threshold, Interference Level Offset, aspects of the IAB Node's beam that is servicing that Child node such as Horz_Angle, Horz_Width, Vert_Angle, Vert_Width, TxPower, The second table IABNodeInfo is 1-dimensional table of information about an IAB node. A non-limiting example of the IAB node table may include information about IAB node's location, Minimum Receiver Threshold, Service Level Offset, Maximum offset.

The third table ParentNodeTable is a 1-dimensional table of the Parent node that services the IAB node, and the information associated with the Parent node. A nonlimiting example of the Parent node table may include information about a Parent node's location, aspects of the Parent Node's beam that is servicing that IAB node, and a step-wise value that the Parent node will use to increase or decrease the Parent nodes Tx beam.

Act 14-1 of GetNodeData( ) function 90 comprises, for each Child Node [1..n] of an IAB node, adding the Child node's information elements [1..m] of: InterferenceOffset, MinRxThreshold, Location [X,Y,Z], RxDiffValue, PathLossModel . . . , into table ChildNodeInfoTbl[0..n−1, 0..m−1].

Act 14-2 of GetNodeData( ) function 90 comprises, for each Child Node [1..n] of an IAB node, adding the Child Nodes serving Tx Beam information elements [1..z] of: Horz_Angle, Horz_Width, Vert_Angle, Vert_Width, IABTxPower, . . . , into table ChildNodeInfoTbl[0..n−1, m..m+z−1].

Act 14-3 of GetNodeData( ) function 90 comprises, for the IAB node serving the Child node(s), getting IAB node information elements [1..q] of: ServiceOffset, location [X,Y,Z], MinRxThreshold, MaxOffset, PathLoss-Model . . . , into IABNodeInfo[0..q−1].

Act 14-4 of GetNodeData( ) function 90 comprises for the Parent node serving the IAB node serving the Child node(s), getting the Parent node information elements [1..r] of: Horz_Angle, Horz_Width, Vert_Angle, Vert_Width, TxPower, Tx Antenna location [X,Y,Z], TxPowerStep, PCStepTimer, . . . , into ParentNodeInfo[0..r−1]. Act 14-5 comprises a return of the GetNodeData( ) function 90.

F.3 BMP: BeamInterference(Parameter) Function

Figure 15:
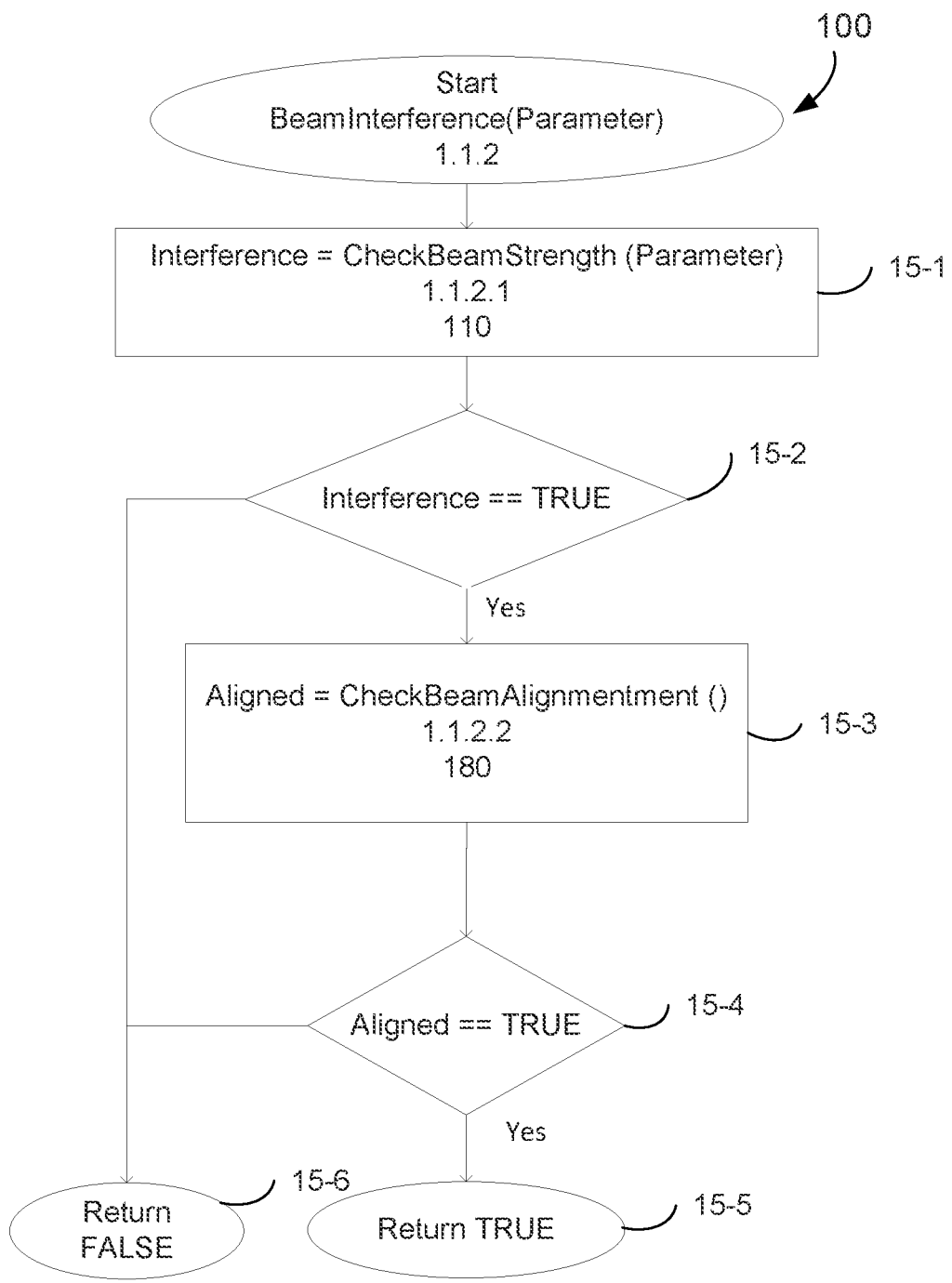
FIG. 15 is a flowchart showing example logic acts or steps comprising a beam management process as may be executed by a beam management processor (BMP).

Basic, example representative acts or steps of an example implementation of the BeamInterference(Parameter) function 100 are shown in FIG. 15. The BeamInterference (Parameter) function 100 takes 1 parameter as input: a value that is passed to the CheckBeamStrength( ) function. The function will determine if a Parent node's Tx beam serving an IABNode is sufficiently strong so as to result in interference upon the Child node given the Child node's relative position to the Parent node. The BeamInterference(Parameter) function 100 checks for interference on an IAB node's child node from the IAB node's parent node Tx beam that is serving the IAB node. If the input parameter is ZERO, then the check on the signal strength is calculated for the current conditions. If the parameter is non-ZERO, then the check on the parent node's received signal at the IAB node is calculated for a potential increase in the parent node's Tx signal, e.g., an increase by the value of the parameter.

Basic, representative acts or steps of an example implementation of the BeamInterference(Parameter) function 100 shown in FIG. 15 include but are not necessarily limited to the following:

As act 15-1, using a CheckBeamStrength( ) function 110 with 1 input parameter to estimate if the Parent Node's Tx beam signal strength will interfere with the Child nodes receive signal from the IAB node and, if it is determined as act 15-2 that there is interference, As act 15-3 using a CheckBeamAlignment( ) function 180 to determine if the Child node's location is in alignment with both the Parent Node's Tx beam and the JAB node's Tx beam.

If CheckBeamStrength( ) check of act 15-1 and if it is determined as act 15-4 that the CheckBeamAlignment ( ) check of act 15-3 are true, then as act 15-5 the BeamInterference( ) function 100 returns True, otherwise as act 15-6 it returns False.

F.4 BMP: CheckBeamStrength (Parameter) Function

Figure 16:
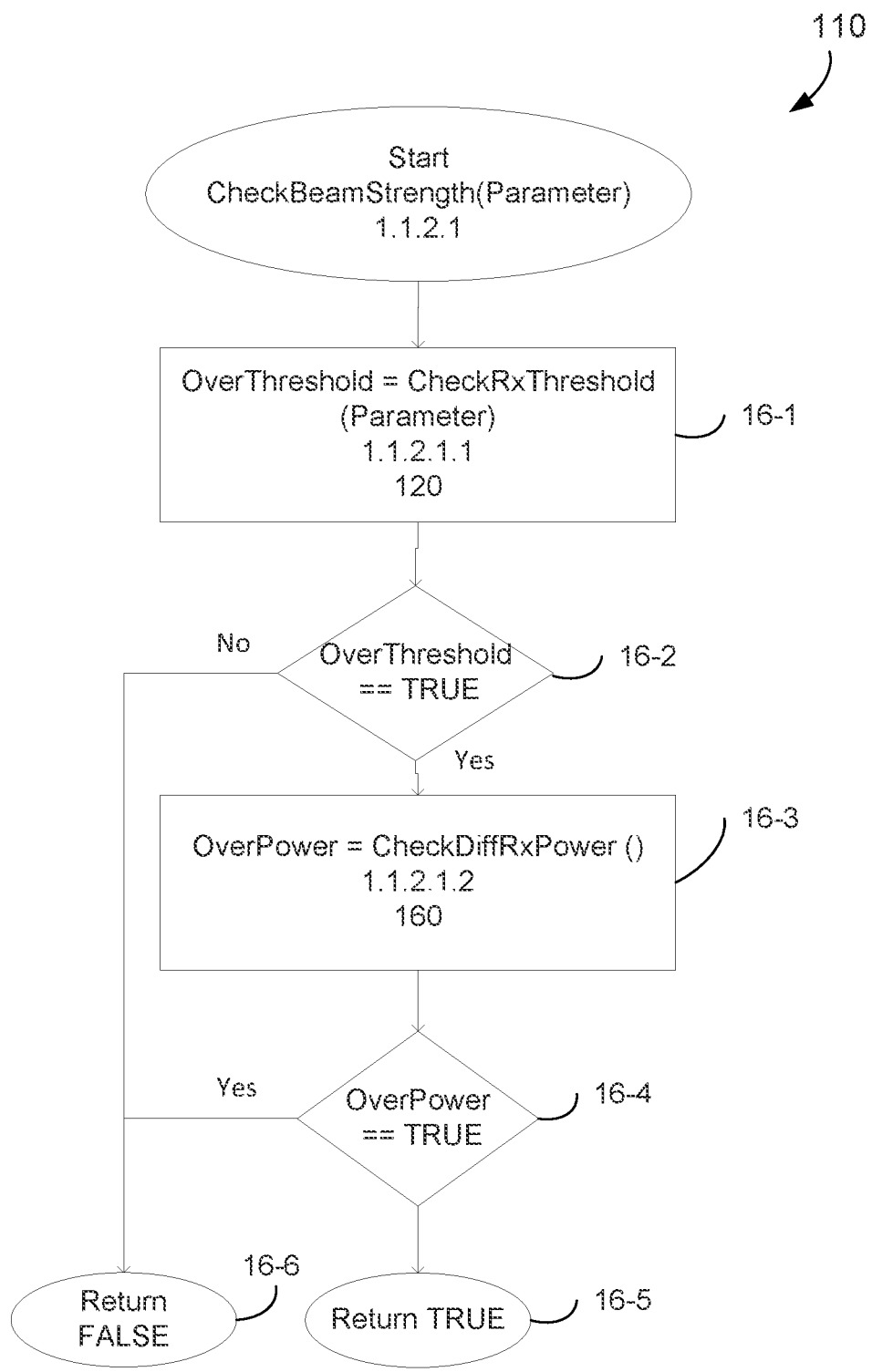
FIG. 16 is a flowchart showing example logic acts or steps comprising a beam management process as may be executed by a beam management processor (BMP).

Basic, example representative acts or steps of an example implementation of the CheckBeamStrength (Parameter) function 110 are shown in FIG. 16. The CheckBeamStrength (Parameter) function 110 takes 1 parameter as input: a value that is passed to the CheckRxThreshold( ) function. The CheckBeamStrength (Parameter) function 110 determines if the Parent node's Tx power is sufficient to cause interference on the Child node's reception of a IAB node's signal, adjusted per the offsets.

The CheckBeamStrength (Parameter) function 110 checks if the signal strength of the Parent node's Tx Beam will cause interference with the Child node's reception of the IAB node's signal, per the given adjustments. Two aspects are considered for determining if there is interference: A first is a check if the Parent Node's signal (estimated at the Child node) exceeds the minimum threshold of the Child node's receiver. A second is a check if the IAB node's received signal (estimated at the Child node) is sufficiently stronger then the Parent nodes received signal (estimated at the Child node), such that the Parent node's signal will not cause excessive interference to the IAB node's signal as received by the Child node. If the input parameter is ZERO, then the check on the Parent Node's received signal strength is calculated for the current conditions. If the input parameter is non-ZERO then the check on the Parent node's received signal at the Child node is calculated for a potential increase in the Parent nodes Tx signal (i.e. an increase by the value of the parameter).

Basic, example, representative acts or steps of the Check-BeamStrength (Parameter) function 110 comprise:

As act 16-1, using a CheckRxThreshold( ) function 120 with 1 input parameter to estimate if the Parent Node's Tx beam signal strength is stronger than the Child nodes minimum received signal, If it is determined as act 16-2 that the signal strength of the parent node's Tx beam is greater than the child node's Rx signal strength, the performing act 16-3.

as act 16-3 using a CheckDiffRxPower( ) function 160 to determine if the difference between the IAB node's Rx signal at the Child node is larger than the Parent node's Rx signal strength at the Child node by an system supplied value.

If was determined as act 16-3 that the CheckRxThreshold ( ) returns True, and if it is determined as act 16-4 that the CheckDiffRxPower( ) returns False, then as act 16-5 the CheckBeamStrength (Parameter) function 110 returns True, otherwise as act 16-6 it returns False.

F.5 BMP: CheckRxThreshold(Parameter) Function

Figure 17:
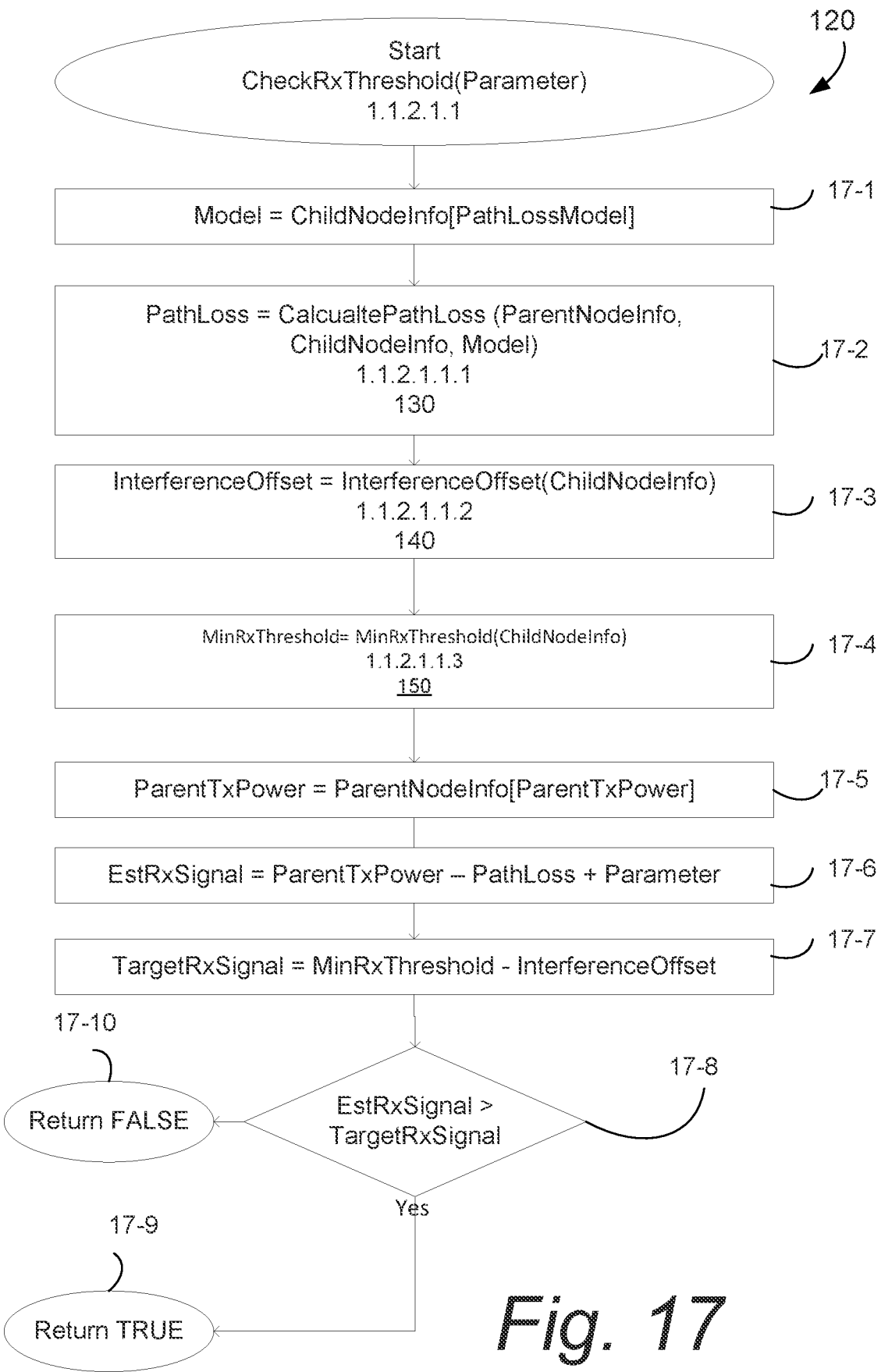
FIG. 17 is a flowchart showing example logic acts or steps comprising a beam management process as may be executed by a beam management processor (BMP).

Basic, example representative acts or steps of an example implementation of the CheckRxThreshold(Parameter) function 120 are shown in FIG. 17. The CheckRxThreshold (Parameter) function 120 takes 1 parameter as input: an offset that is applied to the Child node's minimum receiver threshold. The CheckRxThreshold(Parameter) function 120 determines if the Parent node's Tx power is greater than the minimum receive threshold of the Child node, adjusted per the offsets.

Basic, representative acts or steps of an example implementation of the CheckRxThreshold(Parameter) function 120 shown in FIG. 17 include but are not necessarily limited to the following:

as act 17-1, obtaining from the ChildNodeInfo table the RF propagation model to use for determining the Path Loss between transmitting node and receiving node, then as act 17-2 using a CalculatePathLoss( ) function 130 with 3 input parameters to estimate the loss in RF signal strength from the transmitter to receiver, e.g. Parent node to Child node for a given path loss model, for the given RF propagation model, e.g., getting the path loss between the parent node and the child node. The Friis equation, for example, can solve the path loss given distance between the Tx and Rx antennae, Tx power, Tx frequency and other antenna configuration parameter(s). Other path loss modes are: Walfish-Ikegami, //Okumura-Hata, Longley-Rice, Lee and Young.

then as act 17-3 using an InterferenceOffset( ) function 140 with 1 input parameter to obtain an offset for use in determining if the Child node's receiver is interfered with by the Parent nodes Tx beam, Act 17-3 thus comprises obtaining the Interference Offset between the Parent node and the Child node. The system may provide an Interference Offset that is used when evaluating if the Parent nodes Tx Beam is interfering with a Child node's receiver. The offset may be a positive or negative value.

then as act 17-4 using a MinRxThreshold( ) function 150 to obtain the minimum received signal for use in determining if the Child node's receiver is interfered with by the Parent nodes Tx beam.

as act 17-5 obtaining from the ParentNodeInfo table the current transmission power of the Parent Node's Tx beam, as act 17-6 determining as act 17-6 the estimated Parent node's transmission power, after determining a TargetRxSignal as act 17-7, as act 17-8 determining the estimated Parent node's transmission power less the Path loss to the Child node, plus a BMP-supplied parameter is greater than the minimum receiver threshold the of the Child node less a system supplied interference offset, if the determination of act 17-8 is true, then as act 17-9 returning True, otherwise as act 17-10 returning False.

F.6 BMP: CalculatePathLoss( ) Function 60

Figure 18:
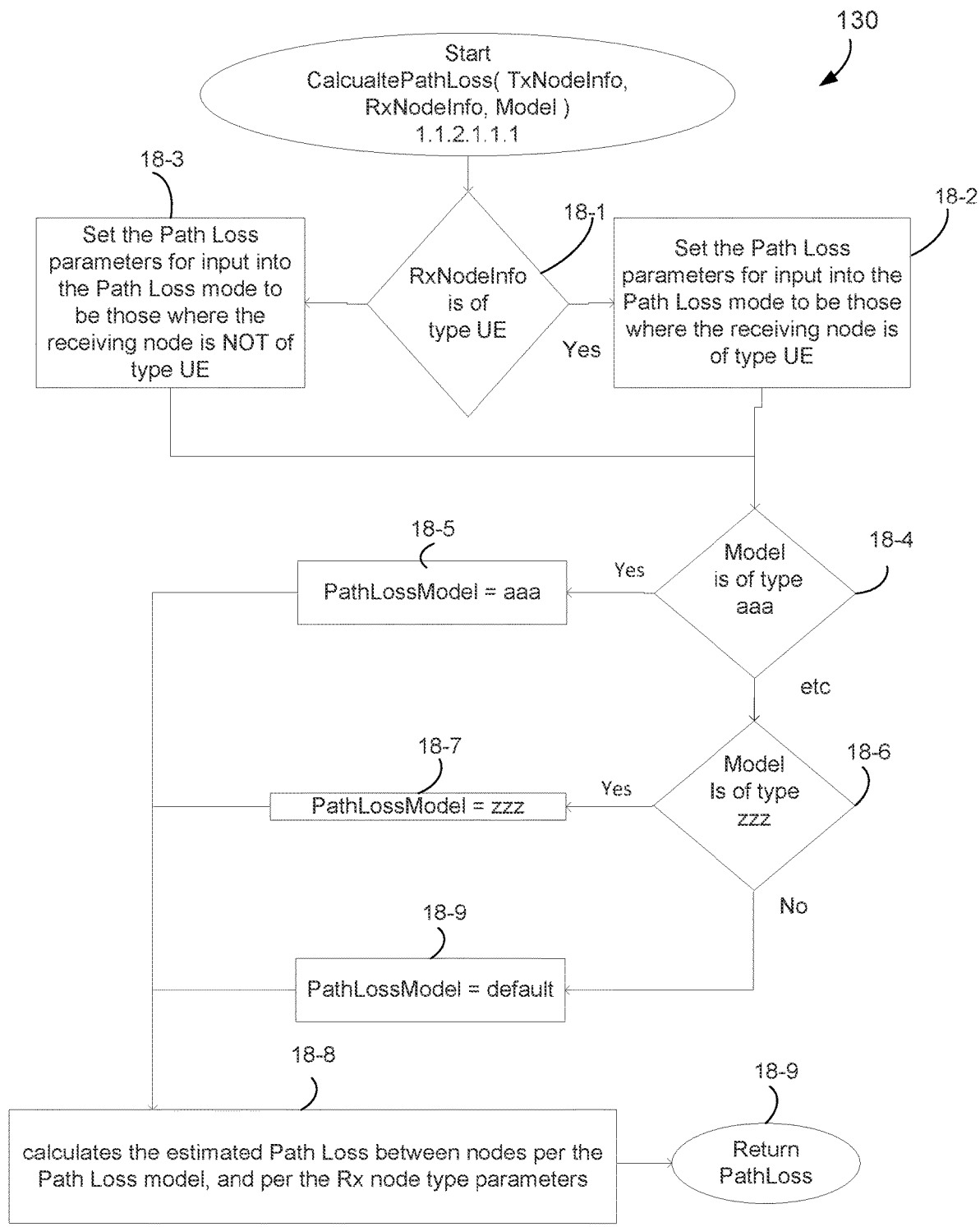
FIG. 18 is a flowchart showing example logic acts or steps comprising a beam management process as may be executed by a beam management processor (BMP).

Basic, representative example acts or steps of an example implementation of the CalculatePathLoss ( ) function 60 are shown in FIG. 18. The CalculatePathLoss(ParentNodeInfo, IABNodeInfo, Model) function 130 takes 3 parameters as input: Info about the transmitting node, info about the receiving node and the path loss model to use. The function provides an estimation of the loss in RF signal strength from a transmitter to a receiver, e.g. Parent node to Child node, given information on the transmitter power, transmitter antenna, distance between transmitter and receiver and the expected propagation environment, e.g., free-space or not, and propagation Model, e.g., Walfish-Ikegami, Okumura-Hata, Longley-Rice, Lee and Young.

Basic, representative acts or steps of an example implementation of the CalculatePathLoss ( ) function 60 shown in FIG. 18 include but are not necessarily limited to the following:

as act 18-1, determining if the input parameter for the receiver node is of type UE, then if so, as act 18-2 using a set of parameters for use by the path loss model for the receiver node being of type UE, otherwise as act 18-3 using a set of parameters for use by the path loss model for the receiver node being of type not a UE.

As depicted by act 18-4 and act 18-6, selecting the propagation model to use per the input parameters if provided, as shown by respective act 18-5 and act 18-6, else as act 18-9 using a default model.

As act 18-8 calculating the pathloss from the transmitting node to the receiving node via the selected RF propagation model and node type parameters, and as act 18-9 returning the result. The CalculatePathLoss ( ) function 60 calculates the estimated Path Loss between nodes per the Path Loss model, and per the Rx node type parameters. The disclosure considers which model to use, but the details on the operation of the model selected by this function is not the point of this disclosure. Any number of different models can determine the path loss. For example, the Friis equation, can solve for the Path Loss given: distance between Tx and Rx antenna, Tx Power, Tx Freq, and other antenna configuration parameter. Other Path Loss modes are: Walfish-Ikegami, Okumura-Hata, Longley-Rice, Lee and Young.

F.7 BMP: InterferenceOffset(NodeInfo) Function

The InterferenceOffset(NodeInfo) function 140 takes 1 parameter as input: Info about the node to be considered. The function returns a value that is a signal strength offset used for that node when considering the relative strength between a transmitted signal and a receiver sensitivity when determining if the Child node may be interfered with by the Parent node transmissions. The value may be a default, generic and supplied by the system for either a UE or not a UE or it may be specific to the input node.

The InterferenceOffset(NodeInfo) function 140 returns the Interference Level Offset for the node passed as its argument. The interference level offset is used when evaluating if the parent node's Tx beam is interfering with a child node's receiver. The offset provides the system with the ability to fine tune the evaluation criteria when determining interference. The offset may be a positive or negative value.

Figure 19:
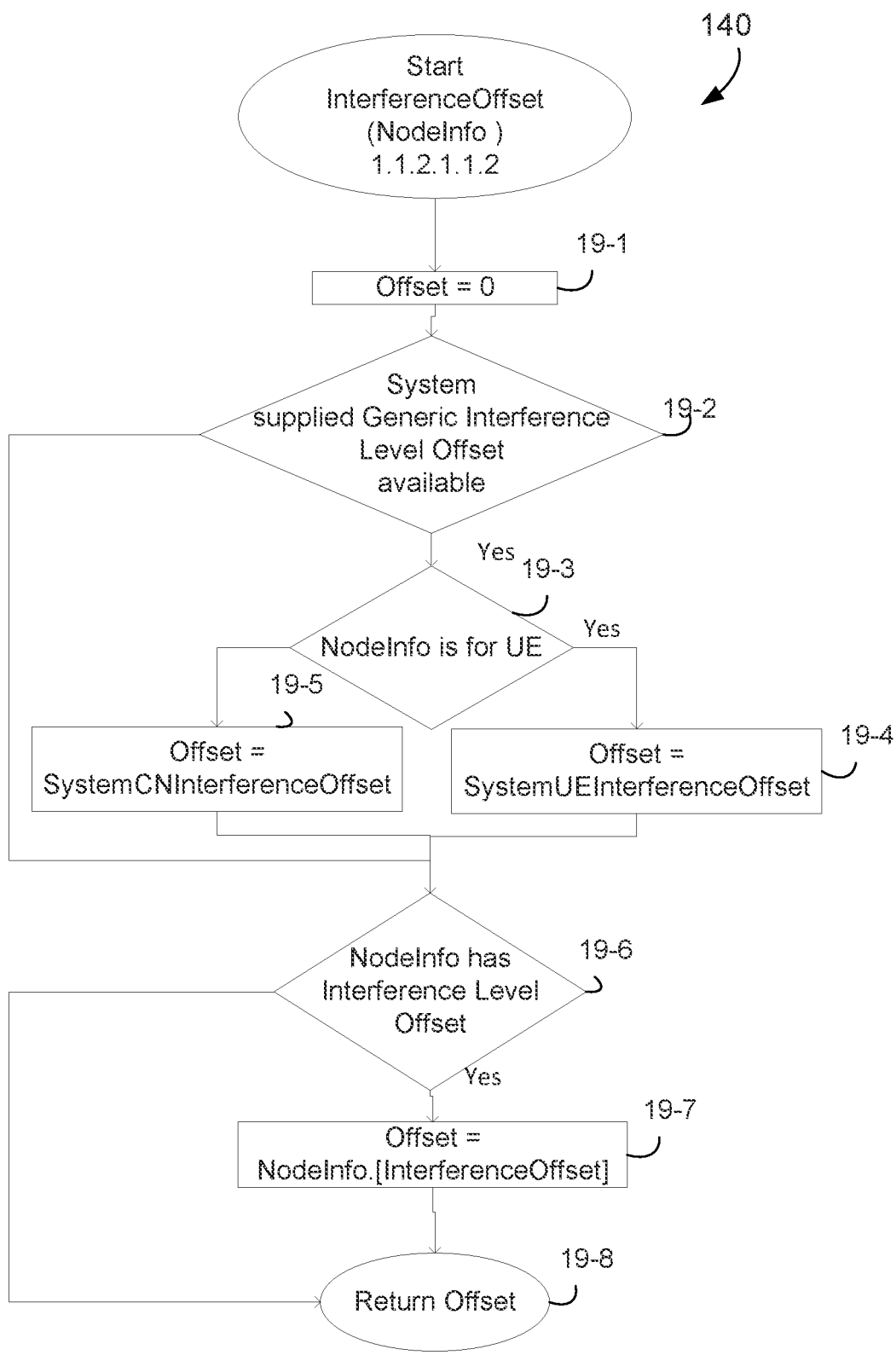
FIG. 19 is a flowchart showing example logic acts or steps comprising a beam management process as may be executed by a beam management processor (BMP).

Basic, representative acts or steps of an example implementation of the InterferenceOffset(NodeInfo) function 140 are shown in FIG. 19, and include but are not necessarily limited to the following:

As act 19-1 presetting the output of the InterferenceOffset (NodeInfo) function 140 to 0 db in anticipation of the condition that neither system generic or node specific Interference Level Offset values are provided by the system for use by the beam management process 70, then, as act 19-2, if a System supplied Interference Level Offset is provided, As act 19-3 further determining if the node is of type UE and in which case, as act 19-4, the system supplied Interference Level Offset for a node of type UE may be obtained and, depending on the outcome of act 19-6, be returned as act 19-8. Such system-supplied Interference Level Offset for a node of type UE may be obtained from a RRC Configuration message, for example.

otherwise as act 19-5 a system supplied Interference Level Offset for a node of type not UE may be obtained and, depending on the outcome of act 19-6, returned as act 19-8. Such system-supplied Interference Level Offset may be obtained from a system information block (SIB), for example.

Finally, if it is determined as act 19-6 that a node specific Interference Level Offset is available from the NodeInfo table parameter, then as act 19-7 obtaining the InterferenceLevel Offset and then as act 19-8 returning that Interference Level Offset.

F.8 BMP: MinRxThreshold(NodeInfo) Function

Figure 20:
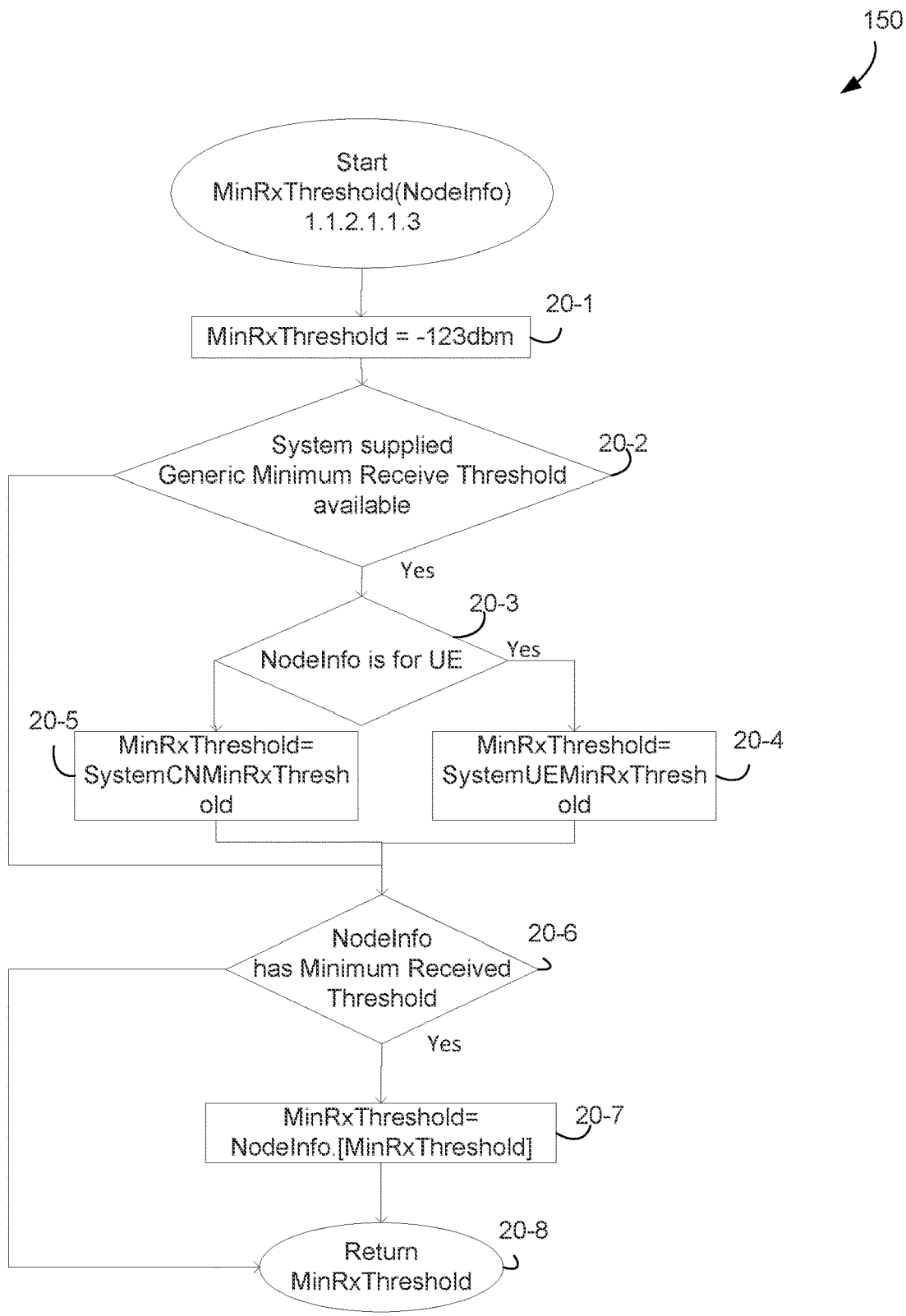
FIG. 20 is a flowchart showing example logic acts or steps comprising a beam management process as may be executed by a beam management processor (BMP).

Basic, representative acts or steps of an example implementation of the MinRxThreshold(NodeInfo) function 150 are shown in FIG. 20. The MinRxThreshold(NodeInfo) function 150 takes 1 parameter as input: Info about the node to be considered. The function returns a value that is the minimum signal strength that the node can receive and reliably decode the data in the signal. The value may be a default, generic and supplied by the system for either a UE or nor a UE or it may be specific to the input node.

The MinRxThreshold(NodeInfo) function 150 returns Minimum Receive Threshold for the node passed in argument to it, e.g., ChildNode or IABNode. The minimum received threshold value is used when evaluating if the parent node's Tx beam is interfering with a child node's receiver. Or, the minimum received threshold value is used when evaluating if the parent node's Tx beam is sufficiently strong at the IAB Node.

The basic, representative acts or steps of an example implementation of the MinRxThreshold(NodeInfo) function 150 shown in FIG. 20 include but are not necessarily limited to the following:

as act 20-1, presetting its output to −123 dbm in anticipation of the condition that neither system generic or node specific minimum receiver threshold values are provided by the system for use by the beam management process 70, then if it is determined as act 20-2 that a system supplied minimum receiver threshold is provided, then as act 20-3 further determining if the node is of type UE, and in which case as act 20-4 the system supplied minimum receiver threshold for a node of type UE may be obtained and, depending on the outcome of act 20-6, be returned as act 20-8, otherwise as act 20-5 a system supplied minimum receiver threshold for a node of type not UE may be obtained and, depending on the outcome of act 20-6, be returned as act 20-8.

Finally, if it is determined as act 20-6 that a node specific minimum receiver threshold is available from the NodeInfo table parameter, then such minimum receiver threshold is obtained as act 20-7 and returned as act 20-8

F.9 BMP: CheckDiffRxPower( ) Function

Figure 21:
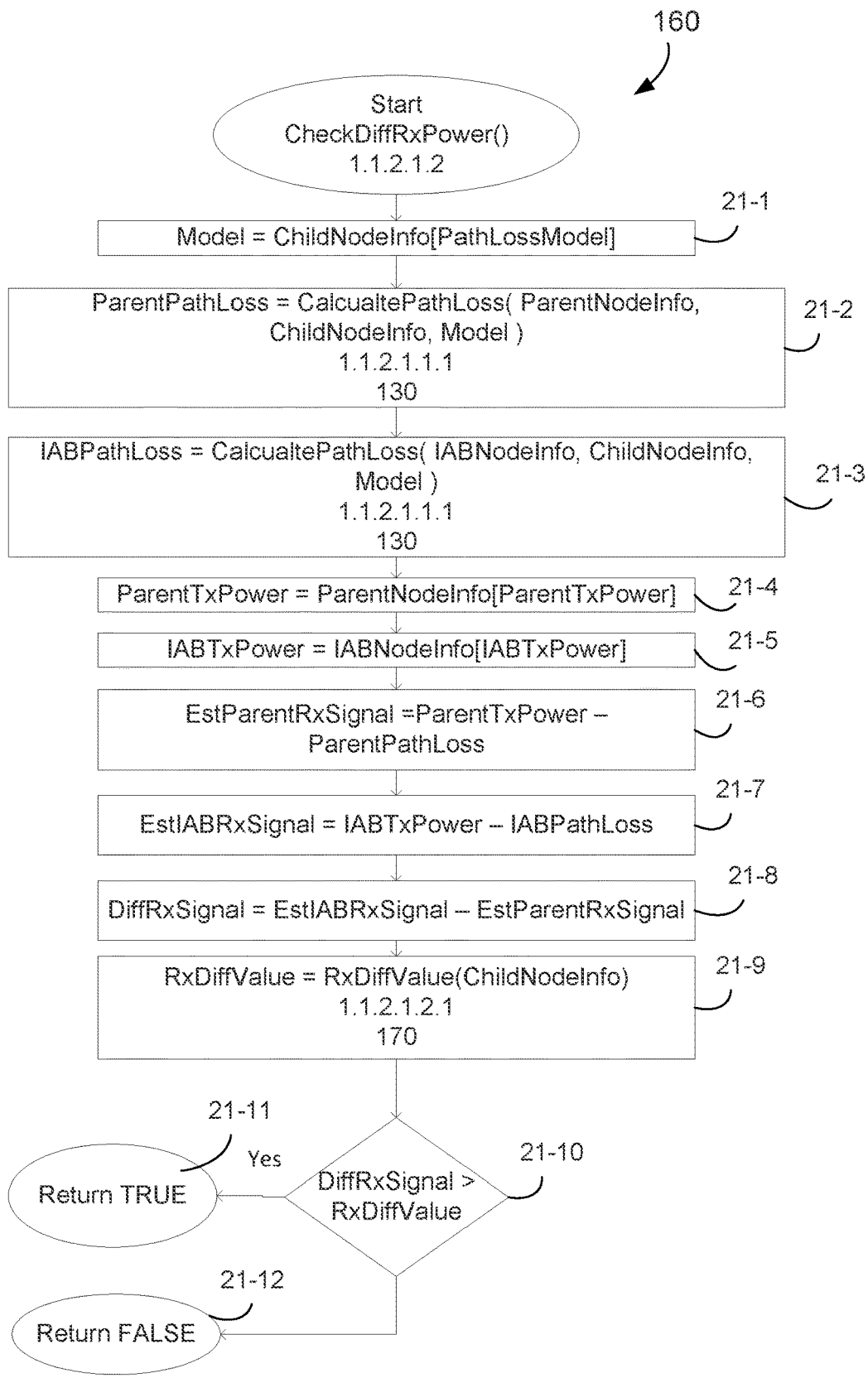
FIG. 21 is a flowchart showing example logic acts or steps comprising a beam management process as may be executed by a beam management processor (BMP).

Basic, representative acts or steps of an example implementation of the CheckDiffRxPower( ) 160 are shown in FIG. 21. The CheckDiffRxPower( ) 160 determines if the signal transmitted by the Parent node, adjusted for path loss to the Child node, is greater than the signal transmitted by the IAB node (adjusted for path loss to the Child node), and if so it returns True. Otherwise it returns False. The CheckDiffRxPower( ) 160 determines if the IAB node's received signal is sufficiently greater than the parent node's received signal such that the parent node's signal will not cause excessive interference to the child node.

The basic, representative acts or steps of an example implementation of the CheckDiffRxPower( ) 160 shown in FIG. 21 include but are not necessarily limited to the following:

as act 21-1 obtaining from the ChildNodeInfo table the RF propagation model to use for determining the Path Loss between transmitting node and receiving node, as act 21-2 using the CalculatePathLoss( ) function 130 with 3 input parameters to estimate the loss in RF signal strength from the Parent node to the Child node for a given path loss model, then as act 21-3 using the CalculatePathLoss( ) function 130 with 3 input parameters to estimate the loss in RF signal strength from the LAB node to the Child node for a given path loss model, then as act 21-4 obtaining from the ParentNodeInfo table the current transmission power of the Parent Node's Tx beam, then as act 21-5 obtaining from the IABNodeInfo table the current transmission power of the IAB Node's Tx beam, then as act 21-6 calculating the Parent nodes received signal strength at the Child node, then as act 21-7 calculating the LAB nodes received signal strength at the Child node, as act 21-8 calculating the difference between the Parent node's received signal and the IAB node's received signal, then as act 21-9 using the RxDiffValue( ) function 80 to obtain an value representing the difference in the Parent node's received signal and the IAB node's received signal.

then as act 21-10 determining if the LAB node's signal received at the Child node is sufficiently stronger (as determined by the Difference Value) than the Parent node's signal received at the Child node such that the interference caused by the Parent nodes signal will not prevent the Child node from decoding the IAB nodes signal, and as act 21-11 returning True, otherwise as act 21-12 returning False.

F.10 BMP: RxDiffValue(NodeInfo) Function

Figure 22:
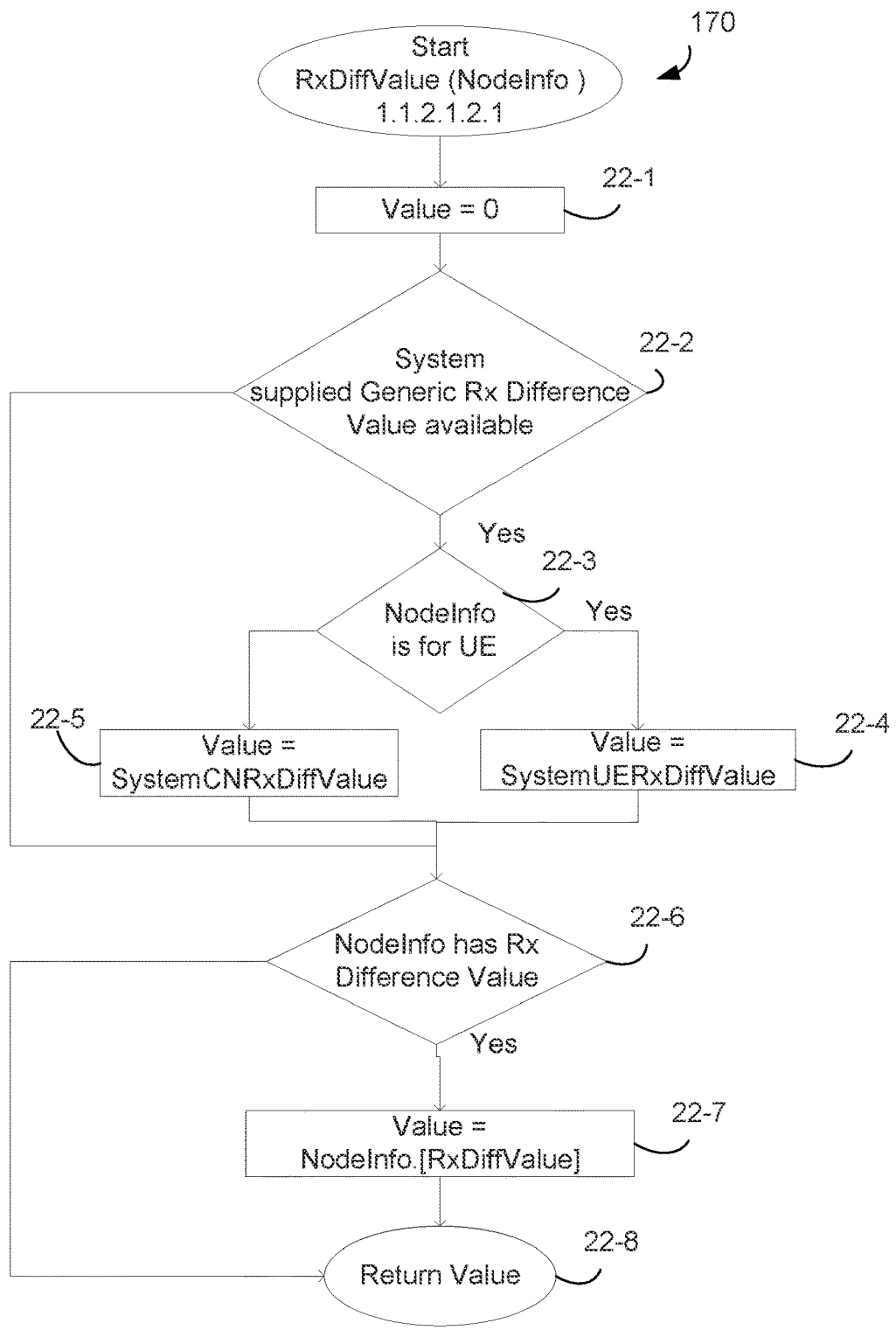
FIG. 22 is a flowchart showing example logic acts or steps comprising a beam management process as may be executed by a beam management processor (BMP).

Basic, representative acts or steps of an example implementation of the RxDiffValue(NodeInfo) function 170 are shown in FIG. 22. The RxDiffValue(NodeInfo) function 170 takes 1 parameter as input: Info about the node to be considered. The function returns a value that is the difference is signal strength between two transmitting nodes. The value may be a default, generic and supplied by the system for either a UE or nor a UE or it may be specific to the input node. The RxDiffValue(NodeInfo) function 170 returns a value representing the difference in strength between two signals as perceived by the node pass in by argument. The value is used when evaluating if the parent node's Tx beam is interfering with a child node's receiver. The value provides the system the ability to fine tune the evaluation criteria when determining interference.

The basic, representative acts or steps of an example implementation of the RxDiffValue(NodeInfo) function 170 shown in FIG. 22 include but are not necessarily limited to the following:
- as act 22-1 presetting its output to 0 in anticipation of the condition that neither system generic or node specific difference values are provided by the system for use by the BMP,
- act 22-2 comprises determining if a system supplied difference value is provided. A system supplied difference value may be provided in a case that the Rx Difference Value that is generic for nodes that are not a UE, and in a case in which a generic value is provided for UEs, may be obtained from a system information block (SIB). If it is determined at act 22-2 that such a system supplied difference value is provided, then
- act 22-3 further determines if the node is of type UE and in which case as act 22-4 the system supplied difference value for a node of type UE may be obtained and, depending on the outcome of act 22-6, returned as act 22-8,
- otherwise act 22-5 comprises obtaining a system supplied difference value for a node of type not UE and, depending on the outcome of act 22-6, as act 22-8 returning such system supplied difference value for a node of type not UE. Such Rx Difference Value that is specific to such node may be obtained from an RRC Configuration message.
- Finally, if it is determined as act 22-6 that a node specific difference value is available from the NodeInfo table parameter, then as act 22-7 obtaining and then as act 22-8 returning that difference value.

F.11 BMP: The CheckBeamAlignment( ) Function

Figure 23:
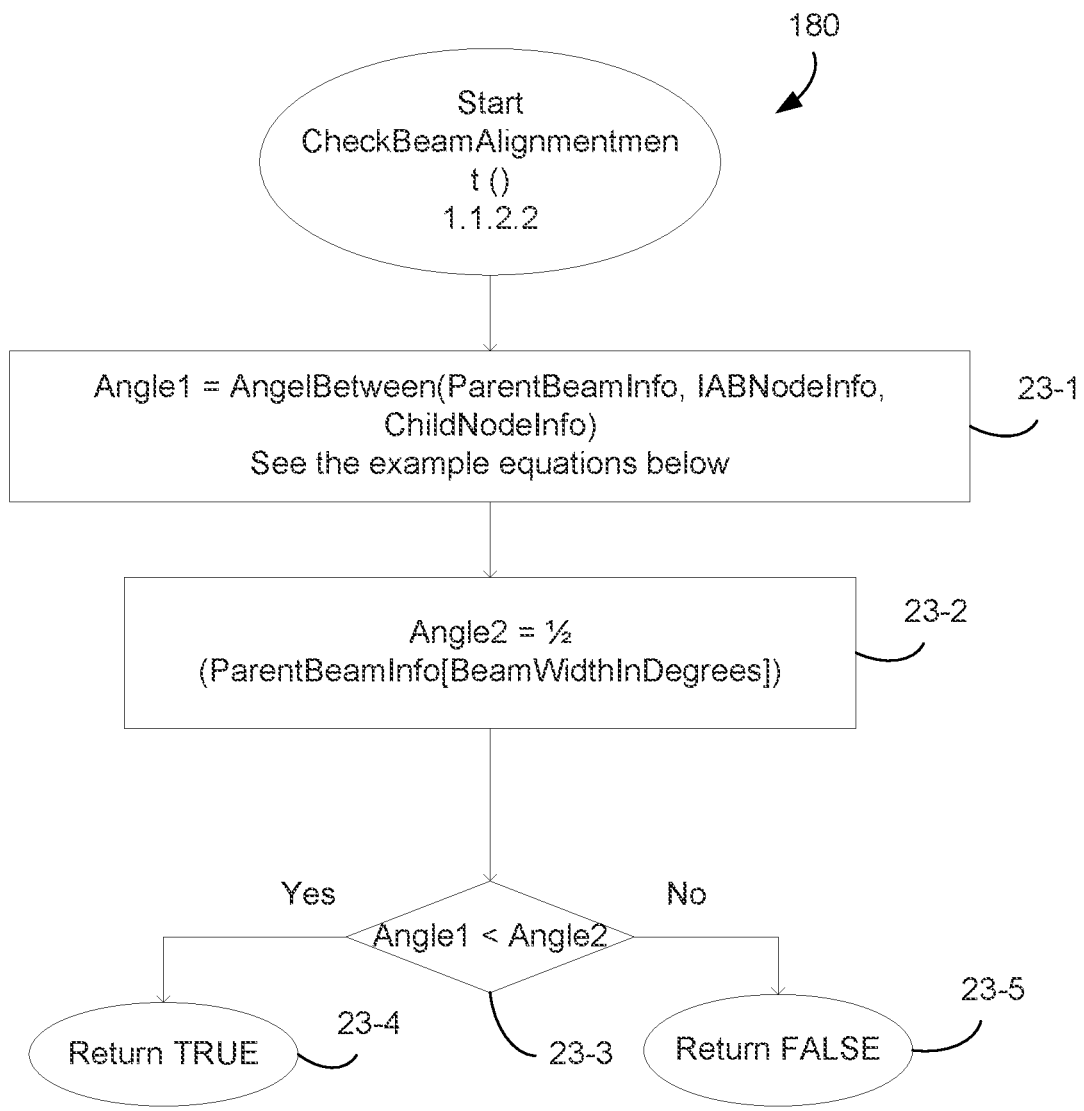
FIG. 23 is a flowchart showing example logic acts or steps comprising a beam management process as may be executed by a beam management processor (BMP).

Basic, representative acts or steps of an example implementation of the CheckBeamAlignment( ) function 180 are shown in FIG. 23. The CheckBeamAlignment( ) function 180 determines if the Parent node Tx beam that services the TAB node aligns with the TAB nodes Tx beam that services the Child node such that both Tx beams may cover the Child node's location. The CheckBeamAlignment( ) function 180 determines if there is an alignment of the parent node's Tx beam with that of an IAB node's Tx beam with that of a child node.

The basic, representative acts or steps of an example implementation of the CheckBeamAlignment( ) function 180 shown in FIG. 23 include but are not necessarily limited to the following:
- as act 23-1, using the AngleBetweenPoint( ) function with 3 input parameters, e.g. ParentNodeInfo, IABNodeInfo, and ChildNodeInfo, to calculate an angle between two lines interesting at the ParentNode's location and terminating each at the IAB node's and Child node's location. Two example, non-limiting equations for the AngleBetweenPoint( ) function are shown below, it being understood that there are many other ways to derive the angle between two lines in two dimensions.

Equation 1: p1 is the intersecting point of two lines, and the result is in degrees.
AngleBetween(p0, p1, p2)

a=Math.pow(p1.x-p0.x,2)+Math.pow(p1.y-p0.y,2), b=Math.pow(p1.x-p2.x,2)+Math.pow(p1.y-p2.y,2), c=Math.pow(p2.x-p0.x,2)+Math.pow(p2.y-p0.y,2);

return Rad2Deg(Math.acos((a+b−c)/Math.sqrt (4*a*b)))

Equation 2: p1 is the origin point of two lines, and the result is in degrees.
AngleBetween(p0, p1, p2)

v1=Vector(p0[Location],p1[Location])

v2=vector(p0[Location],p2[Location])

return Rad2Deg (arccos (v1 dot v2)/(magnitude (v1) *magnitude(v2)))

- then as act 23-2 obtaining from the ParentNodeInfo table the width in degrees of the Parent Node's Tx beam and then multiplies angle by 0.5.
- determining as act 23-3 if the angle of ½ the Parent node's Tx beam width is greater than the angle between the two lines. If so then as act 23-4 the CheckBeamAlignment( ) function 180 returns True indicating that the Parent Node Tx beam and IAB node Tx beam are in alignment such that the Child node may be covered by both beams, otherwise as act 23-5 it returns False.

F.12 BMP: The PowerControlMitigation( ) Function

Figure 24:
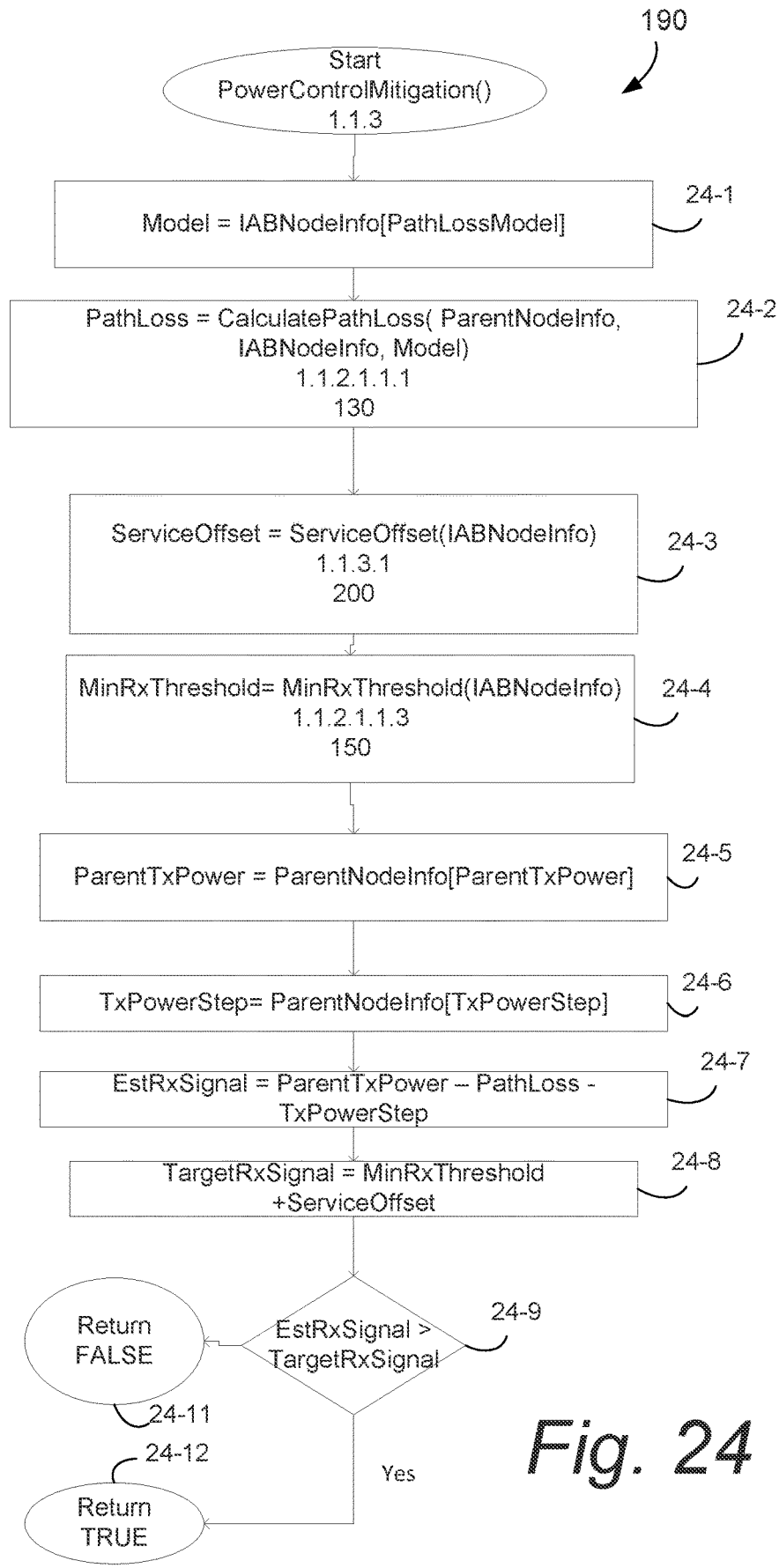
FIG. 24 is a flowchart showing example logic acts or steps comprising a beam management process as may be executed by a beam management processor (BMP).

Basic, representative acts or steps of an example implementation of the PowerControlMitigation( ) function 190 are shown in FIG. 24. The PowerControlMitigation( ) function 190 estimates if a pre-determined reduction in the Parent node's Tx Beam signal strength can be reliable received by the IAB node, e.g., The Parent node can still provide an acceptable level of service to the IAB node given the reduces signal strength, and if so the PowerControlMitigation( ) will return True and otherwise False. The PowerControlMitigation( ) function 190 determines if the IAB node may be able to maintain an acceptable level of service from the parent node if the parent node's signal is reduced by the TxPowerStep value, given that the parent node's signal is also adjusted for pathloss and the IAB node's receiver sensitivity is also adjusted by a system-supplied service offset.

The basic, representative acts or steps of an example implementation of the CheckBeamAlignment( ) function 180 shown in FIG. 24 include but are not necessarily limited to the following:
- as act 24-1 obtaining from the IABNodeInfo table the model to use for determining the Path Loss between transmitting node and receiving node,
- as act 24-2 using the CalculatePathLoss( ) function 130 with 3 input parameters to estimate the loss in RF signal strength from the transmitter to receiver, e.g. Parent node to IAB node for a given path loss model. As mentioned above, techniques such as the Friis equation, Walfish-Ikegami, Okumra-Hata, Longley-Rice, Lee and Young may be employed.

as act 24-3 using the ServiceOffset( ) function 200 with 1 input parameter to obtain an offset for use in determining if the IAB node's receiver can reliable receive the Parent nodes Tx beam, as act 24-4 using the MinRxThreshold( ) function 150 with 1 input parameter to obtain a minimum received signal for use in determining if the IAB node's receiver can reliably receive the Parent nodes Tx beam, as act 24-5 obtaining from the ParentNodeInfo table the current transmission power of the Parent Node's Tx beam, as act 24-6 obtaining from the ParentNodeInfo table the step-wise change in transmission power of the Parent Node's Tx beam.

as act 24-7 through act 24-9, determining if the estimated Parent node's transmission power, less the Path loss to the IAB node, less the system supplied step wise change in Parent node Tx power is greater than the minimum receiver threshold the of the Child node plus a system supplied offset, and if so, as act 24-12 returning True, otherwise as act 12-11 returning False.

If the Estimated signal strength of the Parent node Tx Beam at the IAB node, e.g., the Tx power less the path loss to the IAB node and less the expected change in Tx Power) is greater then the IAB Nodes target/Rx signal strength (i.e. minimum receive threshold of the IAB node plus a system offset value), then the IAB node may be able to still receive the Parent node transmissions if the Parent node reduces its Tx Beam power by the TxPowerStep value.

F.13 BMP: ServiceOffset (NodeInfo) Function

Figure 25:
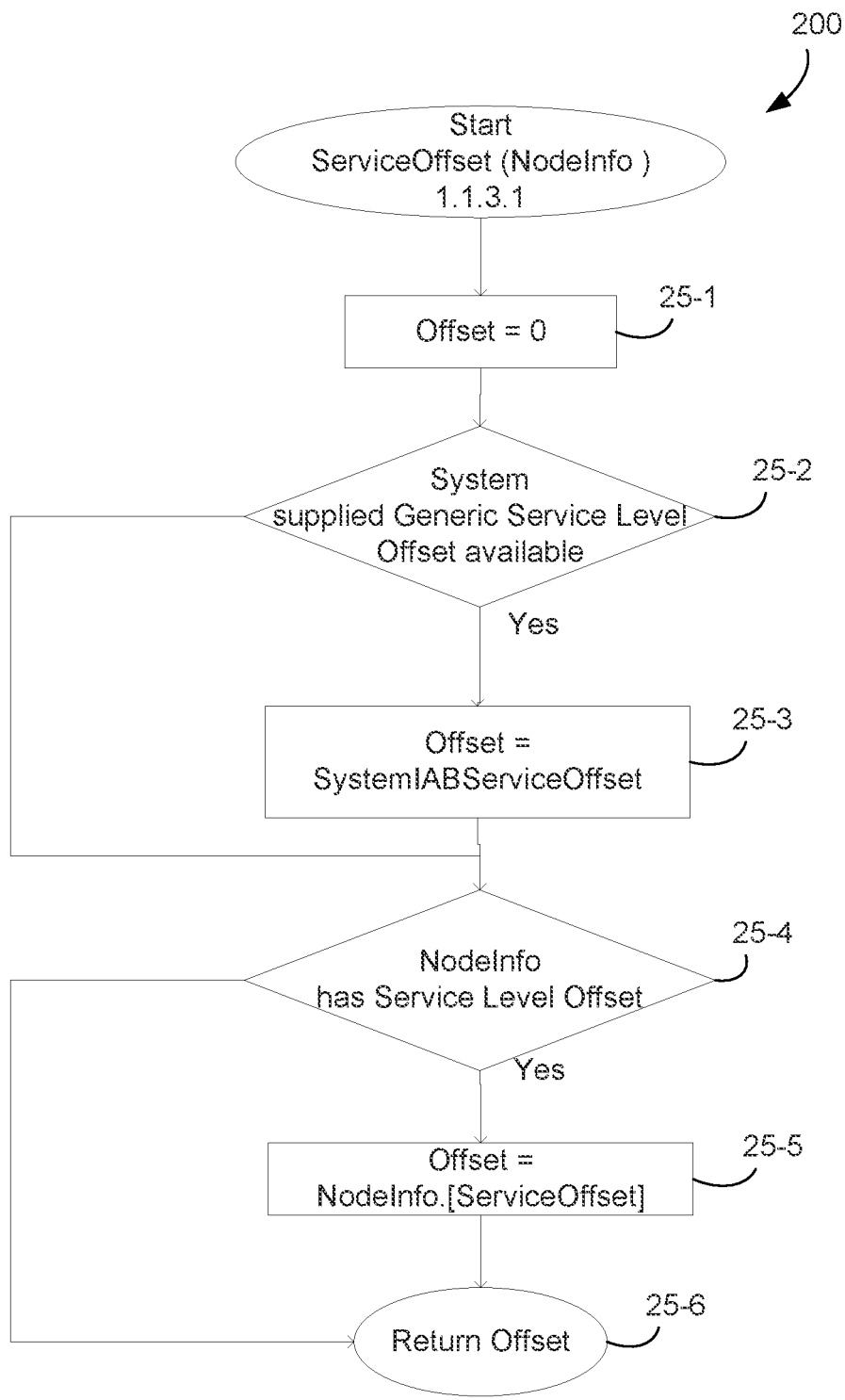
FIG. 25 is a flowchart showing example logic acts or steps comprising a beam management process as may be executed by a beam management processor (BMP).

Basic, representative acts or steps of an example implementation of the ServiceOffset (NodeInfo) function 200 are shown in FIG. 25. The ServiceOffset (NodeInfo) function 200 takes 1 parameter as input: Info about the node to be considered. The function returns a value that is a signal strength offset used for that node when considering the relative strength between a transmitted signal and a receiver sensitivity when determining if the IAB node may be able to still receive the Parent node transmissions. The value may be a default, generic and supplied by the system for either a UE or nor a UE or it may be specific to the input node.

The basic, representative acts or steps of an example implementation of the ServiceOffset (NodeInfo) function 200 shown in FIG. 25 include but are not necessarily limited to the following:

as act 25-1, presetting it output to 0 db in anticipation of the condition that neither system generic or node specific Service Level Offset values are provided by the system for use by the BMP, then if it is determined as act 25-2 that a system supplied Service Level Offset is provided, as act 25-3 obtaining such system supplied Service Level Offset, e.g., from a system information block (SIB), and eventually, depending on the outcome of act 25-4, as act 25-6 returning the system supplied Service Level Offset for a node of type IAB, if it is determined as act 25-4 that a node specific Interference Level Offset is available from the NodeInfo table parameter, then as act 25-5 obtaining such node specific Interference Level Offset, e.g., from a RRC Configuration message, and, depending on the outcome of act 22-6, as act 25-6 returning that node specific Interference Level Offset.

F.14 BMP: ReqTxPowerDecrease( ) Function

Figure 26:
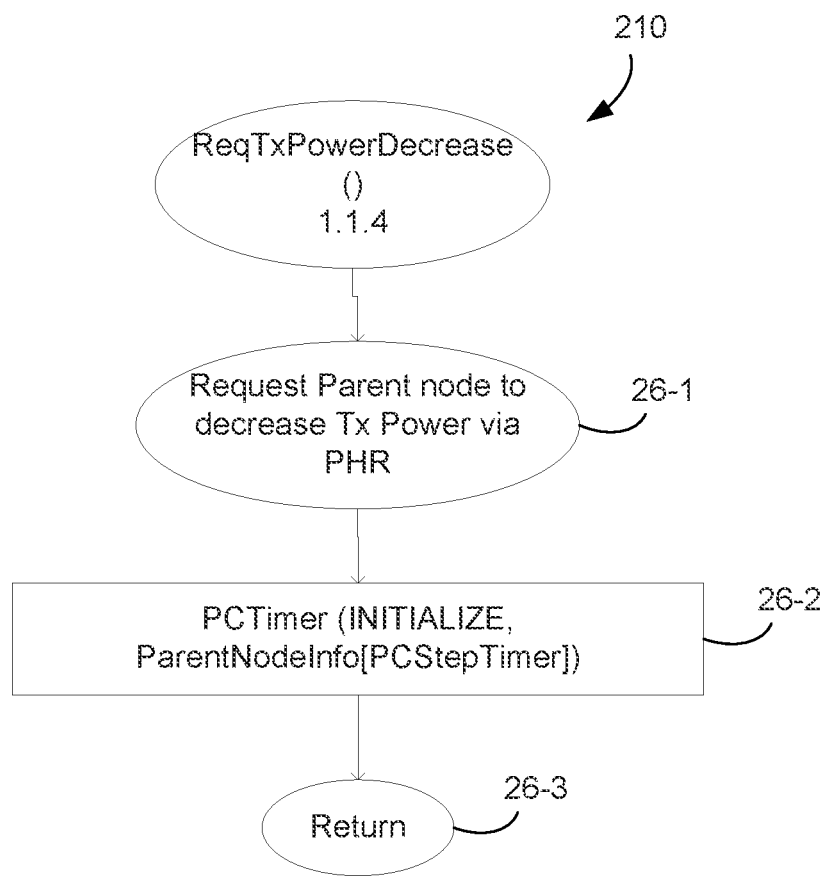
FIG. 26 is a flowchart showing example logic acts or steps comprising a beam management process as may be executed by a beam management processor (BMP).

Basic, representative acts or steps of an example implementation of the ReqTxPowerDecrease( ) function 210 are shown in FIG. 26. The ReqTxPowerDecrease( ) function 210 makes the request to the Parent node to decrease the Tx power of the beam serving the IAB bode by a stepwise amount that is pre-agreed, e.g., the TxPowerStep value associated with the Parent Node is the pre-agreed amount. The ReqTxPowerDecrease( ) function 210 makes the request that the parent node decrease the power of its Tx beam serving the IAB node by the Power Control Step value, and initializes the PCTimer to a value provided by the parent node.

Basic, representative acts or steps of an example implementation of the ReqTxPowerDecrease( ) function 210 shown in FIG. 26 include but are not necessarily limited to the following:

as act 26-1, using the PwrHeadroomRpt( ) function to send a request to the Parent node requesting that the Parent node decrease its Tx beam signal by the stepwise predetermined amount, then, also as act 26-1, obtaining from the Parent node Info the value representing how long the BMP should wait before attempting to make a request to change the Parent nodes Tx beam signal. The value obtained from act 26-1 represents how long the BMP should wait between attempts to request a modification of the parent's Tx beam to initialize the timer PCTimer( ).

then as act 26-3 using the value obtained from act 26-1 to initialize the timer PCTimer( ), which value is returned as act 26-3.

F.15 BMP: IncreaseTxPower( ) Function

Figure 27:
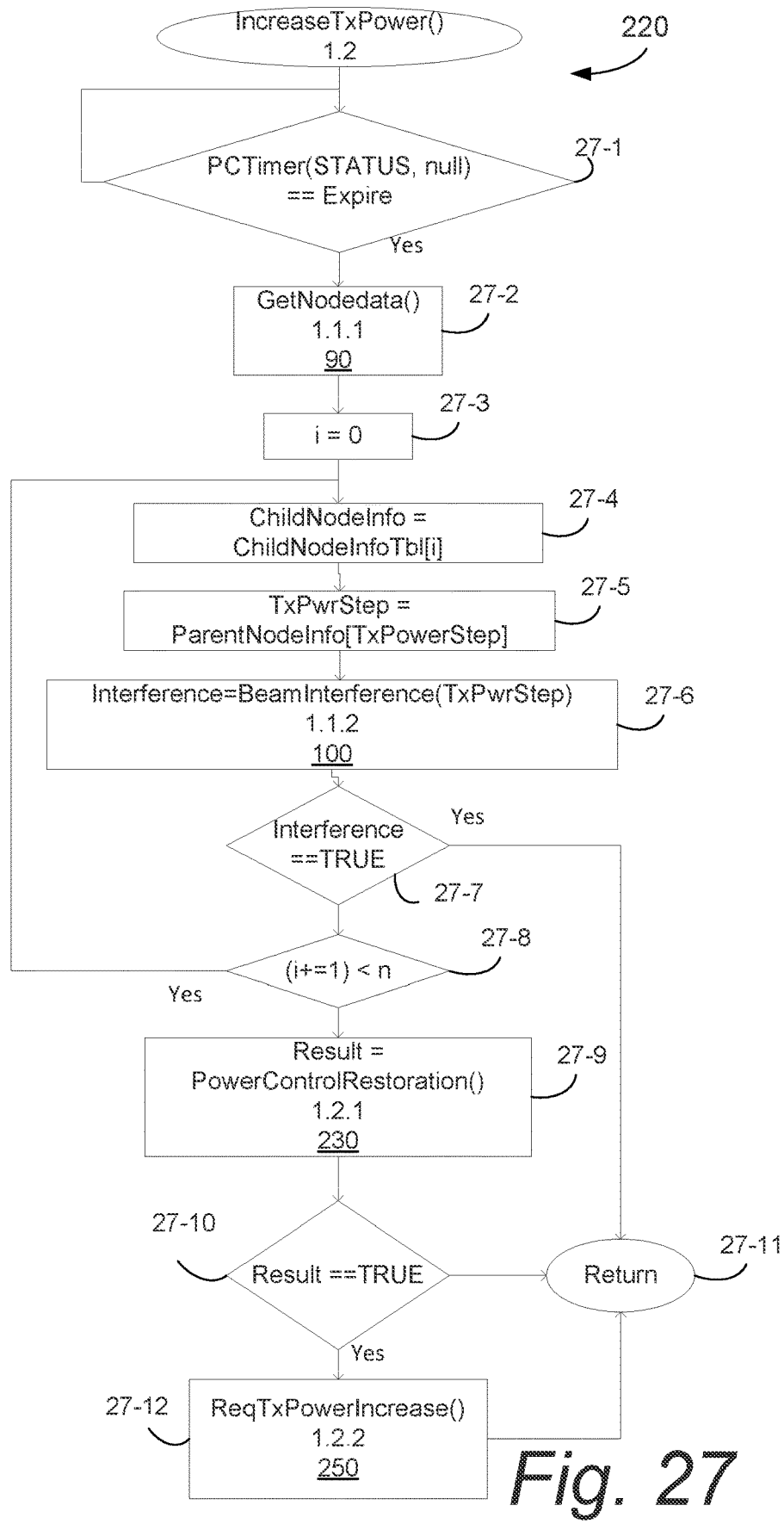
FIG. 27 is a flowchart showing example logic acts or steps comprising a beam management process as may be executed by a beam management processor (BMP).

Basic, representative acts or steps of an example implementation of the IncreaseTxPower( ) function 220 are shown in FIG. 27. The IncreaseTxPower( ) function 220 determines if any of the Child nodes of the IAB node serviced by the Parent node will experience CLI as a result of a increase the Parent node's Tx beam signal, and if such an increase would also result in an increase in throughput for the Chile node, and if such an increase would also not exceed the Parent node's Tx power limit. The IncreaseTxPower( ) function 220 is the top level function for determining if an increase in the power of the parent node's Tx beam is possible, and making the request to the parent node for such an increase.

The basic, representative acts or steps of an example implementation of the IncreaseTxPower( ) function 220 shown in FIG. 27 include but are not necessarily limited to the following:

as act 27-1, waiting until the Power Control timer is expired. The Power Control timer is a system programmable time before a next possible request to change the parent node transmit power. Location of timer wait loops are placed such that the timer will not cause a delay if the last request was to increase the Tx power and the immediate subsequent request was to decrease the Tx power.

as act 27-2 using the GetNodeData( ) function 90 to obtain all the necessary data for the BMP to execute its functionality, then, after initializing a loop index corresponding to the child nodes as act 27-3, for each Child node in the ChildNodeInfoTable, e.g., each Child node's info is each in turn copied into ChildNodeInfo for processing, performing acts 27-4 through 27-8.

act 27-4 and act 27-5 comprise obtaining from the ParentNodeInfo table the expected step-wise change in the Parent nodes Tx Beam signal. In particular, act 27-4 comprises using the index to obtain information about a child node from the ChildNodeInfoTable. Act 27-5 comprises obtaining an input parameter to an expected change in the parent node's Tx power to evaluate the parent node's potential interference on the child node.

act 27-6 comprises using the BeamInterference( ) function 100 with its input parameter set to the step-wise change to estimate if the step-wise increase in the Parent nodes Tx Beam signal would result in CLI upon the Child node.

act 27-7 comprises determining whether the BeamInterference( ) function 100 returns True, e.g., indicating interference, with the result that the function as act 27-11 will return to the beginning of the beam management process 70 (see FIG. 12) without requesting an increase in the Parent node's Tx beam signal.

otherwise if it is determined as act 27-8 that the IncreaseTxPower( ) function 220 has sequentially stepped through all the Child nodes in the ChildNodeInfoTable, as act 27-9 using the PowerControlRestoration( ) function 230 to determine if an increase in Parent Tx power will not exceed the Parent node's Tx limit and may also result in LAB nodes throughput increase.

If it is determined as act 27-10 that the PowerControlRestoration( ) function 230 returns True, then as act 27-12 the TxPower( ) function will use the ReqTxPowerIncrease( ) function to request that the Parent node increase the Tx power of the beam serving the IAB node. Following act 27-12 the IncreaseTxPower( ) function 220 will perform act 27-11, which is a return to the beginning of the beam management process 70 of FIG. 12

F.16 BMP: PowerControlRestoration( ) Function

Figure 28:
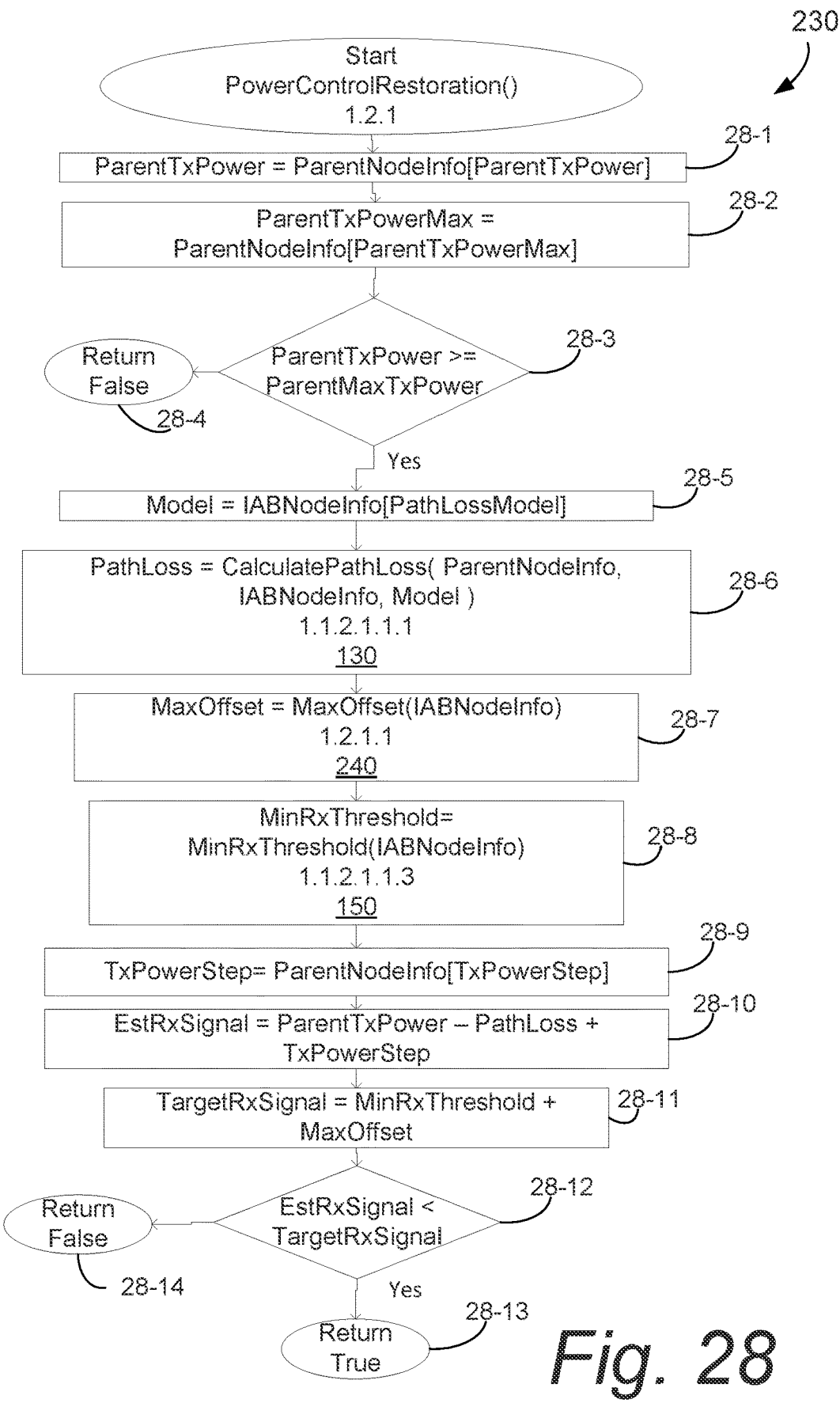
FIG. 28 is a flowchart showing example logic acts or steps comprising a beam management process as may be executed by a beam management processor (BMP).

Basic, representative acts or steps of an example implementation of the PowerControlRestoration( ) function 230 are shown in FIG. 28. The PowerControlRestoration( ) function 230 considers two aspects that an increase in the Parent nodes Tx beam signal would have: First it determines if the Parent node is already at max Tx power, then it will determine if the increase in the Parent nodes Tx beam signal would result in the signal received at the Child node exceeding some maximum (i.e. more signal would not provide any increase to the IAB node throughput). If either aspect is true the function returns False, otherwise True.

The PowerControlRestoration( ) function 230 determines if an increase in the parent node's transmit power is possible. The function checks for two aspects: (1) If the parent node is already at maximum Tx power, the PowerControlRestoration( ) function 230 determines not to make the request as such request would just be wasted signaling; (2) if the request to increase the power of the parent node's Tx beam will result in the received signal at the child node exceeding some maximum, the PowerControlRestoration( ) function 230 will not make the request since any increase in received signal by the child node does not result in any improvement in throughput for the IAB node.

The basic, representative acts or steps of an example implementation of the PowerControlRestoration( ) function 230 shown in FIG. 28 include but are not necessarily limited to the following:

as act 28-1, obtaining from the ParentNodeInfo table the current power level that the Parent node is using for the Tx beam servicing the IAB node, then as act 28-2 obtaining from the ParentNodeInfo table the maximum power level that the Parent node may use for the Tx beam servicing the IAB node, then as act 28-3 determining if the current power level of the Parent node's Tx beam is greater or equal to the maximum level that Parent node's Tx beam, and if so as act 28-4 the PowerControlRestoration( ) function returning False.

Otherwise, as act 28-5 obtaining from the IABNodeInfo table the Path Loss model to use, then as act 28-6 using the CalculatePathLoss( ) function 130 with 3 input parameters to estimate the loss in RF signal strength from the transmitter to receiver, e.g. Parent node to IAB node for a given path loss model, then as act 28-7 using the MaxOffset( ) function 240 with 1 input parameter to obtain an offset for use in determining if the signal received at the IAB-node from the Parent node has exceeded a level which provides no additional benefit to the IAB node, then as act 28-8 using the MinRxThreshold( ) function 150 with 1 input parameter to obtain the minimum received signal for IAB node's receiver, as act 28-9 obtaining from the ParentNodeInfo table the step-wise change in transmission power of the Parent Node's Tx beam.

as act 28-10 through act 28-12, determining if the estimated Parent node's current transmission power, less the Path loss to the IAB node, plus the system supplied step wise change in Parent node Tx power is greater than the minimum receiver threshold the of the Child node plus a system supplied offset. If the determination of act 28-12 is affirmative, as act 28-13 PowerControlRestoration( ) function 230 returns True, otherwise as act 28-14 PowerControlRestoration( ) function 230 returns False.

If the Estimated signal strength of the Parent node Tx Beam at the IAB node, e.g., Tx power less the path loss to the IAB node and plus the expected change in Tx power, is less than the IAB Nodes target Rx max signal strength, e.g., Min receive threshold of the IAB node plus some system offset value, then the JAB node may be able to increase it received throughput of the Parent node transmissions if the Parent node increases its Tx Beam power by the TxPowerStep value. Otherwise a request to increase the Parent node Tx power may not benefit the JAB node.

F.17 BMP: MaxOffset (NodeInfo) Function

Figure 29:
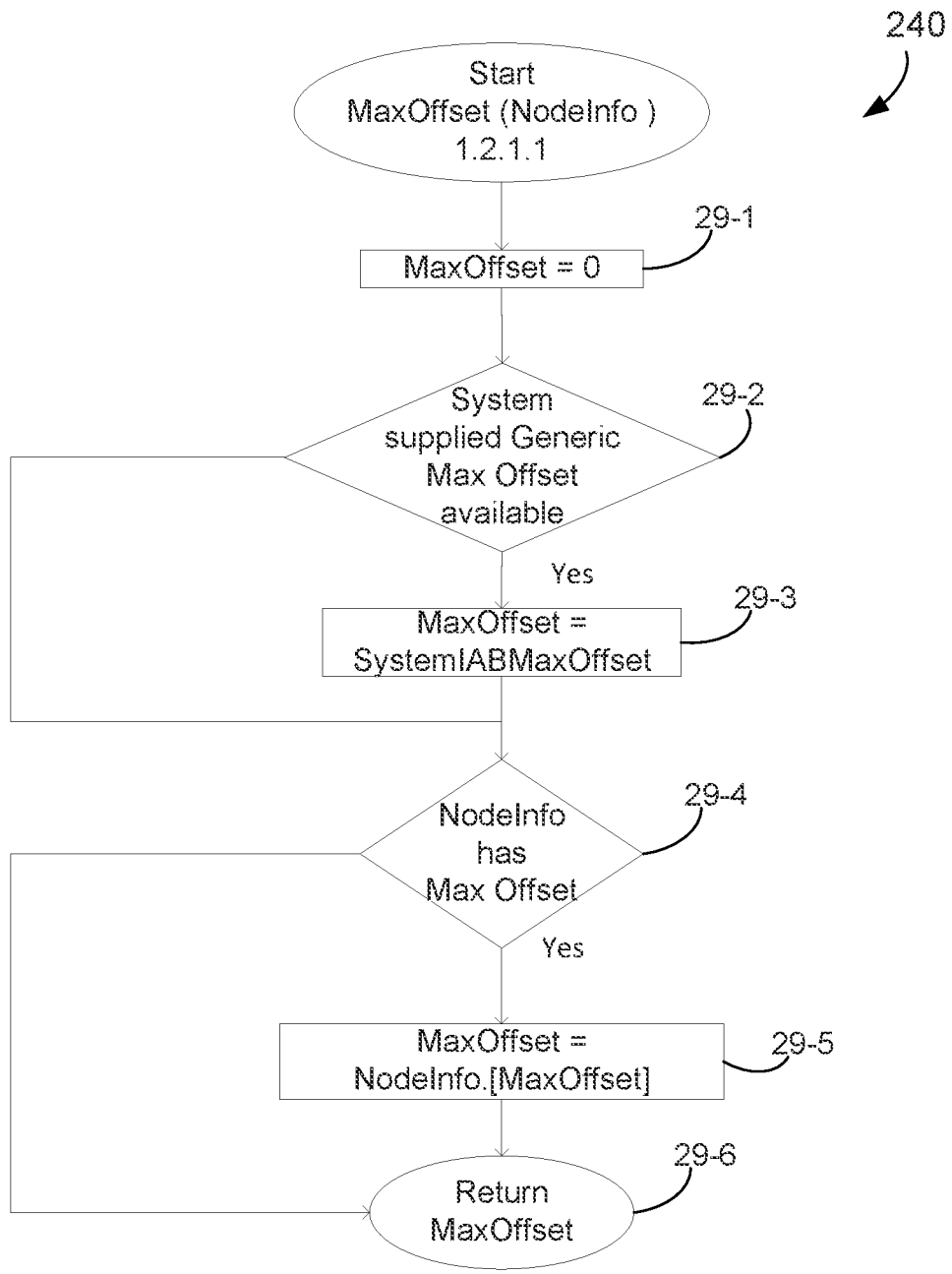
FIG. 29 is a flowchart showing example logic acts or steps comprising a beam management process as may be executed by a beam management processor (BMP).

Basic, representative acts or steps of an example implementation of the MaxOffset (NodeInfo) function 240 are shown in FIG. 29. The MaxOffset (NodeInfo) function 240 takes 1 parameter as input: Info about the node, The function returns a value that when combined with the minimum received signal strength (i.e. the level that the node can receive and reliably decode the data in the signal) produces a value representing a signal strength threshold above which the receiver is not able derive any increase in data throughput (i.e. a Max Rx Signal Strength). The value may be a default and supplied by the system or it may be specific to the LAB node. The MaxOffset (NodeInfo) function 240 returns the Maximum Offset for the node pass to the MaxOffset (NodeInfo) function 240 via argument. The Maximum Offset is used when evaluating if the signal received by the JAB node has exceeded a level above which no additional benefit is derived by the JAB node. The offset provides the system with the ability to fine tune the evaluation criteria when determining if an increase in the parent node Tx beam power will provide any benefit to the JAB node (i.e. more signal would provide an increase to the IAB node throughput).

The basic, representative acts or steps of an example implementation of the MaxOffset (NodeInfo) function 240 shown in FIG. 29 include but are not necessarily limited to the following:

as act 29-1, presetting its output to 0 dbm in anticipation of the condition that neither system generic or node specific minimum receiver threshold values are provided by the system for use by the BMP, then if it is determined as act 29-2, if a system supplied maximum offset is provided, e.g., provided by a system information block (SIB), then, depending on the outcome of act 29-4, as act 29-3 obtaining the system supplied maximum offset as act 29-6 returning the system supplied maximum offset for a node of type IAB, if it is determined as act 29-4 that a node specific maximum offset is available from the NodeInfo table parameter, then such node specific maximum offset is obtained, e.g., via RRC, as act 29-5 and returned as act 29-6.

F.18 BMP: ReqTxPowerIncrease( ) Function

Figure 30:
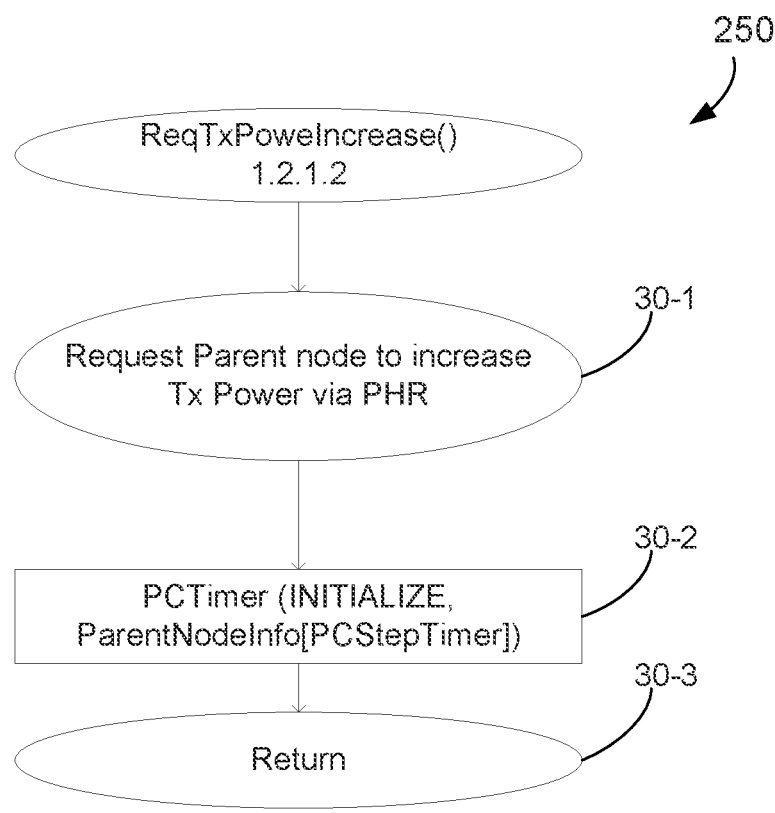
FIG. 30 is a flowchart showing example logic acts or steps comprising a beam management process as may be executed by a beam management processor (BMP).

Basic, representative acts or steps of an example implementation of the ReqTxPowerIncrease( ) function 250 are shown in FIG. 30. The ReqTxPowerIncrease( ) function 250 makes the request to the Parent node to increase the Tx power of the beam serving the IAB bode by a stepwise amount. The ReqTxPowerIncrease( ) function 250 makes the request that the parent node increase the power of its Tx beam serving the IAB node by the Power Control Step value, and initializes the PCTimer to a value provided by the parent node.

The basic, representative acts or steps of an example implementation of the ReqTxPowerIncrease( ) function 250 shown in FIG. 30 include but are not necessarily limited to the following:

as act 30-1 using the PwrHeadroomRpt( ) function to send a request to the Parent node requesting that the Parent node increase its Tx beam signal by the stepwise predetermined amount, and obtaining from the Parent node Info the value representing how long the BMP should wait before attempting to make a request to change the Parent nodes Tx beam signal. A Power Headroom Report (PHR) (a type of MAC CE(MAC Control Element)) is used to report that the headroom between the estimated received signal strength of the Parent node at the IAB node and the IAB nodes minimum received signal threshold is sufficient to support a increase in the Parent nodes Tx Power by the TxPowerStep and still benefit via an increase in bandwidth with the LAB node.

then as act 30-2 using the value to initialize the timer PCTimer( ), and thereafter as act 30-3 returning. After each request to change to the Tx Beam power of the Parent node, the BMP will initialize this timer with a value associated with the Parent node. When the timer expires, the beam management process 70 will re-evaluate the Parent node Tx Beam power to determine if the Tx Beam power can be changed.

G: Signaling to Increase/Decrease Parent Node Tx Power

The beam modification command 72 mentioned previously (see FIG. 2A and FIG. 2B) is an example of signaling that may be employed to request an increase or decrease in a parent node's transmit power. In an example embodiment and mode, the beam modification command 72 may take the form of a medium access control (MAC) control element (CE), such as a power head room (PHR) MAC CE, PHR MAC CE. Table 1 below shows an example format of a single Entry PHR MAC CE (LCID 57), e.g., how the PHR MAC CE as defined in TS 38.321 may be modified to accommodate the technology disclosed herein and particularly the beam modification command 72. A PHR MAC CE of type multiple entry (LCID 56 or LCID 54) may also be used in the similar manner.

TABLE 1

MODIFIED SINGLE ENTRY PHR MAC CE
Single Entry PHR MAC CE

The Single Entry PHR MAC CE is identified by a MAC subheader with LCID 57
  Note however that Multiple Entry PHR MAC CE report structures (i.e. LCID 56 and LCID 54)
  could also be used in nearly the same way as the Single Entry PHR MAC CE, such that the
  currently two reserved bits that share the same octet as the $P_{CMAX,f,c}$ can be used to carry the
  TxPowerStep increase and decrease command bits. In this way the PBM could make multiple
  requests to change the Parent node's Tx power by using the multiple occurrence of the command
  in the Multiple Entry PHR MAC CE
It has a fixed size and consists of two octets defined as follows (FIG. 1):
  R: Reserved bit, set to "0";
  Power Headroom (PH): This field indicates the power headroom level. The length of
  the field is 6 bits. The reported PH and the corresponding power headroom levels
  are shown in Table 6.1.3.8-1 of TS28.321;
  $P_{CMAX,f,c}$: This field indicates the $P_{CMAX,f,c}$ (as specified in TS 38.213) used for
  calculation of the preceding PH field. The reported $P_{CMAX,f,c}$ and the corresponding
  nominal UE transmit power levels are shown in Table 6.1.3.8-2 of TS28.321(the
  corresponding measured values in dBm are specified in TS 38.1333 [11]).
  Di: This field, when set to 1, indicates that step-wise increase to the Parent
  Node's transmit power level is desired but the IAB node. Otherwise it is set to 0
  Dd: This field when set to 1, indicates that at step-wise decrease to the Parent
  Node's transmit power level is desired by the IAB node. Otherwise it is set to 0

FIG. 1: Single Entry PHR MAC CE

| R | R | PH (Type 1, Pcell) |
|---|---|---|
| Di | Dd | $P_{CMAX,f,c}$ |

To request an increase in the Parent node's Tx beam power, the PBM would sent the appropriate data to the MAC control entity such that the MAC control entity would configure the MAC Power Headroom report to the Parent node as in FIG. 2:
FIG. 2: Single Entry PHR MAC CE with data configured to signal
a request to increase the Parent node's Tx power

TABLE 1-continued

MODIFIED SINGLE ENTRY PHR MAC CE
Single Entry PHR MAC CE

| R | R | POWER_HEADROOM_0 |
|---|---|---|
| 1 | 0 | $P_{CMAX,f,c}$— PCMAX_C_00 |

To request an decrease in the Parent node's Tx beam power, the PBM would sent the appropriate data to the MAC control entity such that the MAC control entity would configure the MAC Power Headroom report to the Parent node as in FIG. 2:

FIG. 3: Single Entry PHR MAC CE with data configured to signal a request to decrease the Parent node's Tx power

| R | R | POWER_HEADROOM_0 |
|---|---|---|
| 0 | 1 | $P_{CMAX,f,c}$— PCMAX_C_00 |

H: System Information Facilitating Beam Management

Table 2 provides an ASN.1 description of anew system information block SIBx that may be added to TS 36.331, and which provides the a of generic system values that the system provides such that TAB nodes may be able to detect and mitigate and manage the interference caused by a Parent node serving an IAB node upon the child node served by the IAB node via signals to the Parent node that request either an increase or decrease in the Parent nodes Tx Beam.

I: RRC Message Facilitating Beam Management

Table 3 provides an ASN.1 description of new elements in an RRCConnectionReconfiguration message that may be added to 3GPP TS 36.331 and which provide a set of generic system values and a set of node specific value that the system provides such that IAB nodes may be able to detect and mitigate and manage the interference caused by a Parent node serving an IAB node upon the child node served by the IAB node via signals to the Parent node that request either an increase or decrease in the Parent nodes Tx Beam.

TABLE 2

SIBx information element

```
-- ASN1START
SystemInformationBlockTypeX ::=    SEQUENCE {
   backHaulPCInfo          BackHaulPCIInfo    OPTIONAL,     --Need OR
   ...,
   lateNonCriticalExtension                   OCTET STRING
      OPTIONAL,
}
BackHaulPCInfo ::=          SEQUENCE {
   SystemUEInterferenceOffset    INTEGER (-64...64),
   SystemCNInterferenceOffset    INTEGER (-64...64),
   SystemUEMinRxThreshold        INTEGER (-123...123),
   SystemCNMinRxThreshold        INTEGER (-123...123),
   SystemUERxDifValue            INTEGER (0...123),
   SystemCNRxDiffValue           INTEGER (0...123),
   SystemUEPathLossModel    ENUMERATED {
                     Model-1, Model-2, Model-3, Model-4, Model-5
                     Model-6, spare 1, spare2},
   SystemCNPathLossModel    ENUMERATED {
                     Model-1, Model-2, Model-3, Model-4, Model-5
                     Model-6, sparel, spare2},
   SystemIABMinRxThreshold  INTEGER (-123...123),
   SystemIABServiceOffset   INTEGER (-64...64),
   SystemIABMaxOffset        INTEGER (-64...64),
   TxPowerStep              ENUMERATED {
                     0.5dBm, 1.0dBm, 1.5dBm, 2.0dBm,
                     2.5dBm, 3.0dBm, 3.5dBm, 4.0dBm },
   PCStepTimer              ENUMERATED {
                     2ms, 4ms, 8ms, 16ms,32ms,
                     64ms, 128ms, 256ms, 512ms },
   TxAntennalocation                 ::=              SEQUENCE {
      x-axis                   OCTET STRING,
      y-axis                   OCTET STRING,
      z-axis                   OCTET STRING
   }
   ...
}
-- ASN1STOP
```

TABLE 3

| RRCConnectionReconfiguration message |
|---|
| information element |

```
-- ASN1START
RRCConnectionReconfiguration  ::=   SEQUENCE {
   rrc-TransactionIdentifier          RRC-TransactionIdentifier,
   criticalExtensions                 CHOICE {
      c1                                 CHOICE {
         rrcConnectionReconfiguration-r17   RRCConnectionReconfiguration-r17-IEs,
            spare7 NULL,
            spare6 NULL, spare5 NULL, spare4 NULL,
            spare3 NULL, spare2 NULL, spare1 NULL
      },
      criticalExtensionsFuture           SEQUENCE { }
   }
}
RRCConnectionReconfiguration-r17-IEs  ::=   SEQUENCE {
   backHaulPCNodeDataToRelease:=        SEQUENCE (SIZE 1..maxNodes)) OF
                                           NodeIndex
   backHaulPCNodeDataToAddMod::=        SEQUENCE (SIZE (1..maxNodes)) OF
                                           NodeDataToAddMod
   NodeDataToAddMod           ::=       SEQUENCE{
      nodeIndex                            NodeIndex,
      cellIdentification-r13               SEQUENCE {
         physCellId-r13                       PhysCellId,
         dl-CarrierFreq-r13                   ARFCN-ValueEUTRA-r9
      },
      SystemUEInterferenceOffset           INTEGER (-64...64),
      SystemCNInterferenceOffset           INTEGER (-64...64),
      SystemUEMinRxThreshold               INTEGER (-123...123),
      SystemCNMinRxThreshold               INTEGER (-123...123),
      SystemUERxDifValue                   INTEGER (0...123),
      SystemCNRxDifValue                   INTEGER (0...123),
      SystemUEPathLossModel                ENUMERATED {
                                              Model-1,  Model-2,  Model-3,
                                              Model-4, Model-5
                                                 Model-6, spare1, spare2},
      SystemCNPathLossModel                ENUMERATED {
                                              Model-1,  Model-2,  Model-3,
                                              Model-4, Model-5
                                                 Model-6, spare1, spare2},
      RxAntennalocation ::=                SEQUENCE {
         x-axis                               OCTET STRING,
         y-axis                               OCTET STRING,
         z-axis                               OCTET STRING
      }
                                           OPTIONAL,
   }                                     OPTIONAL,
   IABData                    ::=       SEQUENCE {
      SystemIABMinRxThreshold              INTEGER (-123...123),
      SystemIABServiceOffset               INTEGER (-64...64),
      SystemIABMaxOffset                   INTEGER (-64...64)
   }                                     OPTIONAL,
   ParentData                 ::=       SEQUENCE {
      TxPowerStep                          ENUMERATED {
                                              0.5dBm, 1.0dBm, 1.5dBm, 2.0dBm,
                                              2.5 dBm,  3.0dBm,   3.5dBm,
                                              4.0dBm },
      PCStepTimer                          ENUMERATED {
                                              2ms, 4ms, 8ms, 16ms,32ms, 64ms, 128ms,
                                              256ms, 512ms },
      Horz_Angle                           INTEGER (0...359),
      Horz_Width                           INTEGER (0...180),
      Vert_Angle                           INTEGER (0...359),
      Vert_Width                           INTEGER (0...180),
      TxPower                        INTEGER (-123...123),
      TxAntennalocation ::=                SEQUENCE {
         x-axis                               OCTET STRING,
         y-axis                               OCTET STRING,
         z-axis                               OCTET STRING
      }
   }
                                           OPTIONAL,
   ...
}
-- ASN1STOP
-- ASN1START
```

TABLE 3-continued

| RRCConnectionReconfiguration message | |
|---|---|
| NodeIndex ::= | maxNodes |
| maxNodes ::= | INTEGER (1..31) |
| -- ASN1STOP | |

J: IAB Node Action Upon Receipt of Beam Management Facilitating Information

The action taken by the device, e.g. an IAB Node, upon the receipt of a RRCConnectionReconfiguration, which includes the information element backHaulPCNodeData-ToAddMod, as may be captured into the TS 36.331 as shown in Table 4.

TABLE 4

If the UE is able to comply with the configuration included in the
RRCConnectionReconfiguration message, the UE shall:
  1>if the RRCConnectionReconfiguration message does not include the
    fullConfig and the UE is connected to 5GC (i.e., delta signalling during
    intra 5GC handover):
    2>re-use the source SDAP and PDCP configurations (i.e., current
      SDAP/PDCP configurations for all RBs from source RAT prior to the
      reception of the inter-RAT handover RRCConnectionReconfiguration
      message);
  1>if the RRCConnectionReconfiguration message includes the fullConfig and
    the source RAT was E-UTRA (i.e., intra-RAT inter-system handover):
    // text that already exist in this section of the TS is not shown here for brevity //
  1>if the received RRCConnectionReconfiguration includes the
    backHaulPCNodeDataToAddMod:
    2>configure the parameters for the BMP as found in
      backHaulPCNodeDataToAddMod;
    // text that already exist in this section of the TS is not shown here for brevity //

The action taken by the device, e.g. an JAB Node, upon the receipt of a SystemInformationBlockTypeX, which includes the information element backHaulPCInfo, as may be captured into the TS 36.331 as shown in Table 5.

TABLE 5

Upon receiving SystemInformationBlockTypex, the UE shall:
  1>if configured to operate as an IAB Node:
    2>configure the parameters for the BMP as found in backHaulPCInfo;

K: Parameter Descriptions/Explanations

The following information may provide description and explanation for various terms and/or phrases utilized herein.

InterferenceOffset
  This parameter is an Offset between the Parent node's estimated signal strength at the Child node, and the Child node's minimum Rx threshold. It is used when evaluating if the Parent node's Tx Beam is interfering with a Child node's receiver. The parameter provides the system the ability to fine tune the evaluation criteria when determining interference.
  The system may, or may not, provide an Interference Offset parameter. If provided, the parameter may be sent by the system via a SIB message, and thus it may be a generic value for all nodes that are of type UE and a different value that is generic for all nodes that are of type not a UE. Alternately, if provided the parameter may be sent via an RRC Configuration message to the IAB Node and the offset may be specific to each Child node of the IAB Node.

MinRxThresholdChildNode
  This parameter is a Child node's minimum Rx threshold. It is used when evaluating if the Parent node's Tx Beam is interfering with a Child node's receiver.
  The system may, or may not, provide a minimum RX Threshold parameter. If provided, the parameter may be sent by the system via a SIB message, and thus the threshold may be a generic value for all nodes that are of type UE and a different threshold value that is generic for all nodes that are of type not a UE. Alternately, if provided the parameter may be sent via an RRC Configuration message to the IAB Node and the threshold may be specific to each Child node of the TAB Node.

MinRxThresholdIABNode
  This parameter is a IAB node's minimum Rx threshold. It is used when evaluating if the Parent node's Tx Beam is sufficient at the IABNode receiver.
  The system may, or may not, provide a minimum RX Threshold parameter. If provided, the parameter may be sent by the system via a SIB message, and thus the threshold may be a generic value for all nodes that are of type UE and a different threshold value that is generic for all nodes that are of type not a UE. Alternately, if provided the parameter may be sent via an RRC Configuration message to the LAB Node and the threshold may be specific to each Child node of the TAB Node.

RxDiffValue
  This parameter is the difference between the IAB node's estimated signal strength at the Child node, and the Parent node's estimated signal strength at the Child node. It is used when evaluating if the Parent node's Tx Beam is interfering with a Child node's receiver. The difference parameter provides the system the ability to fine tune the evaluation criteria when determining interference.
  The system may, or may not, provide a difference parameter. If provided, the parameter may be sent by the system via a SIB message, and thus it may be a generic value for all nodes that are of type UE and a different value that is generic for all nodes that are of type not a UE. Alternately, if provided the parameter may be sent via an RRC Configuration message to the IAB Node and the value may be specific to each Child node of the IAB Node.

PathLossModel

The disclosure considers which model to use, but the details on the operation of the model selected by this function is not the point of this disclosure. Any number of different models can determine the path loss. For example, the Friis equation, can solve for the Path Loss given: distance between Tx and Rx antenna, Tx Power, Tx Freq, and other antenna configuration parameter. Other Path Loss modes are: Walfish-Ikegami, Okumura-Hata, Longley-Rice, Lee and Young.

The system may, or may not, provide a PathLossModel parameter. If provided, the parameter may be sent by the system via a SIB message, and thus it may be a generic value for all nodes that are of type UE and a different value that is generic for all nodes that are of type not a UE. Alternately, if provided the parameter may be sent via an RRC Configuration message to the IAB Node and the parameter may be specific to each Child node of the IAB Node.

ServiceOffset

This parameter is an Offset between the Parent node's estimated signal strength at the IAB node, and the IAB node's minimum Rx threshold. It is used when evaluating if the signal strength of the Parent node's Tx Beam as estimated at the IAB node is sufficient to serve a JAB node's receiver. The parameter provides the system the ability to fine tune the evaluation criteria when determining Parent Nodes service level to the IAB node and interference that it may cause on Child nodes of the LAB node.

The system may, or may not, provide a Service Offset parameter. If provided, the parameter may be sent by the system via a SIB message, and thus it may be a generic value for all nodes that are of type not a UE. Alternately, if provided the parameter may be sent via an RRC Configuration message to the LAB Node and the service offset may be specific to the JAB Node. The offset may be a positive or negative value.

MaxOffset

This parameter is an Offset that represents the difference between the JAB Node's minimum Rx threshold and its maximum Rx threshold. It is used when evaluating if the signal strength of the Parent node's Tx Beam as estimated at the LAB node is so large that any further increase would have no benefit to the IAB node. The parameter provides the system the ability to fine tune the evaluation criteria when determining Parent Nodes service level to the LAB node and interference that it may cause on Child nodes of the JAB node.

The system may, or may not, provide a Max Offset parameter. If provided, the parameter may be sent by the system via a SIB message, and thus it may be a generic value for all nodes that are of type not a UE. Alternately, if provided the parameter may be sent via an RRC Configuration message to the JAB Node and the service offset may be specific to the LAB Node. The offset may be a positive or negative value.

TxPowerStep

This parameter is a value that represents the agreed incremental change in dBm in the Parent Node's Tx power upon each reception by the Parent node of a PHR MAC CE with LCID of 57 or 56 or 54 with Di or the Dd bit filed set to non-zero.

The system may, or may not, provide a TXPowerStep parameter. If provided, the parameter may be sent by the system via a SIB message. Alternately, if provided the parameter may be sent via an RRC Configuration message to the IAB Node. If not provided, the default value used by the IAB Node is 1.

PCStepTimer

This parameter is a value that represents the agreed amount of time between each attempt by the PBM to send to the Parent node a PHR MAC CE with LCID of 57 or 56 or 54 with Di or the Dd bit filed set to non-zero.

The system may, or may not, provide a PCStepTimer parameter. If provided, the parameter may be sent by the system via a SIB message. Alternately, if provided the parameter may be sent via an RRC Configuration message to the IAB Node. If not provided, the default value used by the IAB Node is 1 ms.

basic parameters included in a LTE UE's Uplink PC equation:

https://www.researchgate.net/publication/224242015_How_to_Set_the_Fractional_Power_Control_Compensation_Factor_in_LTE Power of PUSCH—min{Pmax,10 log(M)+P0+αPL+ΔTF+f} where:

Pmax is the maximum transmit power of the UE;

M is the number of Radio Blocks (RB) allocated to the UE;

P0 is a target received power at eNode-B;

α is called the compensation factor;

PL is the UE-eNode-B path-loss;

ΔTF is a corrective factor depending on the Transport Format;

f is a closed loop command issued by the eNode-B

IAB Arch for Rel-16 https://arxiv.org/pdf/1906.01099.pdf

Sequence Frame Number/Frequency Reuse Factor

Figure 32:
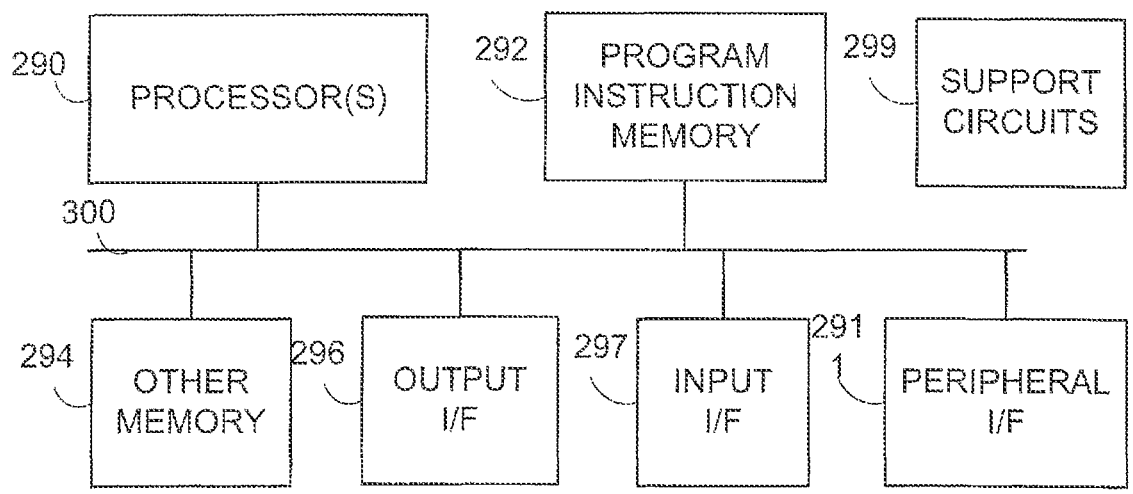
FIG. 32 is a diagrammatic view showing example elements comprising electronic machinery which may comprise a wireless terminal, a radio access node, and a core network node according to an example embodiment and mode.
Figure 33:
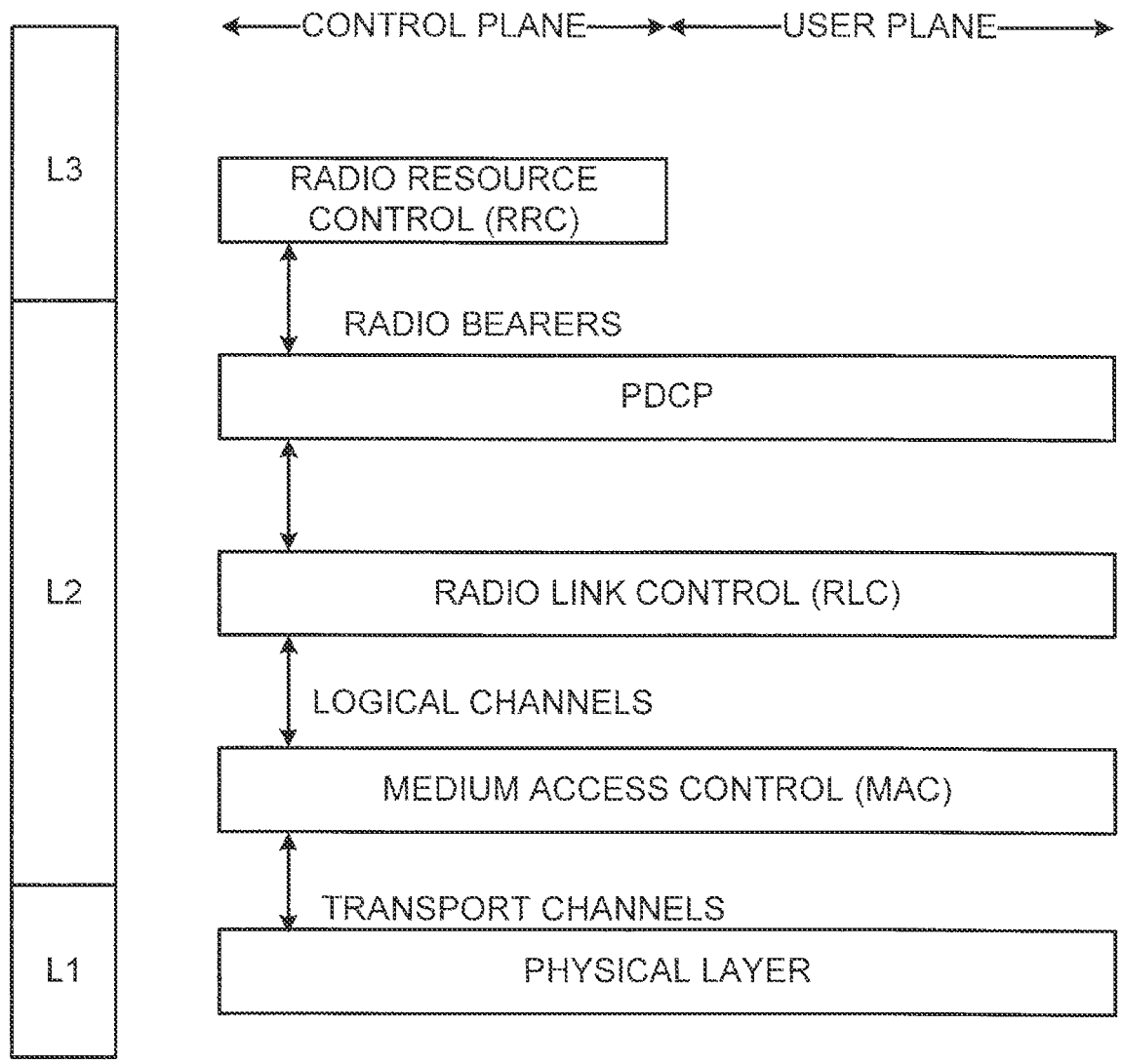
FIG. 33 is a diagrammatic view illustrating an example of a radio protocol architecture for the control and user planes in a mobile communications network.
Figure 34:
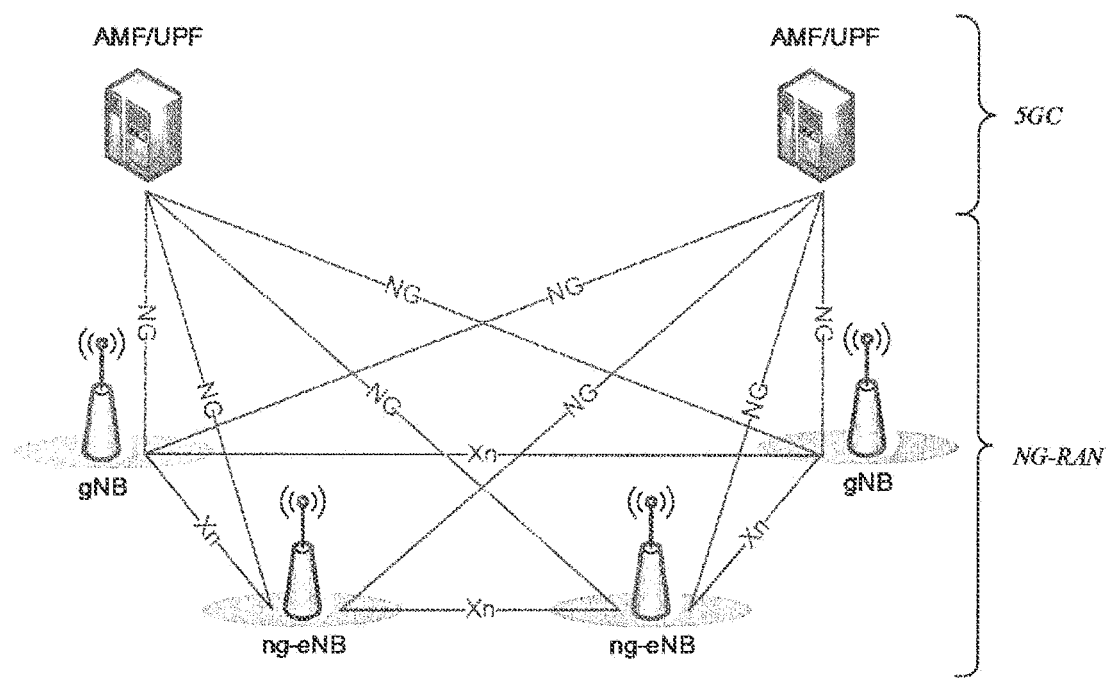
FIG. 34 is a diagrammatic view of overall architecture for a 5G New Radio system.

Benefit of the invention: For an SFN, the Frequency Reuse Factor=1 (i.e. all cells use the same band and depend on OFDMA and SC-FDMA to mitigate INTRA-cell interference). But if an IAB node is doing its own scheduling that is independent from its parent node(s), then there could be a situation of INTRA-cell interference, so there is a need to apply PC to the parent node(s) (Note here "parent" encompasses both the donor node and parent nodes which are not donor nodes ("DNs")) DL. On the other hand, if the donor is controlling the resource scheduling of the LAB node (and thereby ensuring that the IAB and Donor resources are orthogonal), then there could be resource efficiency gains by applying PC to the Donor DL and then allowing frequency re-use of 1 with the link between the UE and LAB.

crosslink interference (CLI)

https://arxiv.org/pdf/1902.02980.pdf crosslink interference (CLI) encompasses the coexistence of different link directions over same frequency resources in adjacent cells results in potential crosslink interference (CLI), i.e., user-to-user (UE-UE), and base-station to base-station (BS-BS) interference L. Circuitry and Hardware Implementations Certain units and functionalities of the systems 20 may be implemented by electronic machinery. For example, electronic machinery may refer to the processor circuitry described herein, such as donor node processor(s) 46, IAB node processor(s) 54, and node processor(s) 66. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 32 shows an example of electronic machinery, e.g., processor circuitry, as comprising one or more processors 290, program instruction memory 292; other memory 294 (e.g., RAM, cache, etc.); input/output interfaces 296 and 297, peripheral interfaces 298; support circuits 299; and busses 300 for communication between the aforementioned units. The processor(s) 290 may comprise the processor circuitries described herein, for example, donor node processor(s) 46, IAB node processor(s) 54, and node processor(s) 66.

An memory or register described herein may be depicted by memory 294, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 299 are coupled to the processors 290 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30 and IAB nodes used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves basic function of a radio access network, e.g., methods and procedures to deal with problematic conditions on a backhaul link, such as radio link failure (RLF), for example.

Figure 31:
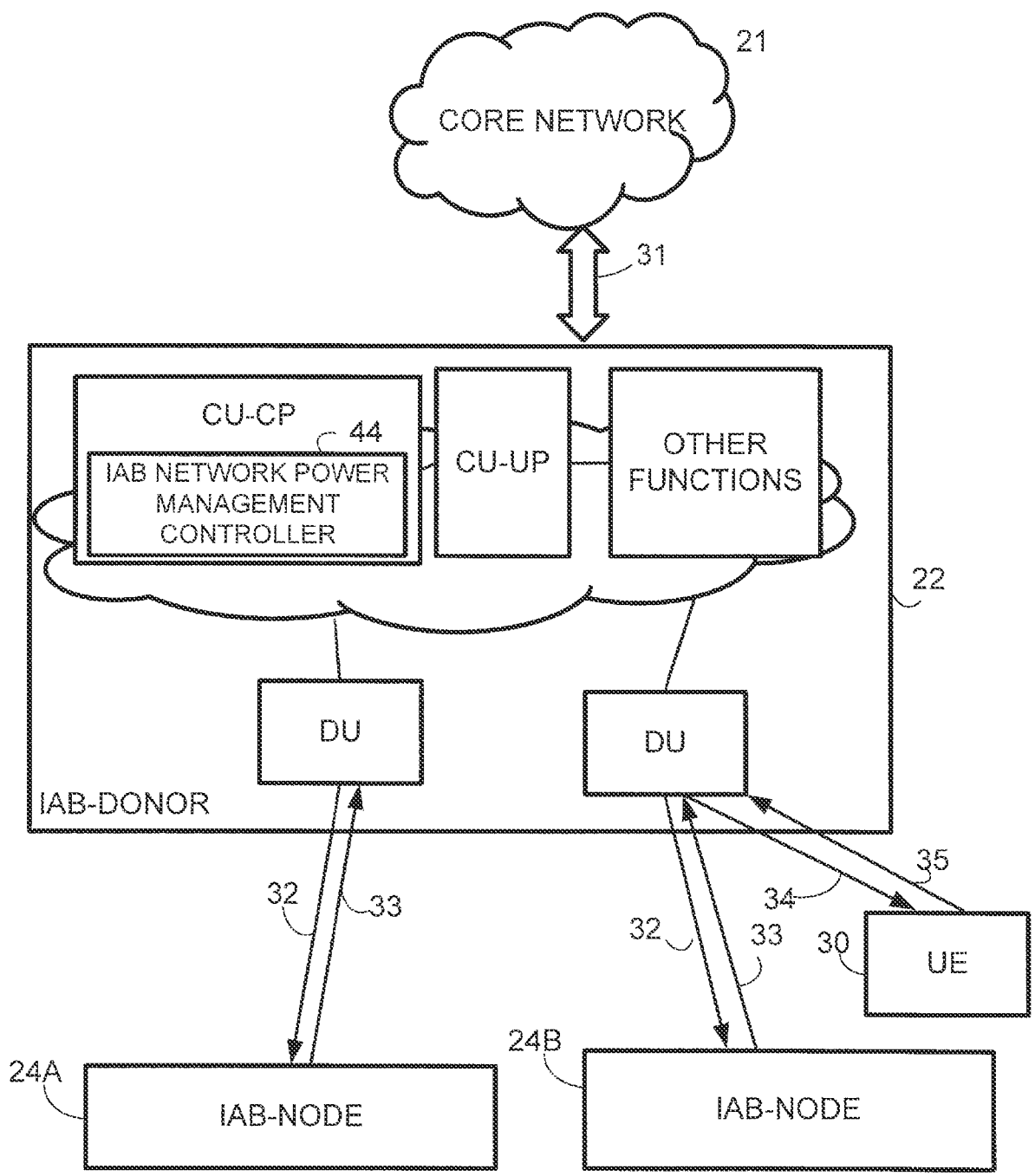
FIG. 31 is a diagrammatic view showing example architecture of a donor IAB node configured in segmented or distributed fashion to host CU functions.

FIG. 31 shows various details of example architecture of donor IAB node 22, wherein the donor IAB node Central Unit (CU) 40 may be configured in segmented or distributed fashion to host CU-control plane functions, such as IAB network power management controller 45, CU-user plane functions, and other functions. The functions and/or processors comprising donor IAB node Central Unit (CU) 40 may be co-located, or comprise a separate communications network which extends over plural processors and/or nodes and be connected by a packet communications network.

M: Further Example Embodiments and Modes

The technology disclosed herein also encompasses one or more of the following nonlimiting, non-exclusive example embodiments and modes:

Example Embodiment 1: A node of an Integrated Access and Backhaul (IAB) network, the node comprising: processor circuitry configured: to make a determination concerning crosslink interference (CLI) between (a) a beam transmitted from a parent node to the IAB node and (b) a beam transmitted from the IAB node to a child node of the IAB node; and in accordance with the determination, to generate a command configured to modify a property of the beam transmitted from the parent node to the IAB node; interface circuitry configured to transmit the command to a beam controller of the parent node.

Example Embodiment 2: The node of Example Embodiment 1: wherein command is configured to modify signal strength of the beam transmitted from the parent node to the IAB node.

Example Embodiment 3: The node of Example Embodiment 1, wherein the processor circuitry is configured to make the determination based at least in part on relative positions of: the parent node; the IAB node; and other nodes for which IAB node acts as a relay node.

Example Embodiment 4: The node of Example Embodiment 1, wherein the processor circuitry is configured to make the determination based at least in part on radio frequency (RF) conditions for: the parent node; the IAB node; and other nodes for which IAB node acts as a relay node.

Example Embodiment 5: The node of Example Embodiment 1, wherein the node is a donor node; the processor circuitry comprises central unit circuitry of the donor node; and the interface circuitry is configured to transmit the command from the central unit circuitry to the beam controller.

Example Embodiment 6: The node of Example Embodiment 1, wherein the node is the IAB node; and the interface circuitry comprises mobile termination circuitry of the IAB node, the mobile termination circuitry of the IAB node being configured to transmit the command over a wireless backhaul interface to the beam controller.

Example Embodiment 7: The node of Example Embodiment 6, wherein the processor circuitry comprises distributed unit circuitry of the IAB node.

Example Embodiment 8: The node of Example Embodiment 1, wherein the processor circuitry is configured to use configuration data to make the determination concerning the crosslink interference (CLI).

Example Embodiment 9: The node of Example Embodiment 8, further comprising receiver circuitry configured to receive the configuration data over a wireless interface from the parent IAB node.

Example Embodiment 10: The node of Example Embodiment 9, wherein the processor circuitry is configured to obtain the configuration data from a system information block (SIB) received by the receiver circuitry.

Example Embodiment 11: The node of Example Embodiment 9, wherein the processor circuitry is configured to obtain the configuration data from a Radio Resource Control (RRC) Reconfiguration message received by the receiver circuitry.

Example Embodiment 12: The node of Example Embodiment 8, wherein the configuration data comprises: first reconfiguration data related to an estimation of radio frequency (RF) signal strength of the beam transmitted by the parent node to the IAB node and second reconfiguration data related to an estimation of radio frequency (RF) signal strength of the beam transmitted by the IAB node to the child node.

Example Embodiment 13: A method in a node of an Integrated Access and Backhaul (IAB) network, the node comprising: using processor circuitry: to make a determination concerning crosslink interference (CLI) between (a) a beam transmitted from a parent node to the IAB node and (b) a beam transmitted from the IBA node to a child node of the IAB node; and in accordance with the determination, to generate a command configured to modify a property of the beam transmitted from the parent node to the IAB node; transmitting the command to a beam controller of the parent node.

Example Embodiment 14: The method of Example Embodiment 13, wherein command is configured to modify signal strength of the beam transmitted from the parent node to the IAB node.

Example Embodiment 15: The method of Example Embodiment 13, further comprising using the processor circuitry is to make the determination based at least in part on relative positions of: the parent node; the IAB node; and other nodes for which IAB node acts as a relay node.

Example Embodiment 16: The method of Example Embodiment 13, further comprising using the processor circuitry to make the determination based at least in part on radio frequency (RF) conditions for the parent node; the IAB node; and other nodes for which IAB node acts as a relay node.

Example Embodiment 17: The method of Example Embodiment 13, wherein the node is a donor node; the processor circuitry comprises central unit circuitry of the donor node; and the command is transmitted from the central unit circuitry to the beam controller.

Example Embodiment 18: The method of Example Embodiment 13, wherein the node is the IAB node and the method further comprising using mobile termination circuitry of the IAB node to transmit the command over a wireless backhaul interface to the beam controller.

Example Embodiment 19: The method of Example Embodiment 13, further comprising using configuration data to make the determination concerning the crosslink interference (CLI).

Example Embodiment 20: The method of Example Embodiment 19, further comprising receiving the configuration data over a wireless interface from the parent IAB node.

Example Embodiment 21: The method of Example Embodiment 20, further comprising obtaining the configuration data from a system information block (SIB).

Example Embodiment 22: The method of Example Embodiment 20, further comprising obtaining the configuration data from a Radio Resource Control (RRC) Reconfiguration message.

Example Embodiment 23: The method of Example Embodiment 19, wherein the configuration data comprises: first reconfiguration data related to an estimation of radio frequency (RF) signal strength of the beam transmitted by the parent node to the TAB node and second reconfiguration data related to an estimation of radio frequency (RF) signal strength of the beam transmitted by the TAB node to the child node.

Example Embodiment 24: A node of an integrated access and backhaul (LAB) network comprising: an interface configured to obtain a command configured in accordance with a determination concerning crosslink interference (CLI) between (a) a beam transmitted from the node to a wireless relay node and (b) a beam transmitted from the wireless relay node to a child node of the wireless relay node; beam transmission circuitry configured to use the command to modify a property of the beam transmitted from the node to the wireless relay node.

Example Embodiment 25: The node of Example Embodiment 24, wherein the node is a donor node.

Example Embodiment 26: The node of Example Embodiment 24, wherein the node is an TAB node donor node.

Example Embodiment 27: The node of Example Embodiment 24, wherein the command is received from the wireless relay node.

Example Embodiment 28: The node of Example Embodiment 27, further comprising: data generation circuitry configured to generate configuration data for use by the processor which makes the determination concerning the crosslink interference (CLI); transmitter circuitry configured to transmit the configuration data to the wireless relay node over a radio interface; and receiver circuitry configured to receive the beam modification command from the wireless relay node over the radio interface.

Example Embodiment 29: The node of Example Embodiment 24, wherein the processor circuitry which makes the determination comprises the node.

Example Embodiment 30: The node of Example Embodiment 24, further comprising data generation circuitry configured to generate configuration data for use by the processor which makes the determination concerning the crosslink interference (CLI).

Example Embodiment 31: A method in a node of an integrated access and backhaul (TAB) network comprising: obtaining a command configured in accordance with a determination concerning crosslink interference (CLI) between (a) a beam transmitted from the node to a wireless relay node and (b) a beam transmitted from the wireless relay node to a child node of the wireless relay node; modifying a property of the beam transmitted from the node to the wireless relay node in accordance with the command.

Example Embodiment 32: The method of Example Embodiment 31, further comprising receiving the command from the wireless relay node.

Example Embodiment 33: The method of Example Embodiment 31, wherein the node is a donor node.

Example Embodiment 34: The method of Example Embodiment 31, wherein the node is an IAB node donor node.

Example Embodiment 35: The method of Example Embodiment 31, further comprising: generating configuration data which makes the determination concerning the crosslink interference (CLI); transmitting the configuration data to the wireless relay node over a radio interface; and receiving the beam modification command from the wireless relay node over the radio interface.

Example Embodiment 36: The method of Example Embodiment 31, further comprising generating configuration data for use in the determination concerning the crosslink interference (CLI).

Example Embodiment 37: A wireless terminal, acting as a wireless relay node, that communicates over a radio interface with a wireless access node of a radio access network (RAN), the wireless terminal comprising: transceiver circuitry configured to: receive from the wireless access node configuration data related to the estimation of RF signal strength received by the wireless terminal, as transmitted by the RAN; receive from the wireless access node configuration data related to the estimation of RF signal strength received by nodes that are using the relay capabilities of the wireless terminal to communicates over a radio interface with a wireless access node, as transmitted by the RAN; wherein; the configuration data may be specific to the type of node that is using the relay capabilities of the wireless terminal; wherein; the type of node may be a User Equipment; the type of node may of type Wireless Access node transmit to the wireless access node commands related to the modification of the RF signal strength transmitted by the wireless access node; processor circuitry configured to make a determination of whether or not to request a modification of wireless access node's transmitted RF signal strength; wherein; the determination of whether to request a modification is based on the relative positions of the wireless access node, the wireless terminal acting as a relay and nodes that are using the relay capabilities of the wireless terminal; the determination of whether to request a modification is based on the estimated RF conditions at the wireless terminal acting a relay node, and the estimated RF conditions at the nodes that are using the relay capabilities of the wireless terminal; the determination of whether to request a modification is based on the type nodes that are using the relay capabilities of the wireless terminal; wherein; a node that is using the relay capabilities of the wireless terminal may be of type User Equipment; a node that is using the relay capabilities of the wireless terminal may be of type Wireless Access node Example Embodiment 38: The wireless terminal of Example Embodiment 37, wherein the configuration data is sent via SIBx Example Embodiment 39: The wireless terminal of Example Embodiment 37, wherein the configuration data is sent via RRCReconfiguration message.

Example Embodiment 40: The wireless terminal of Example Embodiment 37, wherein the configuration data is sent via a Single Entry PHR MAC CE.

Example Embodiment 41: The wireless terminal of Example Embodiment 37, wherein the configuration data is sent via a Multiple Entry PHR MAC CE.

N: Further Documentation

One or more of the following documents may be pertinent to the technology disclosed herein (all of which are incorporated herein by reference in their entirety):

| | | |
|---|---|---|
| R2-1903583 | BH RLF recovery for IAB | Qualcomm Inc |
| R2-1903684 | Configuration of BH RLC CH | Samsung |
| R2-1903685 | Overview on control signaling transmission in IAB | Samsung |
| R2-1903698 | On topology adaptation upon backhaul-link-failure recovery | ASUSTeK |
| R2-1903730 | Further consideration of topology adaptation upon BH RLF | Kyocera |
| R2-1903928 | Allowing only IAB nodes in a standalone SA deployment | Ericsson |
| R2-1903930 | CP aspects of IAB nodes | Ericsson |
| R2-1903933 | Minimizing CN functionalities for IAB network | Ericsson |
| R2-1903934 | Support for LTE deployment at IAB node sites | Ericsson |
| R2-1903935 | RLF related notifications in IAB networks | Ericsson |
| R2-1903936 | IP address assignment for IAB nodes | Ericsson |
| R2-1903940 | Backhaul RLF handling | Intel Corporation |
| R2-1903960 | IAB node Release Procedure | Ericsson |
| R2-1903970 | Backhaul Channel Setup and Modification Procedure for IAB Networks | Ericsson |
| R2-1903971 | IAB node Integration Procedure | Ericsson |

-continued

| | | |
|---|---|---|
| R2-1904172 | RLF notification for backhaul link | Lenovo, Motorola Mobility |
| R2-1904180 | Overview of flow control solutions | Samsung R&D Institute UK |
| R2-1904181 | IAB RRC state machine | Samsung R&D Institute UK |
| R2-1904200 | IAB System information handling | Sony |
| R2-1904260 | Parent node selection for migration | Lenovo, Motorola Mobility |
| R2-1904410 | BH link RLF notifications | Nokia, Nokia Shanghai Bell |
| R2-1904411 | Further discussion on BH link RLF handling | Nokia, Nokia Shanghai Bell |
| R2-1904427 | Downstream notification of BH RLF | SHARP Corporation |
| R2-1904430 | Access restrictions (barring) in IAB | SHARP Corporation |
| R2-1904606 | Discussion on IAB BH RLF handling | ZTE Corporation, Sanechips |
| R2-1904611 | Discussion on BH RLC channel configuration in IAB network | ZTE Corporation, Sanechips |
| R2-1904873 | Improvements on RLF procedure in IAB | ITRI |
| R2-1904905 | (De)Prioritizing the Access for IAB Setup | Samsung |
| R2-1904975 | IAB RRC Connection Establishment | Futurewei Technologies |
| R2-1904976 | Access Control for IAB MT | Futurewei Technologies |
| R2-1904978 | Cell Selection and Cell Reselection procedures of IAB | Futurewei Technologies |
| R2-1904985 | IAB RLC channel management procedure | Futurewei Technologies |
| R2-1904987 | RRC signaling structure for IAB | Futurewei Technologies |
| R2-1904988 | Flow control for IAB networks | Huawei, HiSilicon |
| R2-1904989 | Congestion reporting and handling for IAB networks | Futurewei Technologies |
| R2-1905027 | Criteria for southbound and northbound backhaul link failure | LG Electronics France |
| R2-1905028 | Framework of BH RLF notification and recovery | LG Electronics France |
| R2-1905029 | Inter-node RRC signaling (applicbale for BH RLF notification) | LG Electronics France |
| R2-1905043 | Access Control for IAB node | LG Electronics Inc |
| R2-1905072 | BH RLF reporting to IAB donor node | LG Electronics Inc. |
| R2-1905103 | IAB bearer mapping decision and configuration | Futurewei Technologies |
| R2-1905171 | Backhaul RLF Recovery | Futurewei Technologies |

Oct. 2019, Week 4 of 3GPP RAN Draft Email Discussion:

https://list.etsi.org/scripts/wa.exe?A1=ind1910D&L=3GPP_TSG_RAN_DRAFTS&O=T&H=0&D=1&T=1#7

| | |
|---|---|
| Re: [IAB_enh] Rel-17 IAB enhancements Georg Hampel | Fri, 25 Oct. 2019 16:01:44 + 0000 |
| Re: [IAB_enh] Rel-17 IAB enhancements Georg Hampel | Fri, 25 Oct. 2019 15:47:43 + 0000 |
| Re: [IAB_enh] Rel-17 IAB enhancements Kimba, Boubacar | Fri, 25 Oct. 2019 17:27:03 + 0800 |
| Re: [IAB_enh] Rel-17 IAB enhancements Hyunsoo Ko | Fri, 25 Oct. 2019 11:43:57 + 0900 |
| Re: [IAB_enh] Rel-17 IAB enhancements Georg Hampel | Thu, 24 Oct. 2019 23:40:01 + 0000 |
| Re: [IAB_enh] Rel-17 IAB enhancements [log in to unmask] | Thu, 24 Oct. 2019 19:21:23 − 0500 |
| Re: [IAB_enh] Rel-17 IAB enhancements Luca Blessent | Thu, 24 Oct. 2019 22:41:14 + 0000 |
| Re: [IAB_enh] Rel-17 IAB enhancements Georg Hampel | Thu, 24 Oct. 2019 17:36:49 + 0000 |
| Re: [IAB_enh] Rel-17 IAB enhancements Gerd Zimmermann | Thu, 24 Oct. 2019 15:19:40 + 0000 |
| Re: [IAB_enh] Rel-17 IAB enhancements Georg Hampel | Thu, 24 Oct. 2019 14:02:27 + 0000 |
| Re: [IAB_enh] Rel-17 IAB enhancements Georg Hampel | Thu, 24 Oct. 2019 11:30:31 + 0000 |
| Re: [IAB_enh] Rel-17 IAB enhancements Simone Prowedi | Thu, 24 Oct. 2019 11:15:02 + 0000 |
| Re: [IAB_enh] Rel-17 IAB enhancements [log in to unmask] | Thu, 24 Oct. 2019 09:14:31 + 0000 |
| [IAB_enh] Rel-17 IAB enhancements MICHEL Cyril | Thu, 24 Oct. 2019 08:14:07 + 0000 |
| Re: [IAB_enh] Rel-17 IAB enhancements yi zheng | Thu, 24 Oct. 2019 11:15:05 + 0800 |
| Re: [IAB_enh] Rel-17 IAB enhancements Wenfeng Zhang | Wed, 23 Oct. 2019 22:10:50 − 0500 |
| Re: [IAB_enh] Rel-17 IAB enhancements Koichiro Kitagawa | Thu, 24 Oct. 2019 11:51:15 + 0900 |
| Re: [IAB_enh] Rel-17 IAB enhancements Georg Hampel | Thu, 24 Oct. 2019 01:16:19 + 0000 |
| Re: [IAB_enh] Rel-17 IAB enhancements Mazin Al-Shalash | Thu, 24 Oct. 2019 00:44:37 + 0000 |
| Re: [IAB_enh] Rel-17 IAB enhancements Georg Hampel | Wed, 23 Oct. 2019 16:21:31 + 0000 |
| Re: [IAB_enh] Rel-17 IAB enhancements Filip Barac | Wed, 23 Oct. 2019 15:04:55 + 0000 |
| Re: [IAB_enh] Rel-17 IAB enhancements Georg Hampel | Tue, 22 Oct. 2019 18:26:17 + 0000 |
| Re: [IAB_enh] Rel-17 IAB enhancements Georg Hampel | Tue, 22 Oct. 2019 13:36:01 + 0000 |
| Re: [IAB_enh] Rel-17 IAB enhancements Sharath Ananth | Mon, 21 Oct. 2019 19:30:25 − 0700 |

U.S. application Ser. No. 10/477,420 to Ghosh
U.S. application Ser. No. 10/470,136 to Ghosh
US Patent Publication 20180205427 to Ghosh Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemi-cal, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

In one example, a node of an Integrated Access and Backhaul (IAB) network, the node comprising: processor circuitry configured: to make a determination concerning crosslink interference (CLI) between (a) a beam transmitted from a parent node to the IAB node and (b) a beam transmitted from the JAB node to a child node of the IAB node; and in accordance with the determination, to generate a command configured to modify a property of the beam transmitted from the parent node to the IAB node; interface circuitry configured to transmit the command to a beam controller of the parent node.

In one example, the node, wherein command is configured to modify signal strength of the beam transmitted from the parent node to the JAB node.

In one example, the node, wherein the processor circuitry is configured to make the determination based at least in part on relative positions of: the parent node; the IAB node; and other nodes for which IAB node acts as a relay node.

In one example, the node, wherein the processor circuitry is configured to make the determination based at least in part on radio frequency (RF) conditions for: the parent node; the IAB node; and other nodes for which IAB node acts as a relay node.

In one example, the node, wherein the node is a donor node; the processor circuitry comprises central unit circuitry of the donor node; and the interface circuitry is configured to transmit the command from the central unit circuitry to the beam controller.

In one example, the node, wherein the node is the JAB node; and the interface circuitry comprises mobile termination circuitry of the JAB node, the mobile termination circuitry of the IAB node being configured to transmit the command over a wireless backhaul interface to the beam controller.

In one example, the node, wherein the processor circuitry comprises distributed unit circuitry of the IAB node.

In one example, the node, wherein the processor circuitry is configured to use configuration data to make the determination concerning the crosslink interference (CLI).

In one example, the node, further comprising receiver circuitry configured to receive the configuration data over a wireless interface from the parent JAB node.

In one example, the node, wherein the processor circuitry is configured to obtain the configuration data from a system information block (SIB) received by the receiver circuitry.

In one example, the node, wherein the processor circuitry is configured to obtain the configuration data from a Radio Resource Control (RRC) Reconfiguration message received by the receiver circuitry.

In one example, the node, wherein the configuration data comprises: first reconfiguration data related to an estimation of radio frequency (RF) signal strength of the beam transmitted by the parent node to the IAB node and second reconfiguration data related to an estimation of radio frequency (RF) signal strength of the beam transmitted by the TAB node to the child node.

In one example, a method in a node of an Integrated Access and Backhaul (IAB) network, the node comprising: using processor circuitry: to make a determination concerning crosslink interference (CLI) between (a) a beam transmitted from a parent node to the IAB node and (b) a beam transmitted from the IBA node to a child node of the IAB node; and in accordance with the determination, to generate a command configured to modify a property of the beam transmitted from the parent node to the IAB node; transmitting the command to a beam controller of the parent node.

In one example the method, wherein command is configured to modify signal strength of the beam transmitted from the parent node to the IAB node.

In one example the method, further comprising using the processor circuitry is to make the determination based at least in part on relative positions of: the parent node; the TAB node; and other nodes for which JAB node acts as a relay node.

In one example the method, further comprising using the processor circuitry to make the determination based at least in part on radio frequency (RF) conditions for: the parent node; the IAB node; and other nodes for which TAB node acts as a relay node.

In one example the method, wherein the node is a donor node; the processor circuitry comprises central unit circuitry of the donor node; and the command is transmitted from the central unit circuitry to the beam controller.

In one example the method, wherein the node is the IAB node and the method further comprising using mobile termination circuitry of the IAB node to transmit the command over a wireless backhaul interface to the beam controller.

In one example the method, further comprising using configuration data to make the determination concerning the crosslink interference (CLI).

In one example the method, further comprising receiving the configuration data over a wireless interface from the parent IAB node.

In one example the method, further comprising obtaining the configuration data from a system information block (SIB).

In one example the method, further comprising obtaining the configuration data from a Radio Resource Control (RRC) Reconfiguration message.

In one example the method, wherein the configuration data comprises: first reconfiguration data related to an estimation of radio frequency (RF) signal strength of the beam transmitted by the parent node to the IAB node and second reconfiguration data related to an estimation of radio frequency (RF) signal strength of the beam transmitted by the IAB node to the child node.

In one example a node of an integrated access and backhaul (IAB) network comprising: an interface configured to obtain a command configured in accordance with a determination concerning crosslink interference (CLI) between (a) a beam transmitted from the node to a wireless relay node and (b) a beam transmitted from the wireless relay node to a child node of the wireless relay node; beam transmission circuitry configured to use the command to modify a property of the beam transmitted from the node to the wireless relay node.

In one example the node, wherein the node is a donor node.

In one example the node, wherein the node is an IAB node donor node.

In one example the node, wherein the command is received from the wireless relay node.

In one example the node, further comprising: data generation circuitry configured to generate configuration data for use by the processor which makes the determination concerning the crosslink interference (CLI); transmitter circuitry configured to transmit the configuration data to the wireless relay node over a radio interface; and receiver circuitry configured to receive the beam modification command from the wireless relay node over the radio interface.

In one example the node, wherein the processor circuitry which makes the determination comprises the node.

In one example the node, further comprising data generation circuitry configured to generate configuration data for use by the processor which makes the determination concerning the crosslink interference (CLI).

In one example, a method in a node of an integrated access and backhaul (IAB) network comprising: obtaining a command configured in accordance with a determination concerning crosslink interference (CLI) between (a) a beam transmitted from the node to a wireless relay node and (b) a beam transmitted from the wireless relay node to a child node of the wireless relay node; modifying a property of the beam transmitted from the node to the wireless relay node in accordance with the command.

In one example the method, further comprising receiving the command from the wireless relay node.

In one example the method, wherein the node is a donor node.

In one example the method, wherein the node is an IAB node donor node.

In one example the method, further comprising: generating configuration data which makes the determination concerning the crosslink interference (CLI); transmitting the configuration data to the wireless relay node over a radio interface; and receiving the beam modification command from the wireless relay node over the radio interface.

In one example the method, further comprising generating configuration data for use in the determination concerning the crosslink interference (CLI).

CROSS REFERENCE

This Nonprovisional application claims priority under 35 U.S.C. § 119 on provisional Application No. 62,966,741 on Jan. 28, 2020, the entire contents of which are hereby incorporated by reference.

What is claimed is:

1. A node of an Integrated Access and Backhaul (IAB) network, the node comprising:
   processor circuitry configured:
   to make a determination concerning crosslink interference (CLI) between (a) a beam transmitted from a parent node to the IAB node and (b) a beam transmitted from the IAB node to a child node of the IAB node; and
   in accordance with the determination, to generate a command configured to modify a property of the beam transmitted from the parent node to the IAB node;
   interface circuitry configured to transmit the command to a beam controller of the parent node.

2. The node of claim 1, wherein command is configured to modify signal strength of the beam transmitted from the parent node to the IAB node.

3. The node of claim 1, wherein the processor circuitry is configured to make the determination based at least in part on relative positions of:
   the parent node;
   the IAB node; and
   other nodes for which IAB node acts as a relay node.

4. The node of claim 1, wherein the processor circuitry is configured to make the determination based at least in part on radio frequency (RF) conditions for:
   the parent node;
   the TAB node; and
   other nodes for which TAB node acts as a relay node.

5. The node of claim 1, wherein the processor circuitry is configured to use configuration data to make the determination concerning the crosslink interference (CLI).

6. The node of claim 5, wherein the configuration data comprises:
   first reconfiguration data related to an estimation of radio frequency (RF) signal strength of the beam transmitted by the parent node to the IAB node and
   second reconfiguration data related to an estimation of radio frequency (RF) signal strength of the beam transmitted by the IAB node to the child node.

7. A node of an integrated access and backhaul (IAB) network comprising:
   an interface configured to obtain a command configured in accordance with a determination concerning crosslink interference (CLI) between (a) a beam transmitted from the node to a wireless relay node and (b) a beam transmitted from the wireless relay node to a child node of the wireless relay node;
   beam transmission circuitry configured to use the command to modify a property of the beam transmitted from the node to the wireless relay node.

8. The node of claim 7, wherein the command is received from the wireless relay node.

9. The node of claim 7, further comprising:
   data generation circuitry configured to generate configuration data for use by the processor which makes the determination concerning the crosslink interference (CLI);
   transmitter circuitry configured to transmit the configuration data to the wireless relay node over a radio interface; and
   receiver circuitry configured to receive the beam modification command from the wireless relay node over the radio interface.

10. The node of claim 7, wherein the processor circuitry which makes the determination comprises the node.

11. The node of claim 7, further comprising data generation circuitry configured to generate configuration data for use by the processor which makes the determination concerning the crosslink interference (CLI).

* * * * *